United States Patent
McCafferty et al.

(10) Patent No.: US 11,122,810 B2
(45) Date of Patent: Sep. 21, 2021

(54) MATERIAL PROCESSING SYSTEM

(71) Applicant: ZME, LLC., Caldwell, ID (US)

(72) Inventors: Matthew Robert McCafferty, Caldwell, ID (US); Zachary Gerald Soles, Nampa, ID (US)

(73) Assignee: ZME, LLC, Caldwell, ID (US)

( * ) Notice: Subject to any disclaimer, the term of this patent is extended or adjusted under 35 U.S.C. 154(b) by 620 days.

(21) Appl. No.: 15/687,286

(22) Filed: Aug. 25, 2017

(65) Prior Publication Data

US 2018/0070595 A1     Mar. 15, 2018

Related U.S. Application Data

(60) Provisional application No. 62/379,471, filed on Aug. 25, 2016, provisional application No. 62/379,546, (Continued)

(51) Int. Cl.
    *A21B 1/42*          (2006.01)
    *A21B 1/44*          (2006.01)
(Continued)

(52) U.S. Cl.
CPC ............ *A21B 1/24* (2013.01); *A21B 1/46* (2013.01); *B65B 35/24* (2013.01); *B65B 35/44* (2013.01);
(Continued)

(58) Field of Classification Search
None
See application file for complete search history.

(56) References Cited

U.S. PATENT DOCUMENTS

| | | | | |
|---|---|---|---|---|
| 2,022,940 A | * | 12/1935 | Persiani | H05B 3/0004 99/342 |
| 2,103,469 A | * | 12/1937 | Kremer | H05B 3/0004 99/358 |

(Continued)

FOREIGN PATENT DOCUMENTS

| | | | |
|---|---|---|---|
| GB | 1258257 | 12/1971 | |
| JP | 2007159413 A | * 6/2007 | ........... H05B 3/0004 |

OTHER PUBLICATIONS

JP-20071594-A, Jun. 2007, Electric Cooking Device for Food, Yoneda et al, partial translation.*

(Continued)

*Primary Examiner* — Joseph M. Pelham
(74) *Attorney, Agent, or Firm* — Alexander Pokot; AP Patents

(57) ABSTRACT

A material processing system includes an oven that cooks or bakes, with electrical resistance, dough contained within containers. The oven can include a frame defining, devices mounted, in a preselected pattern, on the frame for a reciprocal movement in a vertical direction during use of the system, each device configured to connect voltage to a respective container so as to cook or bake the dough with the electrical resistance, and one or more powered members configured to move the devices in the vertical direction. Conveyors are also provided to convey a plurality of rows of containers with a plurality of containers in each row along a material conveyance path, the conveyors disposed in a series with each other and with the oven along the material conveyance path, one of the conveyors disposed within the oven so as to position a batch of the containers in an alignment with the devices.

13 Claims, 31 Drawing Sheets

Related U.S. Application Data filed on Aug. 25, 2016, provisional application No. 62/379,448, filed on Aug. 25, 2016.

(51) Int. Cl.

| | | |
|---|---|---|
| *H05B 3/02* | (2006.01) | |
| *H05B 3/03* | (2006.01) | |
| *A21B 1/24* | (2006.01) | |
| *A21B 1/46* | (2006.01) | |
| *B65G 19/02* | (2006.01) | |
| *B65G 25/10* | (2006.01) | |
| *B65G 35/08* | (2006.01) | |
| *F27D 3/06* | (2006.01) | |
| *B65B 53/06* | (2006.01) | |
| *B65G 23/42* | (2006.01) | |
| *B65B 35/44* | (2006.01) | |
| *B65B 35/24* | (2006.01) | |
| *F27D 3/00* | (2006.01) | |
| *H05B 3/00* | (2006.01) | |

(52) U.S. Cl.
CPC ............ *B65B 53/063* (2013.01); *B65G 19/02* (2013.01); *B65G 23/42* (2013.01); *B65G 25/10* (2013.01); *B65G 35/08* (2013.01); *F27D 3/06* (2013.01); *B65H 2701/1766* (2013.01); *F27D 3/003* (2013.01); *H05B 3/0004* (2013.01)

(56) References Cited

U.S. PATENT DOCUMENTS

| | | | | |
|---|---|---|---|---|
| 2,200,405 | A * | 5/1940 | Watson | A47J 37/06 |
| | | | | 99/358 |
| 2,344,373 | A * | 3/1944 | Stainbrook | H05B 3/0004 |
| | | | | 99/358 |
| 2,776,358 | A * | 1/1957 | Sturr | H05B 3/0004 |
| | | | | 99/358 |
| 3,310,150 | A | 3/1967 | Southard | |
| 3,632,962 | A * | 1/1972 | Cherniak | H05B 3/0004 |
| | | | | 219/200 |
| 3,966,972 | A * | 6/1976 | Theimer | A61N 1/04 |
| | | | | 426/90 |
| 4,016,297 | A * | 4/1977 | Theimer | A23L 3/005 |
| | | | | 426/90 |
| 4,075,949 | A | 2/1978 | Davis | |
| 4,323,152 | A | 4/1982 | Wiknich | |
| 4,476,973 | A | 10/1984 | Kessler | |
| 4,476,976 | A | 10/1984 | Smith | |
| 4,484,676 | A | 11/1984 | Plumridge et al. | |
| 4,584,466 | A | 4/1986 | De Mola | |
| 4,592,273 | A | 6/1986 | Yonezawa | |
| 4,603,770 | A | 8/1986 | Hartness | |
| 5,042,392 | A | 8/1991 | Brethorst | |
| 5,055,312 | A * | 10/1991 | Hildebrand | A47J 36/2483 |
| | | | | 426/107 |
| 5,069,920 | A * | 12/1991 | Hildebrand | F24C 7/00 |
| | | | | 426/234 |
| 5,115,907 | A | 5/1992 | Pomara, Jr. | |
| 5,195,630 | A | 3/1993 | Donovan et al. | |
| 5,232,609 | A * | 8/1993 | Badinier | A21B 3/155 |
| | | | | 249/102 |
| 5,320,212 | A | 6/1994 | Mcintosh et al. | |
| 5,320,213 | A | 6/1994 | Mcintosh et al. | |
| 5,850,904 | A | 12/1998 | Debrosse et al. | |
| 6,419,971 | B1 * | 7/2002 | Mather | A23L 5/13 |
| | | | | 426/510 |
| 6,852,242 | B2 | 2/2005 | Sun et al. | |
| 7,269,935 | B2 | 9/2007 | Jafari | |
| 7,367,445 | B2 | 5/2008 | Mazurek | |
| 9,028,902 | B2 | 5/2015 | Evseev | |
| 9,103,595 | B2 | 8/2015 | Ciurkot | |
| 9,476,647 | B2 | 10/2016 | Yang et al. | |
| 9,745,137 | B1 * | 8/2017 | McCafferty | B65G 47/54 |
| 2005/0211101 | A1 * | 9/2005 | Finnie, II | A21B 3/138 |
| | | | | 99/279 |
| 2010/0326982 | A1 * | 12/2010 | Yamada | A23L 3/10 |
| | | | | 219/538 |
| 2012/0228283 | A1 * | 9/2012 | Ochoa Gonzalez | H05B 3/023 |
| | | | | 219/482 |
| 2013/0161156 | A1 | 6/2013 | Ono | |
| 2015/0147454 | A1 * | 5/2015 | Russell-Maynard | A23K 10/26 |
| | | | | 426/576 |
| 2016/0150905 | A1 * | 6/2016 | Van Oord | A47J 27/004 |
| | | | | 426/244 |
| 2018/0027824 | A1 * | 2/2018 | Roso | A21D 13/32 |

OTHER PUBLICATIONS

Coarse panko crumbs make light coatings by Candy Sagon, The Washington Post, Oct. 30, 2002 URL: https://www.chicagotribune.com/news/ct-xpm-2002-10-30-0210300401-story.html.

* cited by examiner

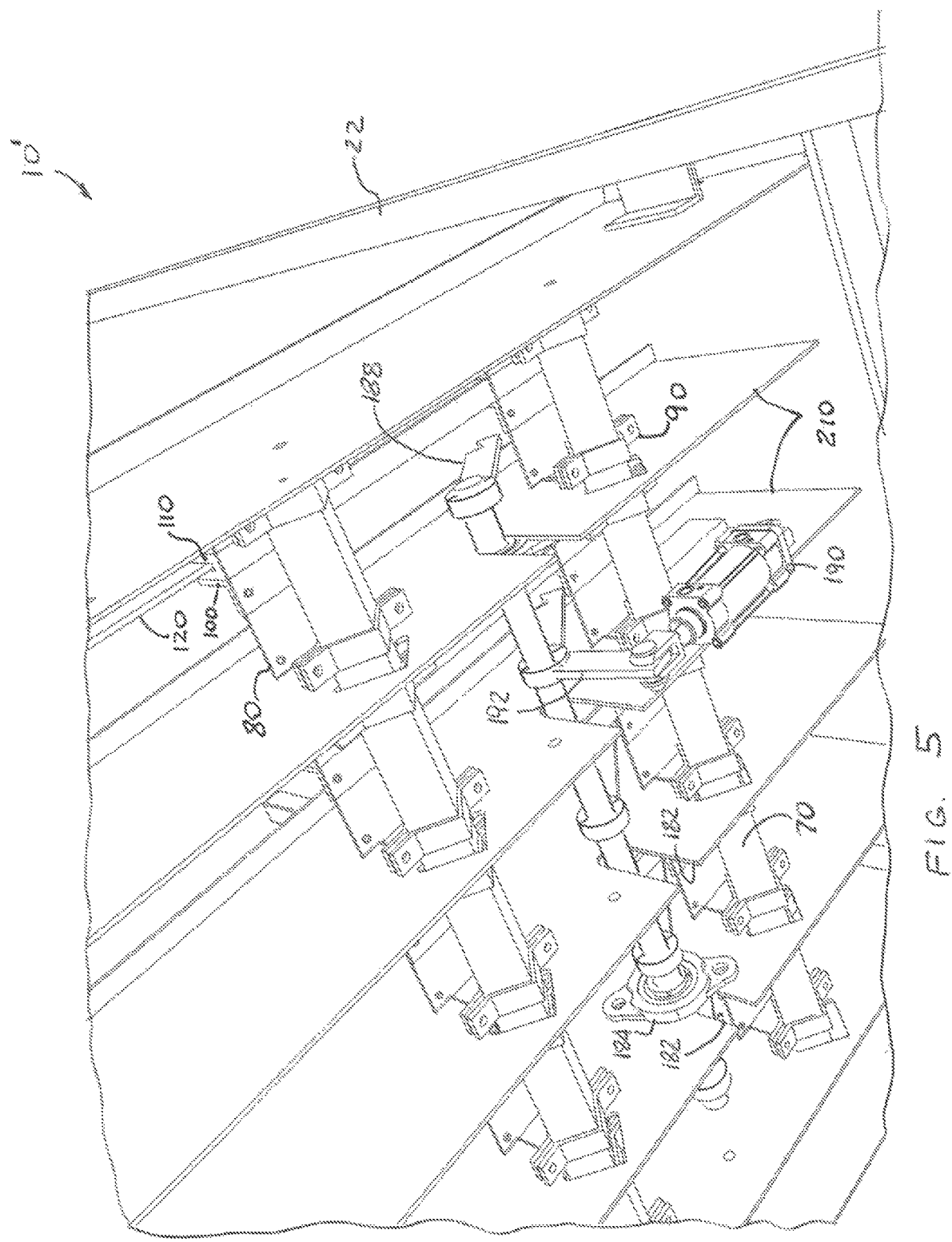

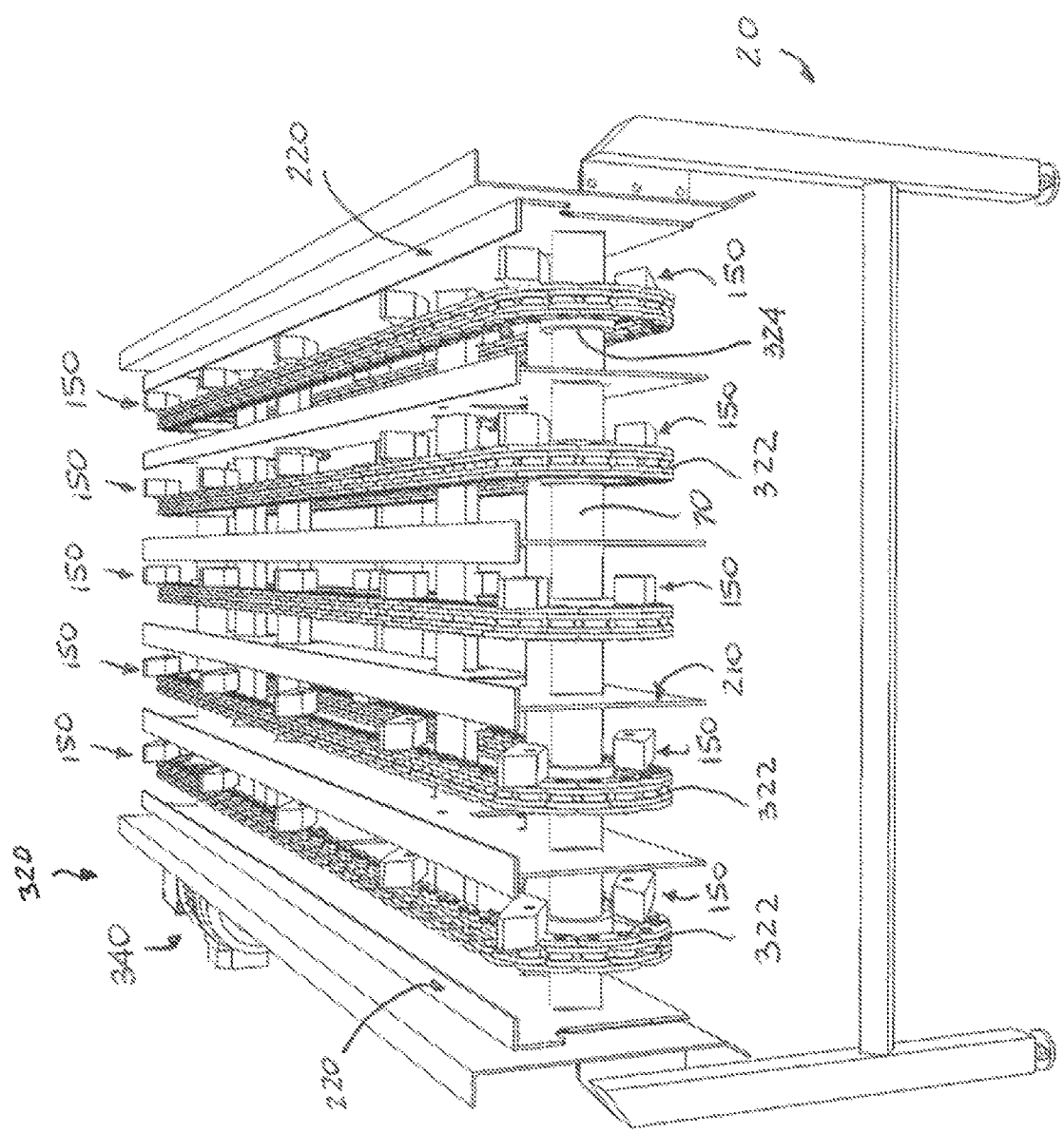

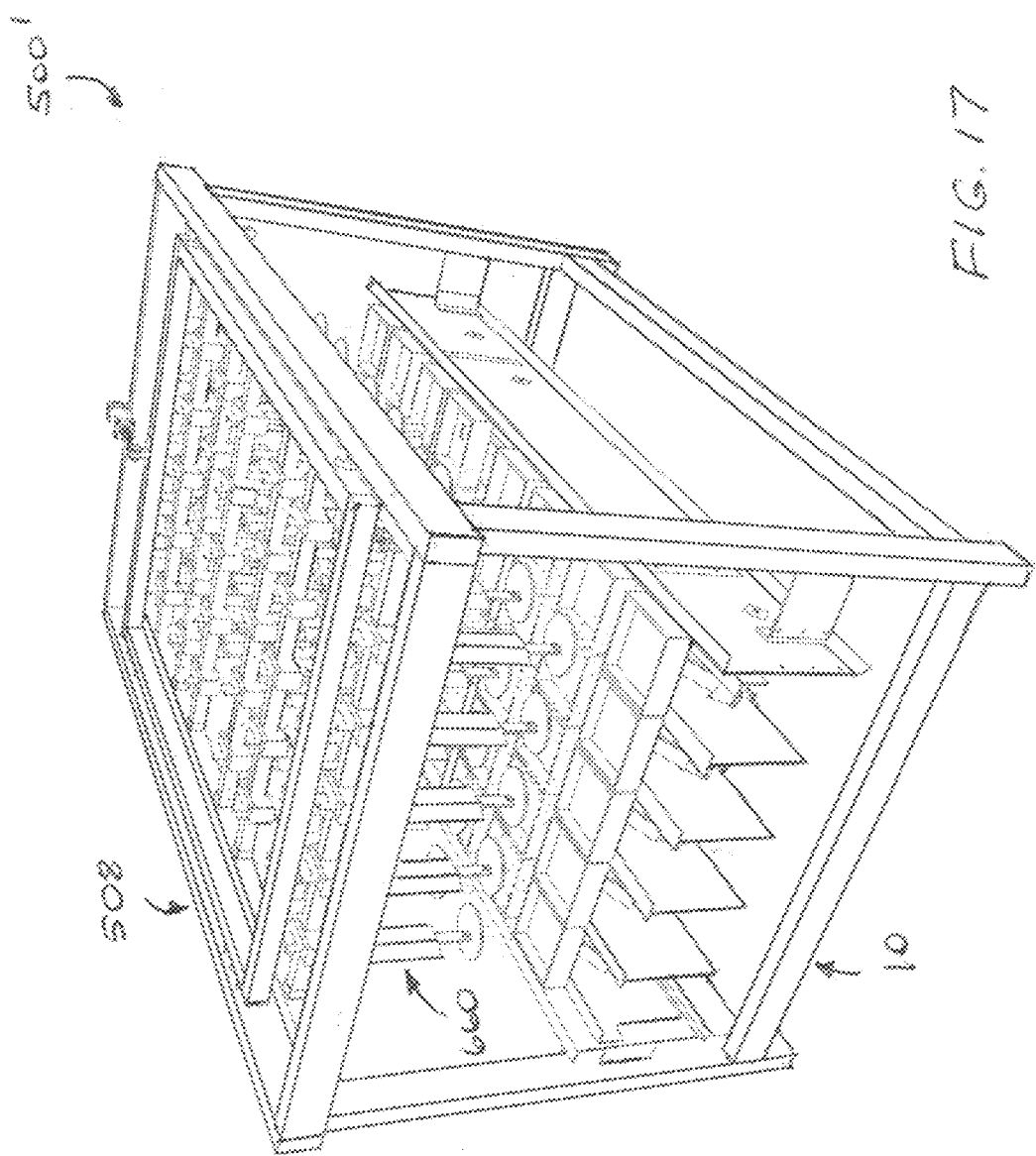

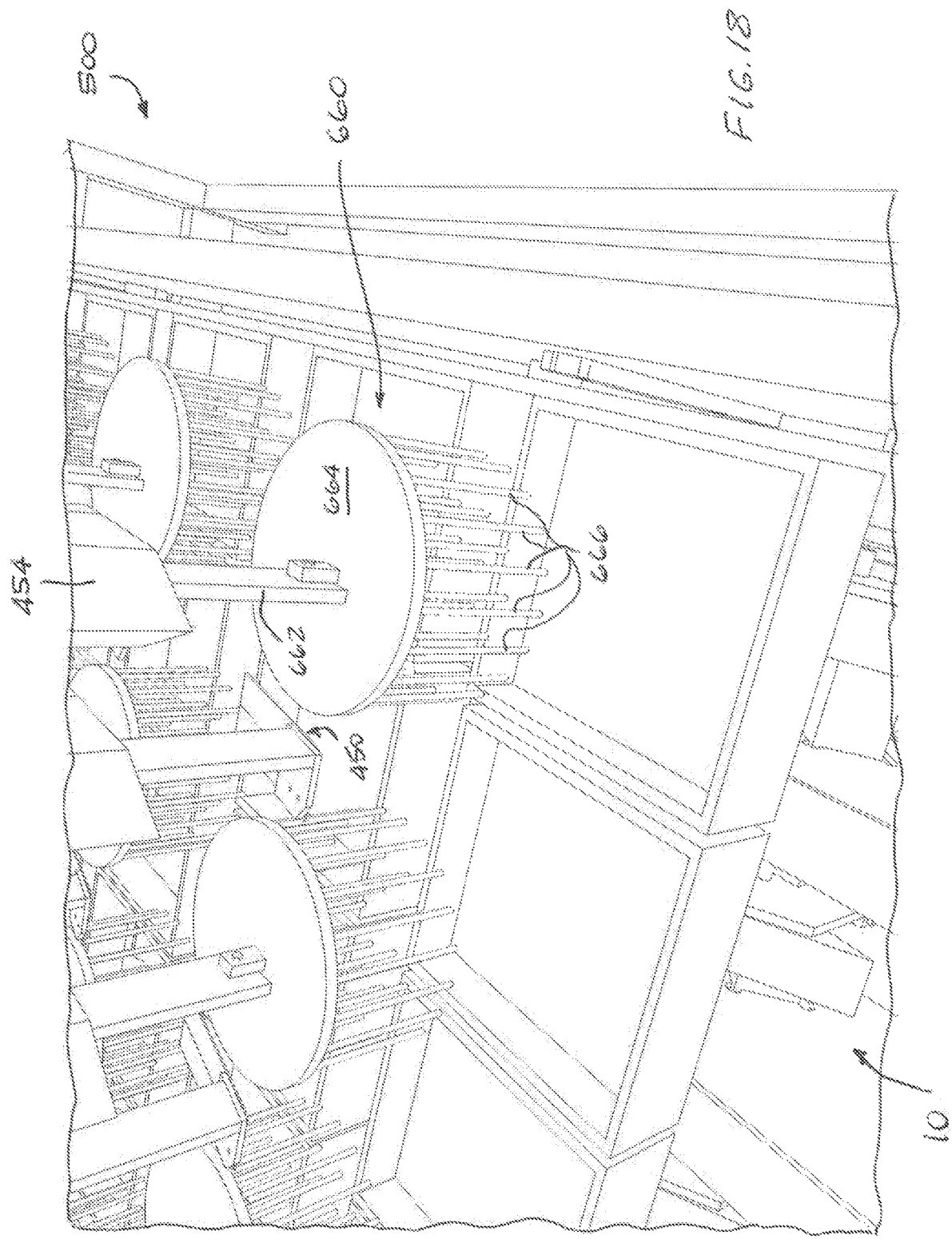

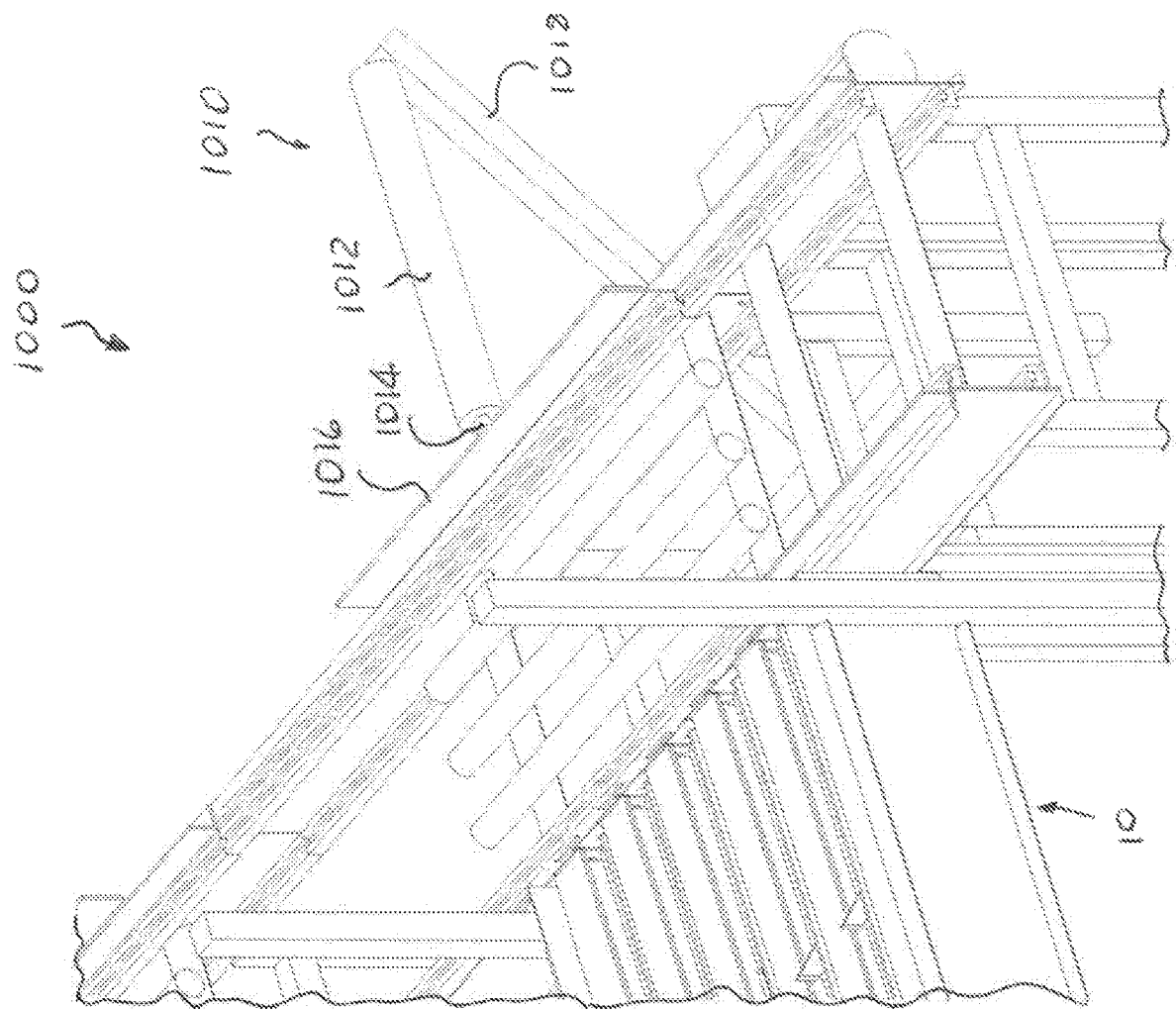

FIG. 26

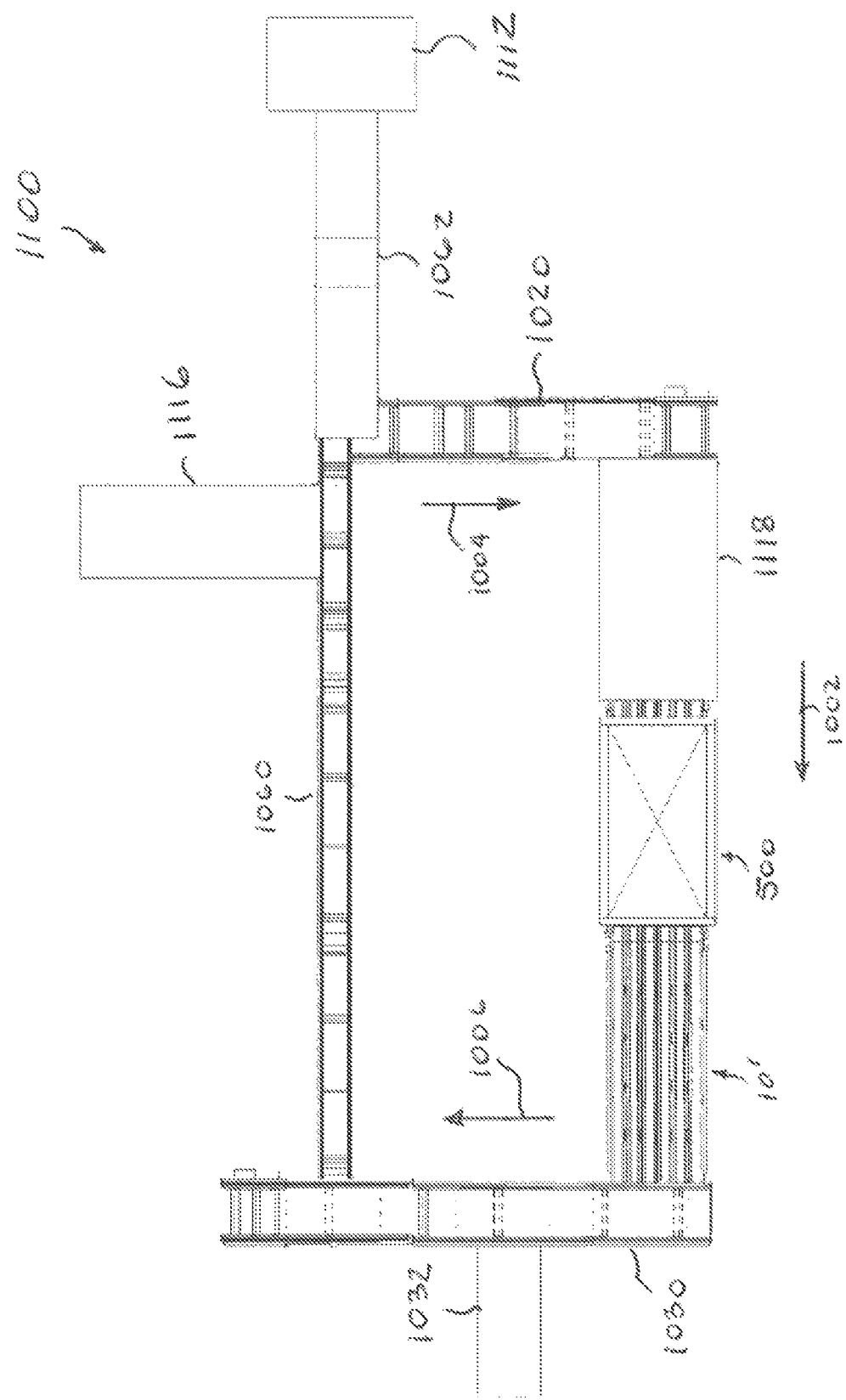

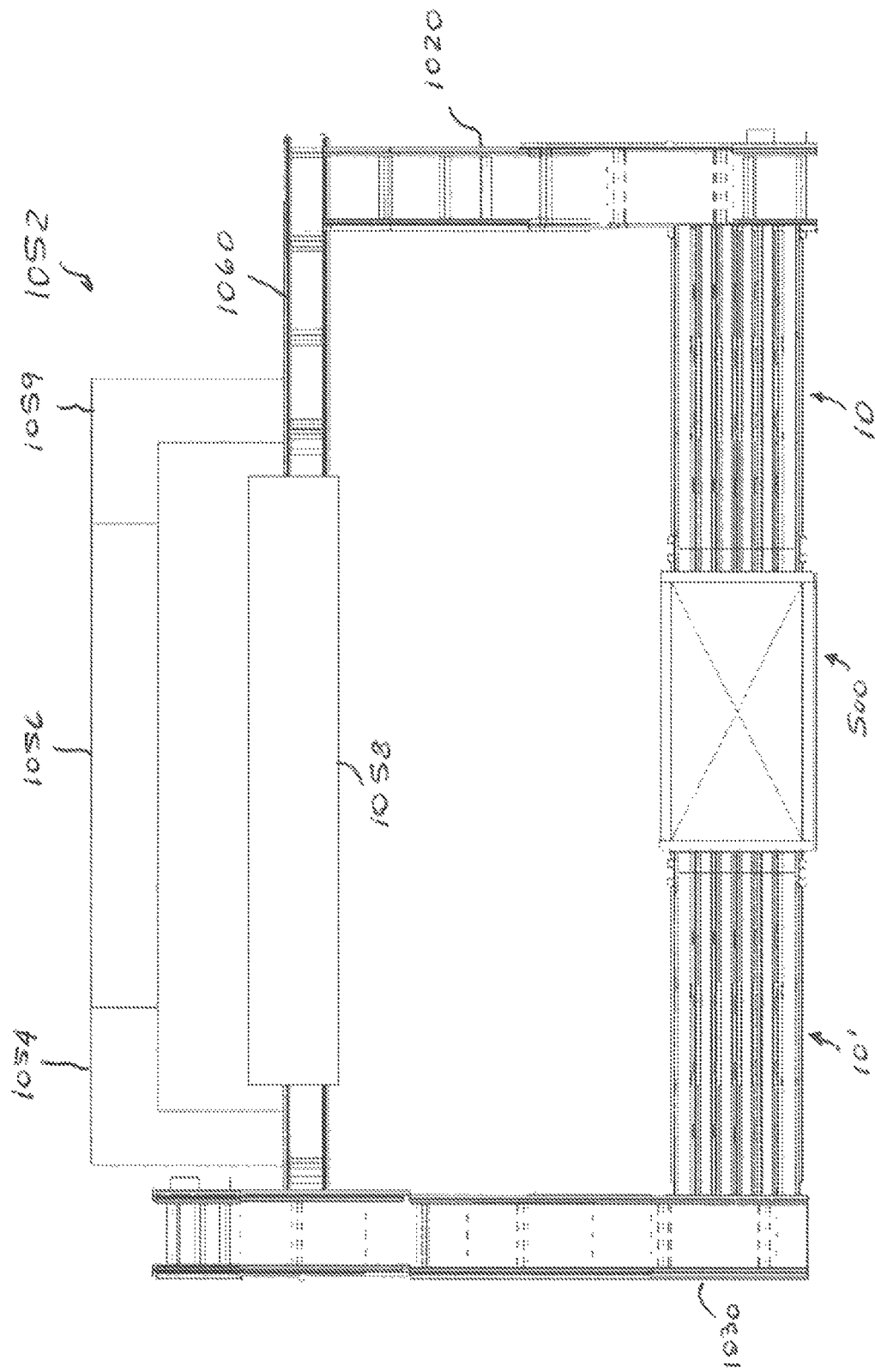

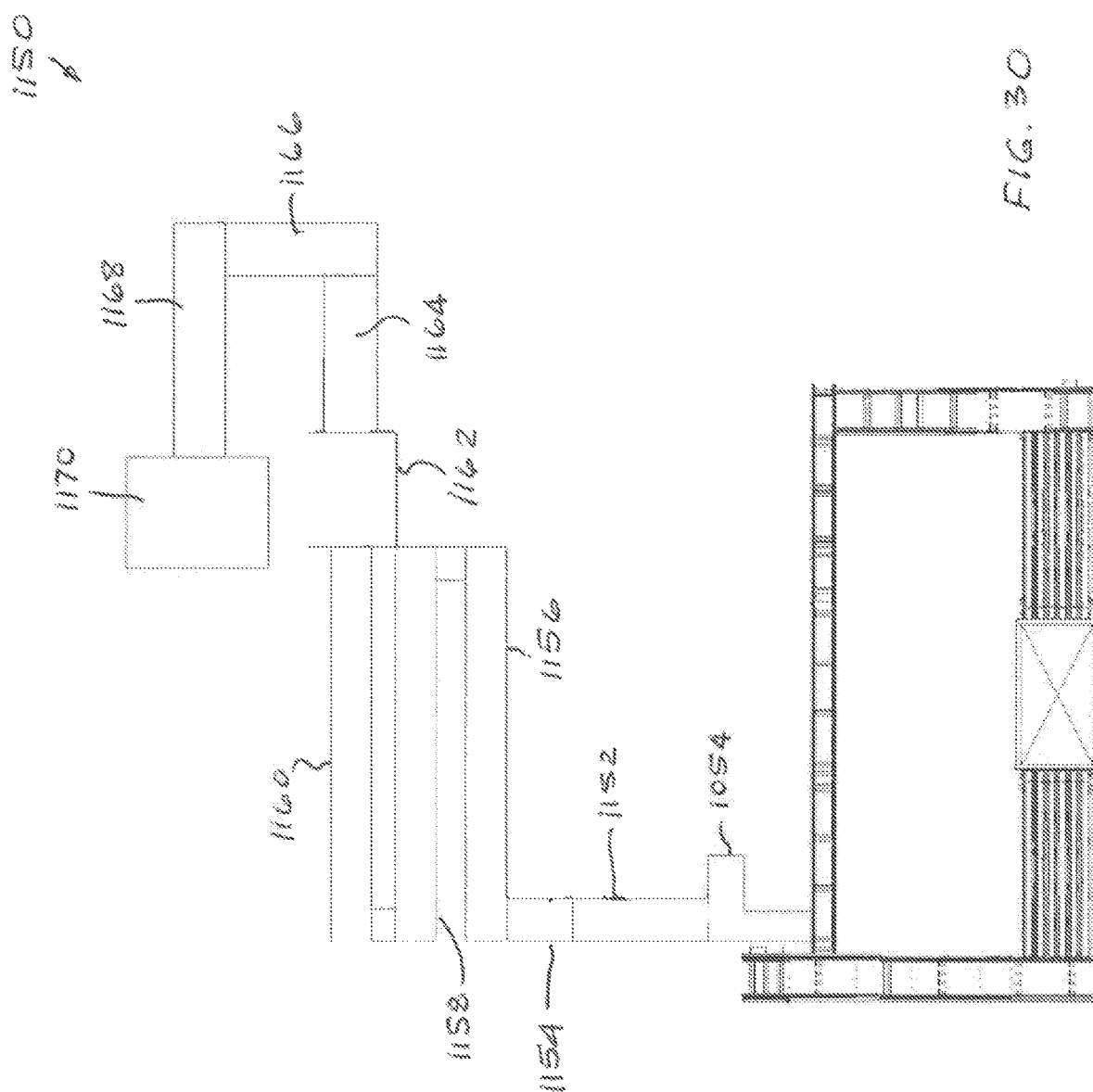

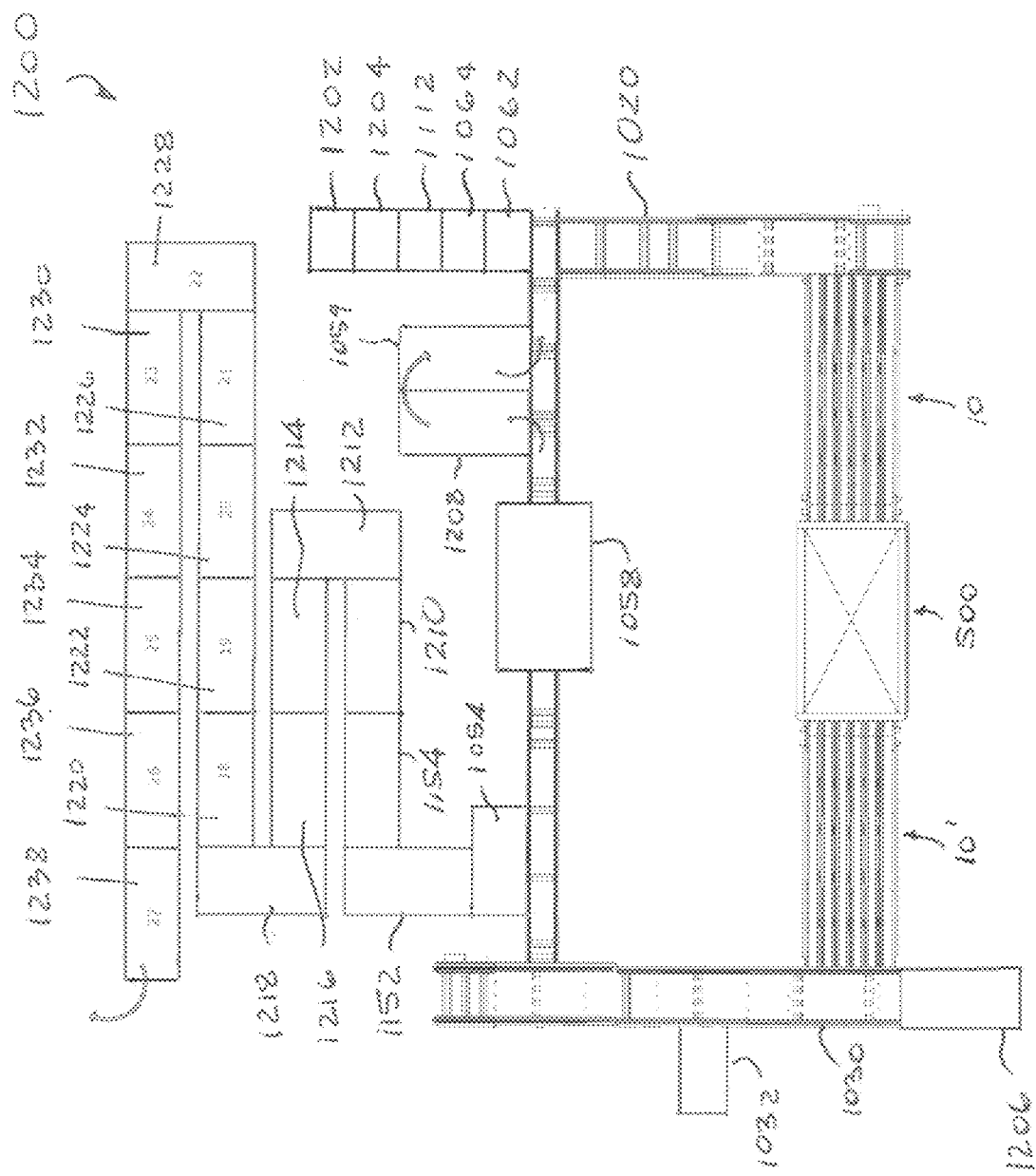

MATERIAL PROCESSING SYSTEM

CROSS-REFERENCE TO RELATED APPLICATIONS

The present application is related to and claims priority from and a benefit of a provisional U.S. patent application No. 62/379,471, tilted "ELECTRICAL RESISTANCE COOKING APPARATUS" and filed on Aug. 25, 2016 by applicant ZME, LLC; a provisional U.S. patent application No. 62/379,448, tilted "CONVEYOR WITH A LIFTING DEVICE" and filed on Aug. 25, 2016 by applicant ZME, LLC; and a provisional U.S. patent application No. 62/379, 546, tilted "DOUGH COOKING PRODUCTION LINE" and filed on Aug. 25, 2016 by applicant ZME, LLC. The present application is closely related to a U.S. non-provisional patent application Ser. No. 15/388,484, titled "APPARATUS, SYSTEM AND METHOD FOR MATERIAL HANDLING AND/OR PROCESSING" and filed on Dec. 22, 2016 by applicant ZME, LLC and issued as U.S. Pat. No. 9,745,137 B2 on Aug. 29, 2017. The present application is also closely related to a U.S. non-provisional patent application Ser. No. 15/613,881, titled "MATERIAL HANDLING APPARATUS AND METHOD" and filed on Jun. 6, 2017 by applicant ZME, LLC, now issued as U.S. Pat. No. 10,233,027 B1 on Mar. 19, 2019. The foregoing references are hereby incorporated herein by reference in their entirety.

STATEMENT REGARDING FEDERALLY SPONSORED RESEARCH AND DEVELOPMENT

N/A

REFERENCE TO SEQUENCE LISTING, A TABLE, OR A COMPUTER PROGRAM LISTING COMPACT DISC APPENDIX

N/A

BACKGROUND

1. Technical Field

The subject matter relates to material processing systems. It further relates to a production system comprising oven(s) for cooking or baking product with electrical resistance and one or more conveyors.

2. Description of Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, production line system(s) may utilize conveyors for advancing product(s) in material handling and/or processing applications. Generally, production line(s) may utilize robotic devices for placing the product onto conveyor or removing the product therefrom. Generally, production line(s) may utilize devices configured to urge product movement in a selected direction. The production systems can be employed in food processing applications. Some of the disadvantages of the currently employed food processing systems are related to use of belt or chain conveyors resulting in greater than desirable maintenance costs and less than desirable accuracy of positioning containers with materials.

BRIEF DESCRIPTION OF THE DRAWINGS

The accompanying drawings are incorporated in and constitute part of the specification and illustrate various embodiments. In the drawings:

FIG. 5 illustrates a partial 3-D bottom view of the conveyor of FIG. 4;

FIG. 6A illustrates a 3-D view of an exemplary conveyor configured to advance multiple rows of materials;

FIG. 17 illustrates a 3-D view of an exemplary apparatus configured and operable for cooking or baking dough;

FIG. 18, illustrates a partial enlarged 3-D view of the apparatus of FIG. 17;

FIG. 24A illustrates a partial 3-D view of the system for processing material, particularly illustrating a device configured to change a direction of the material movement;

FIG. 26 illustrates a schematic diagram of an exemplary material processing system;

FIG. 28 illustrates a schematic diagram of an exemplary material processing system;

FIG. 29 illustrates a schematic diagram of an exemplary material processing system;

FIG. 30 illustrates a schematic diagram of an exemplary material processing system; and FIG. 31 illustrates a schematic diagram of an exemplary material processing system.

DETAILED DESCRIPTION OF EXEMPLARY EMBODIMENTS

Figure 1:
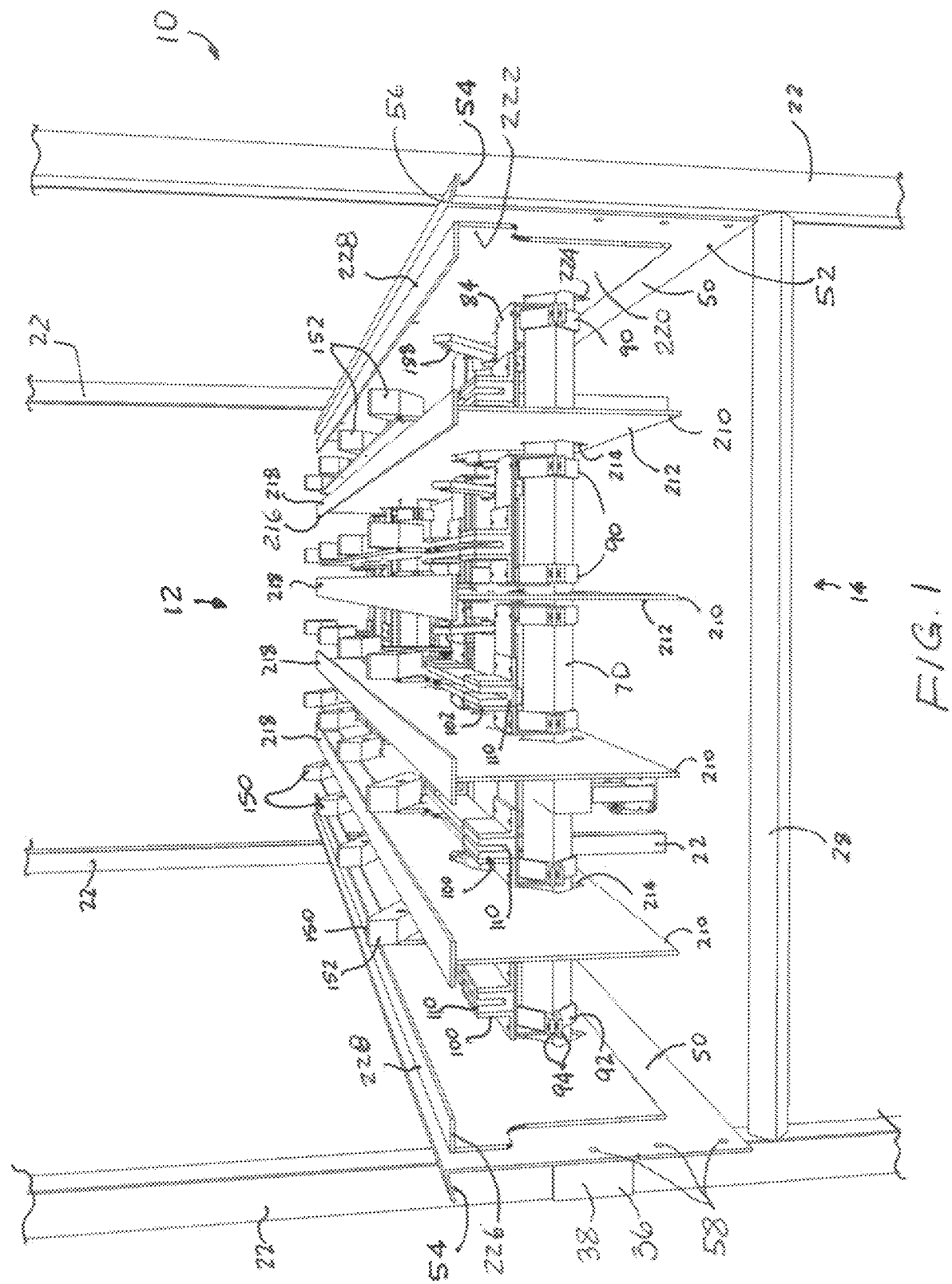
FIG. 1 illustrates a 3-D view of an exemplary conveyor configured to advance multiple rows of materials.

Prior to proceeding to the more detailed description of the present invention, it should be noted that, for the sake of clarity and understanding, identical components which have identical functions have been identified with identical reference numerals throughout the several views illustrated in the drawing figures.

The following detailed description is merely exemplary in nature and is not intended to limit the described examples or the application and uses of the described examples. As may be used herein, the words "example", "exemplary" or "illustrative" means "serving as an example, instance, or illustration." Any implementation described herein as "example", "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure.

References in the specification to "one embodiment", "an embodiment", "an exemplary embodiment", "another embodiment", "a presently preferred embodiment", "an alternative embodiment", "one variation", "a variation" and similar phrases mean that a particular feature, structure, or characteristic described in connection with the embodiment or variation, is included in at least an embodiment or variation of the invention. The phrase "in an embodiment", "in one variation" or similar phrases, as may be used in various places in the specification, are not necessarily meant to refer to the same embodiment or the same variation.

For purposes of description herein, the directional and/or relationary terms such as "upper", "top", "lower", "bottom", "left", "right", "rear", "back", "front", "apex", "vertical", "horizontal", "lateral", "exterior", "interior" and derivatives thereof are relative to each other and are dependent on the specific orientation of an applicable element or article, and are used accordingly to aid in the description of the various embodiments and are not necessarily intended to be construed as limiting. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The term "or" when used in this specification is not meant to be exclusive; rather the term is inclusive, meaning either or both.

The term "couple" or "coupled", when used in this specification, refers to an indirect or direct physical connection between the identified elements, components, or objects. Often the manner of the coupling will be related specifically to the manner in which the two coupled elements interact.

The term "directly coupled" or "coupled directly," when used in this specification, refers to a physical connection between identified elements, components, or objects, in which no other element, component, or object resides between those identified as being directly coupled.

The terms "removable", "removably coupled", "removably disposed," "readily removable", "readily detachable", "detachably coupled", "separable," "separably coupled," and similar terms, when used in this specification, refer to structures that can be uncoupled, detached, uninstalled, or removed from an adjoining structure with relative ease (i.e., non-destructively, and without a complicated or time-consuming process), and that can also be readily reinstalled, recoupled, or coupled to the previously adjoining structure.

As may be used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

It be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Anywhere the term "comprising" is used, embodiments and components "consisting essentially of" and "consisting of" are expressly disclosed and described herein."

The terms and words used in the following description are not limited to the bibliographical meanings, but, are merely used by the inventor to enable a clear and consistent understanding of the invention. Accordingly, it should be apparent to those skilled in the art that the following description of exemplary embodiments of the present disclosure are provided for illustration purpose only and not for the purpose of limiting the present disclosure.

It is to be understood that the singular forms "a," "an," and "the" include plural referents unless the context clearly dictates otherwise. Thus, for example, reference to "a component surface" includes reference to one or more of such surfaces.

The particular embodiments of the present disclosure generally provide apparatus, method and system for processing material.

In particular embodiments the system is configured to bake or cook dough. The dough may mean here a mixture of dry and wet ingredients with a rising agent, as used in making bread, croutons, bread/panko crumbs, etc. The dough may mean here a mixture of dry and wet ingredients, as used in making crackers and biscuits. The dough may mean here a batter that is used for making cupcakes and the like pastry products.

In particular embodiments, the apparatus is configured to cook or bake dough and comprises conveyor(s) configured to move containers with raw or cooked dough and an oven configured to cook or bake dough.

In particular embodiments, the apparatus comprises oven(s) for cooking or baking dough with electrical resistance.

In particular embodiments, the apparatus comprises a conveyor with a pair of frames movable by a powered member.

In particular embodiments, the apparatus comprises conveyor(s) with a ratcheting mechanism comprising pivoting dogs and a powered member.

In particular embodiments, the apparatus comprises conveyor(s) configured and operable to change elevation of containers with dough prior to or after conveying operation.

The system may be referred to as a production line.

The system comprises at least one material processing apparatus (or an apparatus), generally designated as 1001, that is configured to process material. Material processing is to mean herein a transformation of material from one state into another. A non-limiting example of this transformation is a transformation of raw dough into baked or cooked end product. Material processing is also to mean herein a combination of one material with one or more other materials. In a non-limiting example of this combination, the material such as cans or bottles are being shrink-wrapped on a pallet for shipping purposes or are being releaseably connected therewithin with a plastic cage. In a combination, the material to be processed can comprise single or multiple components. A non-limiting example of material comprising multiple components can be a six-pack of bottles or cans containing liquid.

The material may be processed in a combination with a container. The container can be an open container or a partially closed container. A non-limiting example of an open container can be a pallet. In this example the material will be placed onto a surface of the pallet. Non-limiting examples of the partially closed container can include a container 600, to be described below, or any other container with a cavity (or hollow interior). In this example the material will be placed, at least partially, into the cavity of the container.

The apparatus defines an infeed end where the non-processed material enters apparatus and a discharge end where the processed material exits the apparatus. The infeed and discharge ends can be aligned with each other along the conveying direction of the material or can be disposed at angle(s) relative to the conveying direction.

The material processing apparatus can be also referred to as a processing station or processing portion of the system.

The system also comprises at least one conveyor configured to convey or move material to, within or from the apparatus. The conveyor can be an index/ratchet type conveyor. The conveyor can be a belt type conveyor. The conveyor can be a chain type conveyor. The conveyor can be a gravity-type conveyor. The conveyor can be a roller type conveyor. The conveyor can be configured to move material continuously, i.e. without stopping or pausing movement of the material or incrementally, where the material remains at rest (not moving) for a pre-selected period of time.

The conveyor can be also referred to as a conveying station, conveying portion, or conveying branch of the system.

The system can comprise a means for changing a direction of movement of the material either prior to or after processing. Such means may comprise one or more material lifting devices. The material lifting device can be also used when there is a need to change elevation of the material either before or after processing. Such means may comprise arc-shaped conveyors. Such means may comprise powered material advancing devices that are positioned and operable to advance or move the material from one conveyor onto another conveyor for a movement in a different direction. Such means may comprise robotic device(s) configured and operable to move material from one conveyor onto another conveyor moving in a different direction.

The system can comprise other stations or portions configured to carry-out a specific function of the system. Such function may include material loading, unprocessed material unloading, material or product inspection, container loading/unloading, etc. Material processed by the apparatus may be further post-processed by one or more different apparatuses and even at one or more different manufacturing facilities.

The conveyor configured to convey or move material to, within or from the apparatus can be an index/ratchet conveyor 10 as described and illustrated in a U.S. non-provisional patent application Ser. No. 15/388,484, titled "APPARATUS, SYSTEM AND METHOD FOR MATERIAL HANDLING AND/OR PROCESSING" and filed on Dec. 22, 2016 by applicant ZME, LLC and in a U.S. non-provisional patent application Ser. No. 15/613,881, titled "MATERIAL HANDLING APPARATUS AND METHOD" and filed on Jun. 6, 2017 by applicant ZME, LLC.

Figure 2:
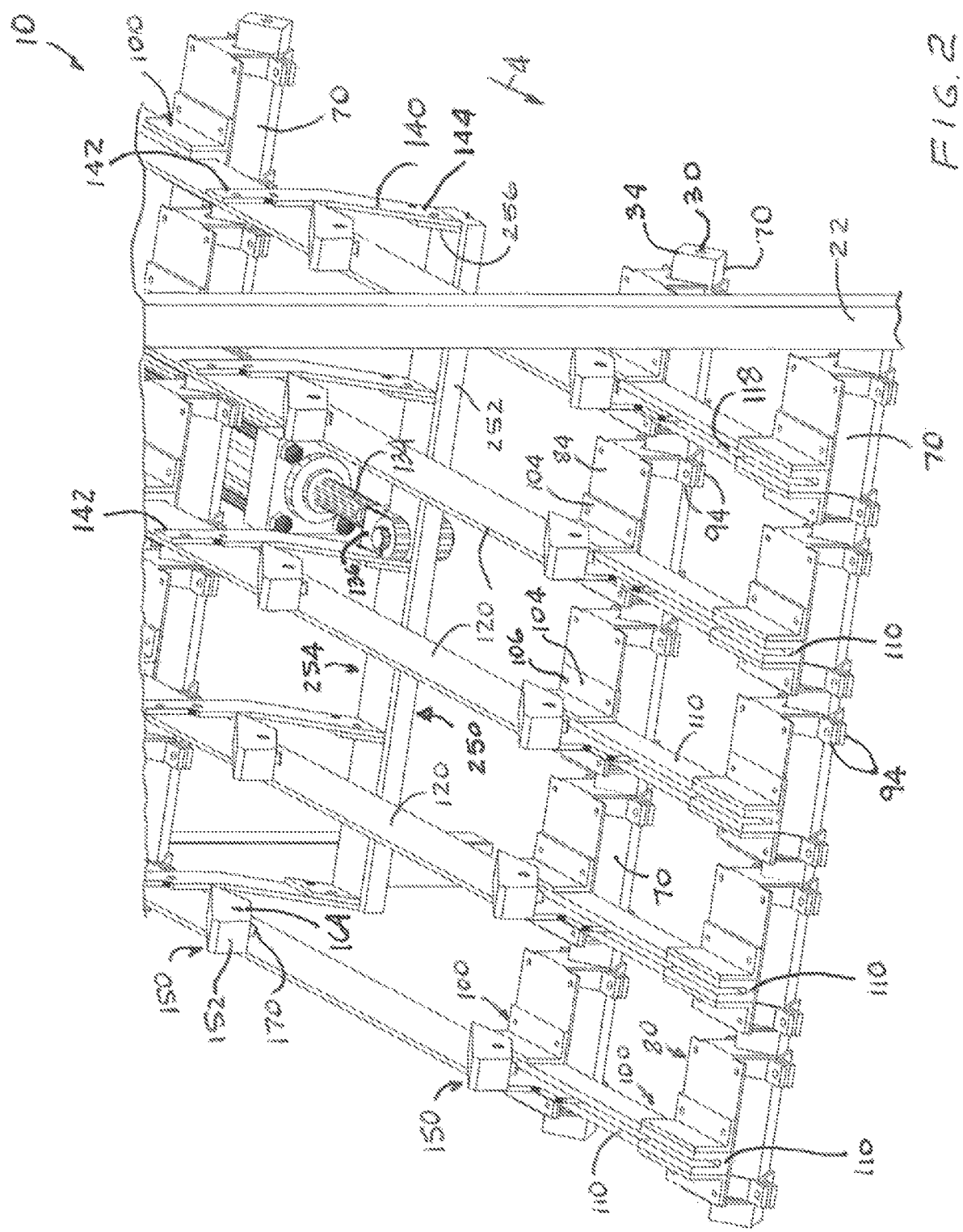
FIG. 2 illustrates a partial 3-D top view of the conveyor of FIG. 1.
Figure 3:
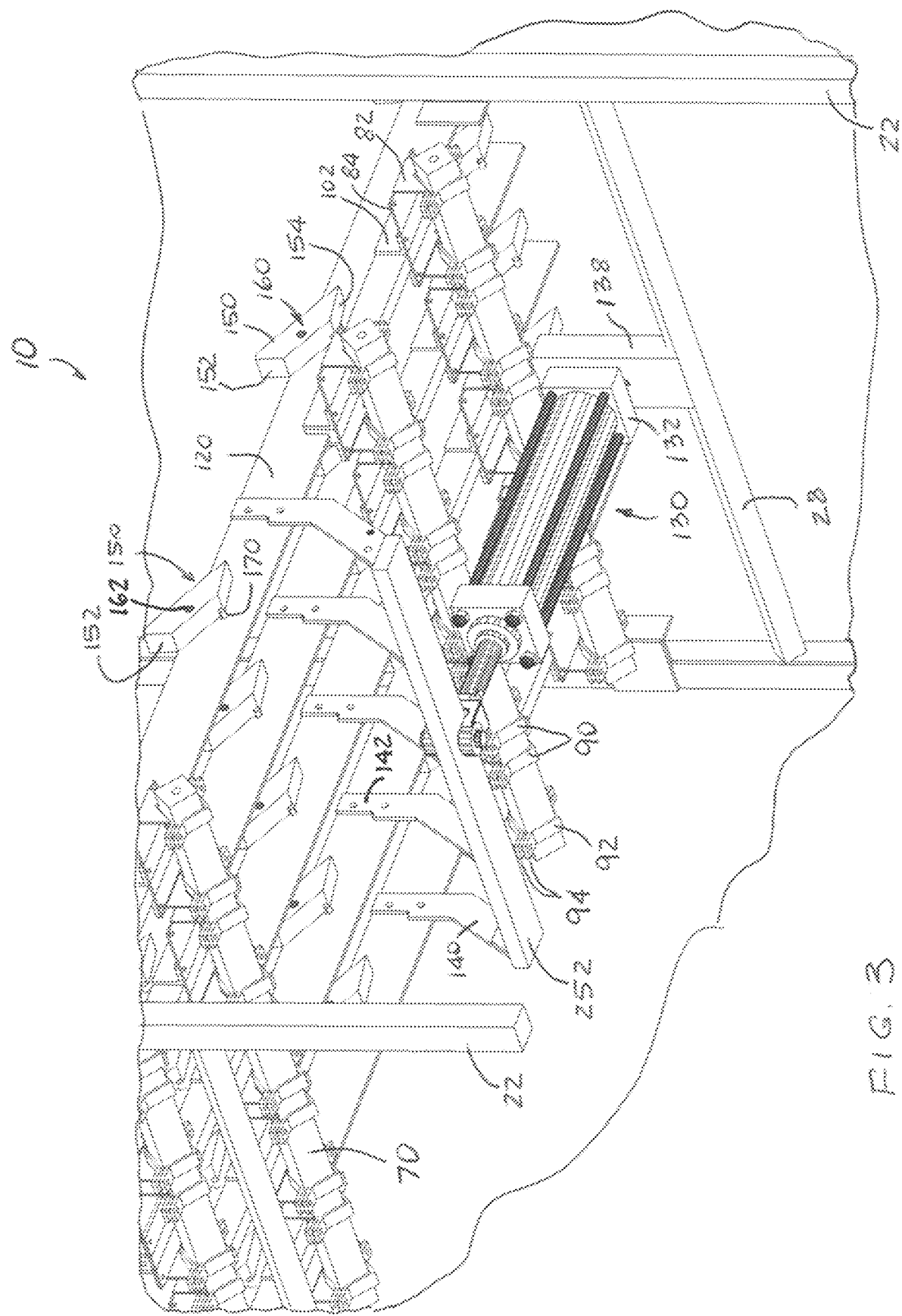
FIG. 3 illustrates a partial 3-D bottom view of the conveyor of FIG. 1.

For the sake of reader convenience, the conveyor 10 is briefly described herewith in a reference to FIGS. 1-3.

The conveyor 10 is configured to transport or advance a plurality of rows of materials 2 with a plurality of materials 2 in each row in a linear transport or conveyance path 4. The conveyor 10 is also configured to transport or advance, along the linear transport or conveyance path 4, a plurality of materials disposed in a plurality of rows and in a series with each other within each row. The conveyor 10 defines an inlet end 12 and an outlet end 14. The linear transport or conveyance path 4 is defined herewithin as a path from the inlet end 12 to the outlet end 14. The linear transport or conveyance path 4 can be also referred to as a pathway. In other words, the conveyor 10 is configured to convey an array of materials 2 along the conveyance path 4, the array comprising a plurality of rows of materials 2 disposed along the conveyance path 4 with a plurality of materials 2 disposed in each row in a direction normal to the conveyance path.

The conveyor 10 comprises a frame 20 that extends between the inlet end 12 and the outlet end 14 of the conveyor 10. The exemplary frame 20 is illustrated as having a rectangular shape and comprises four end members 22 that are positioned vertically during use of the conveyor 10. A bottom end 24 of one or more of the end members 22 can be adapted with an adjustable member or a foot 26. Such adjustable member or foot 26 can be threadably coupled to the bottom end 24 with a threaded connection. The adjustable member or foot 26 can be provided as any one of pad, a wheel or a caster. Each pair of the end members 22 can be coupled therebetween with an end brace 28, positioned traverse to the linear direction 4, particularly when the conveyor 10 is configured as a free-standing conveyor, i.e., a conveyor that is not secured to a surface or an object. In an example, the brace 28 can be welded, at each end thereof, to an exterior surface of the respective end member 22 or can be detachably attached thereto, with fasteners. In an example, each end of the end brace 28 can be adapted with a threaded aperture 30 and the respective end member 22 can be adapted with an aperture 32 that is aligned with the threaded aperture 30 during assembly. The end brace 28 can be provided as a tubular member. When the end brace 28 can be provided as the tubular member, each end of the end brace 28 can be closed with a plate member 34 carrying such threaded aperture 30. In an example, the threaded aperture 30 can be replaced with a plain aperture and a nut fastener welded to or caged on a surface of the plate member 34. Furthermore, when the end brace 28 is provided as the tubular member with a square or rectangular periphery, it can be assembled in absence of horizontally disposed surfaces. This aspect is at least advantageous in sanitary applications to at least minimize collection of debris or waste product falling from carried load(s) 2 during transport or processing. It is also contemplated herewithin that more than one brace 28 can be provided on one or both ends of the conveyor 10.

The exemplary frame 20 can also comprise two longitudinal side members 50. Each side member 50 spans the distance between two end members 22 positioned on one side of the conveyor 10, where the side is oriented along the conveyance path 4. In other words, one end member 22 is positioned on one side of the inlet end 12 and the other end member 22 is positioned on the same side of the outlet end 14. The side member 50 can be welded, at each end thereof to a respective end member 22. The side member 50 can be detachably attached at each end thereof to a respective end member 22. In an example, each end of the side members 50 can be fastened directly to the end member 22, in any of the conventional fastening arrangements. In an example, each end member 22 can be provided with an L-shaped bracket 36 having one leg 38 thereof being welded to the surface of the end member 22 and another leg 40 thereof being configured for detachable attachment to the end of the side member 50. In an example, the side member 50 can be provided as a tubular member. In an example, the side member 50 comprises a first wall 52 and a second wall 54 that is disposed normal to the first wall 52. The second wall 54 is illustrated as being faced outwardly but can also face inwardly during use of the conveyor 10. Such shape of the side member 50 can be achieved by bending side member 50 from a sheet of plate material or providing the resulting L-shape cross-section by an extrusion process. For the reasons to be explained later, each end of the first wall 52 can extend outwardly past the peripheral boundary of the frame 20 and comprises aperture(s) 58 disposed adjacent and spaced from such each end. It is not necessary for the end members 22 to extend, in a vertical direction, past the second wall 54.

It is also contemplated herewithin that the side members 50 can be indirectly or directly attached to other members or structures. In an example, the side members 50 can be attached to vertical walls of a pit-like structure. In an example, the side members 50 can be attached to upright members. In an example, the side members 50 can be disposed on support members, such as shortened end members 22. In an example, the side members 50 can be configured to for attachment to a generally horizontal surface, for example such as a floor surface.

Thus, the frame 20 or just the side members 50 can be also defined herewithin as means for supporting remaining components of the conveyor 10.

The conveyor 10 comprises braces 70 that are coupled stationary, at each end thereof, to the frame 20 and, more particularly to the first wall 52 of each side member 50. Braces 70 are further disposed in series and in a spaced apart relationship with each other between the inlet end 12 and the outlet end 14 of the conveyor 10, with each brace 70 being disposed transverse to the pair of sides 50. Braces 70 can be either welded, at each end thereof, to a respective first wall 52 or being detachably attached, at each end thereof, to the respective first wall 52. One or more of the braces 70 can be provided as a tubular member. When one or more of the braces 70 being provided as the tubular member, it can be detachably attached to the first walls 52 in a manner described above in detachably attaching tubular end braces 28. Furthermore, when the brace 70 is provided as the tubular member with a square or rectangular periphery, it can be assembled in absence of horizontally disposed surfaces. In other words, each surface of such tubular member is inclined, at angles other than 90° to a horizontal or vertical plane. The brace 70 can also have a round periphery. It is not necessary for all braces 70 to have the same peripheral shape. The braces 70 can be spaced at equal or unequal distances from each other along the pathway 4. In other words, it is not necessary that braces 70 are disposed at equal distances from each other. Braces 70 can be provided as a component of the frame 20.

The conveyor 10 comprises support brackets 80 disposed stationary during use of the conveyor 10, with each support bracket 80 being permanently or detachably coupled to a respective brace 70. The bracket 80 can be configured as a U-shaped bracket. Each U-shaped bracket 80 comprises a pair of flanges 82 coupled to the respective brace 70 and further comprises a main portion 84 with at least one surface disposed substantially horizontally during use of the conveyor 10 and above the respective brace 70. It is not necessary that the main portion 84 is solid. The main portion 84 can contain material voids that do not impact operation of the conveyor 10. Each flange 82 can be permanently coupled to the respective brace 70, for example by a welding process. Each flange 82 can be detachably coupled to the respective brace 70, for example by using clamps 90. When clamps 90 are provided, they can be configured as a pair of hat-shaped clamp members having a main portion 92 and a pair of flanges 94, each with an aperture 96 formed through a thickness of the flange 94. One of the pair of hat-shaped clamp members 90 can be rigidly coupled, for example such as by welding, to each flange 82 of the support bracket 80. Thus, in an example, two (or a pair of) clamps 90 are provided for each support bracket 80 with the clamps 90 essentially caging the exterior surface(s) of the brace 70 and being coupled to each other with fasteners 96.

It is also contemplated herewithin that a size of one support bracket 80 can be adjusted to span the distance between a pair of braces 70 so that one support bracket can be supported by two braces 70. Alternatively, it is also contemplated herewithin that two or more brackets 80 can be supported on a single brace 70 by using intermediate member(s) (not shown).

The conveyor 10 comprises an indexing device. The indexing device comprises receptacles 100, carrying members 120, coupling member 140 and force exerting members 150 with stops 170. Each receptacle 100 is coupled stationary to a respective support bracket 80. Thus, in an embodiment of the conveyor 10, the receptacles 100 are disposed in series with each other between the inlet end 12 and the outlet end 14 of the conveyor 10 and further in series with each other across the width of the conveyor 10. In an embodiment, each receptacle 100 defines a pair of walls 102 disposed vertically and upstanding on the main portion 84 of a respective bracket 80. In an example, the walls 102 can be welded to the main portion 84. In an example, vertically disposed walls 102 can be detachably coupled to the main portion 84 by way of the flanges 104 with aperture(s) 106 formed through a thickness of each flange 104 that are aligned at assembly with complimentary aperture(s) (not shown) in the main portion 84. It would be understood that each wall 102 in a combination with the flange 104 can be provided as an L-shaped member, being either formed, molded, casted or extruded. The receptacle 100 can be also provided as a U-shaped member, defining the pair of walls 102. The receptacle 100 can comprise a metal, a plastic or a combination thereof. The receptacle 100 can comprise a material with a low friction coefficient, for example such as a self-lubricating bronze alloy. The receptacle 100 can be integrated with the support bracket 80 as a unitary one-piece construction. Such unitary one-piece construction can be provided by a welding process, by a molding process or by a casting process. The unitary one-piece construction may comprise different materials. In an example, the portion of the support bracket 80 can comprise metal while the portion of the receptacle 100 can comprise plastic or polymer material.

The indexing device can comprise optional liners 110. Each liner 100, when provided, comprises a material with a low friction coefficient. In example, such material can be an engineered plastic. The engineered plastic can be a thermoplastic polyethylene and, more specifically, an ultra-high-molecular-weight (UHMW) polyethylene. In an example, the engineered plastic can be an equivalent to the thermoplastic polyethylene. In an example, such material can comprise self-lubricating bronze alloy. When the receptacle 100 defines a pair of vertically disposed walls 102, the optional liners 110 can be coupled to the inner surfaces of the vertically disposed walls 102 or can be provide as a U-shaped member being caged between the vertically disposed walls 102 and resting on the main portion 84. The liner 110, when provided, can be fastened to a respective receptacle 100, can be secured thereto with adhesives or can be provided integral with the receptacle 100, for example during a molding process. The liner 110 can be also provided as a coating of a low-friction material on an inner surface of the wall 102.

The optional liner 110 can be sized to span a length of the receptacle 100 or even be sized to span a distance between furthest ends of a pair of adjacent receptacles 100.

The receptacle 100 or the optional liner 110 defines an inner space 118.

Each carrying member 120 is positioned for a reciprocal linear movement within the inner space 118. Each carrying member 120 is illustrated as a thin bar or a rail with a pair of flat surfaces, but can be provided in other shapes, for example such as a tubular shape. The carrying member 120 does not have to be solid throughout and can comprise material voids to reduce weight of the conveyor 10. The carrying member 120 may comprise metal, plastic and a combination thereof. When the carrying member 120 comprises metal, the liner 110 is configured to wear first during linear movement of the carrying member 120 within the receptacle 100. When the carrying member 120 comprises metal and receptacle 100 comprises plastic material at least on the inner surface of the wall 102, the liner 110 may not be needed. Likewise, when the carrying member 120 comprises, either partially or completely, plastic material and the receptacle 100 comprises metal, the liner 110 may not be needed. A length of the carrying member 120 can be selected so that the carrying member 120 does not extend past the inlet end 12 and/or the outlet end 14 during operation of the conveyor 10. A length of the carrying member 120 can be selected so that the carrying member 120 extends past the inlet end 12 and/or the outlet end 14 during operation of the conveyor 10. The carrying member 120 can extend to past the inlet end 12 and/or the outlet end 14 during operation of the conveyor 10 to position a row of force exerting members 150 very close to one or both ends of the load supporting members 210, 220 described in details below.

The indexing device can also comprise a powered member 130. Such powered member 130 can be provided as a component of the conveyor 10 and thus be an optional component of the indexing device. In either configuration, the powered member 130 is configured to provide a reciprocal linear movement of the carrying members 120. In an example, the powered member 130 can be a linear actuator. The linear actuator can be provided as an electrically, pneumatically or hydraulically operated device. The linear actuator can comprise a rotating drive screw and a drive nut that translates linearly on the drive screw during a rotation thereof. The rotation can be achieved by using a conventional electric motor. The powered member 130 can be a cylinder, either pneumatic or hydraulic. The cylinder 130 has a stationary portion 132 rigidly coupled at on end thereof to the frame 20. In an example, the stationary portion can be rigidly coupled to a mounting member 138 that is rigidly coupled to one of the ends of the frame 20, shown as the inlet end 12 of the conveyor 10. The cylinder 130 also has a movable portion 134 that moves in a linear direction. The distal end of the movable portion 134 can be configured as a U-shaped member 136.

In the embodiment of the conveyor 10, each carrying member 120 is coupled to the powered member 130 with coupling members 140 and a link 252. Each coupling member 140 comprises one end 142 thereof coupled, for example with fasteners or by welding, to a respective carrying member 120 and comprises a second end 144 is attached or coupled, either permanently or detachably, to a link 252. When the coupling member 140 is permanently coupled, the second end 144 can be welded to the link 252. When the coupling member 140 is detachably coupled, it can be coupled, with fasteners, to a flange 256 on the link 252. The flanges 256 are disposed, in a spaced apart relationship with each other, on the link 252. The second end 144 can be also adapted with a flange for a detachable coupling to a surface of the link 252, for example with fasteners. The coupling members 140 and the link 252 can define or comprise a linkage 250. The link 252 is disposed transverse to the load supporting members 210 (described further in this document) and has a pivotal connection 254 with an opposite end 134 of the powered member 130.

It will be understood that the linkage 250 is configured to move multiple carrying members 120 with a single powered member 130. In other words, the linkage 250 is configured to advance multiple rows of materials 2 with a single powered member 130.

It is also contemplated that each carrying member 120 can be adapted with a dedicated powered member 130. In this embodiment, the link 252 is not needed and the second end 144 of the coupling member 140 is configured for a pivotal attachment to the powered member 130.

The force exerting members 150 in the embodiment of the conveyor 10 of FIGS. 1-3 are disposed in series with each other between the inlet end 12 and the outlet end 14 of the conveyor 10. The spacing between a pair of adjacent force exerting members 150 is dependent on the size of the material 2 so that a single force exerting member 150 is provided for a single material 2. Each force exerting member 150 comprises a front end 152 and a rear end 154. The front end 152 is configured to abut the material 2. In an example, the rear end 154 is being configured heavier than the front end 152. In an example, the front end 152 can be lightened with apertures or material voids (not shown). In an example, the front end 152 can be configured smaller than the rear end 154. In an example, the rear end 154 can be adapted with additional weight.

There is a pivotal connection 160 between each force exerting member 150 and the carrying member 120. In an example, each of the carrying member 120 and the force exerting member 150 can be provided with through apertures 162 with the pivotal connection being achieved by way of a pin 164 passed through each aperture 162 and terminated at each end to prevent unintended disengagement from such aperture 162. In an example, the pin 164 can be provided as an integral part of one of the carrying member 120 or the force exerting member 150, with the other one of the carrying member 120 or the force exerting member 150 comprising an aperture.

Each force exerting member 150 is pivotable between a load engaging position and a non-load engaging position on the carrying member 120 and movable with the carrying member 120 in the reciprocal linear movement, enabled by the powered member 130.

Thus, the force exerting member 150 can be also referred to and/or configured as a gravity rocking advancement pusher or a gravity rocking dog.

Each stop 170 is rigidly coupled to the carrying member 120 and is positioned to maintain the front end 152 of a respective force exerting member 150 in the load engaging position. The stop 170 can be welded and/or fastened to the carrying member 120.

The conveyor 10 comprises load supporting members such as inner load supporting member(s) 210 and two outer load supporting members 220, extending between the inlet end 12 and the outlet end 14 of the conveyor 10. Each inner load supporting member 210 is positioned in a spaced apart relationship with the outer load supporting members 220 and with each other when more than one inner load supporting member 210 is provided. Each inner load supporting member 210 comprises a first wall 212 with apertures 214 formed through a thickness thereof and a second wall 216 with a load supporting surface 218 which is sized to receive portions of materials 2 in adjacent rows. The first wall 212 is being disposed generally vertically during operation of the conveyor 10. The load supporting surface 218 is being disposed substantially horizontally during operation of the conveyor 10. The load supporting surface 218 can comprise a smooth flat surface. The load supporting surface 218 can be provided as a member, affixed to the second wall 216 either detachably or permanently, comprising material with a low coefficient of friction, for example such as UHMW. The inner load supporting member 210 is shown as comprising a T-shaped cross-section in a plane transverse to a length thereof but can be also provided with an L-shaped cross-section. The second wall 216 can be replaced with a cylindrical rod-like or (hollow) member that will eventually define a linear contact between the outer surface thereof and the material 2 supported thereon. In other words, the load supporting surface 218 does not have to comprise a smooth flat surface. Each outer load supporting member 220 is positioned adjacent a respective side member 50, when provided or at each side of the conveyor 10. Each outer load supporting member 220 comprises a first wall 222, disposed generally vertically during operation of the conveyor 10 and a second wall 226 disposed generally horizontally during operation of the conveyor 10. The first wall 222 comprises apertures 224 formed through a thickness thereof, in a spaced-apart relationship with each other along a length of the first wall 222. The second wall 226 defines a load supporting surface 228. The load supporting surface 228 is being disposed substantially horizontally during operation of the conveyor 10. The load supporting surface 228 can comprise a smooth surface. The load supporting surface 228 can be provided as a member, affixed to the second wall 226 either detachably or permanently, comprising material with a low coefficient of friction, for example such as UHMW. The outer load supporting member 220 is shown as comprising an L-shaped cross-section in a plane transverse to a length thereof but can be also provided with a T-shaped cross-section, similar to the inner load supporting member 210. The second wall 226 can be replaced with a cylindrical rod-like or (hollow) tubular member that will eventually define a linear contact between the outer surface thereof and the material 2 supported thereon. In other words, the load supporting surface 228 does not have to comprise a smooth flat surface.

It is also contemplated herewithin that outer load supporting members 220 can be provided by or integrated with the side members 50 of the frame 20. In other words the side member 50 can be at least configured to comprise the load supporting surface 228.

During assembly, each brace 70 is passed through respectively aligned apertures 214 and 224.

In an embodiment, each brace 70 can be rigidly coupled to each first wall 212 of the inner load supporting member 210 and first wall 222 of the outer carrying member 220. Such rigid coupling can be achieved by welding when the conveyor 10 is essentially fabricated from metallic material, for example such as steel or aluminum.

Figure 8:
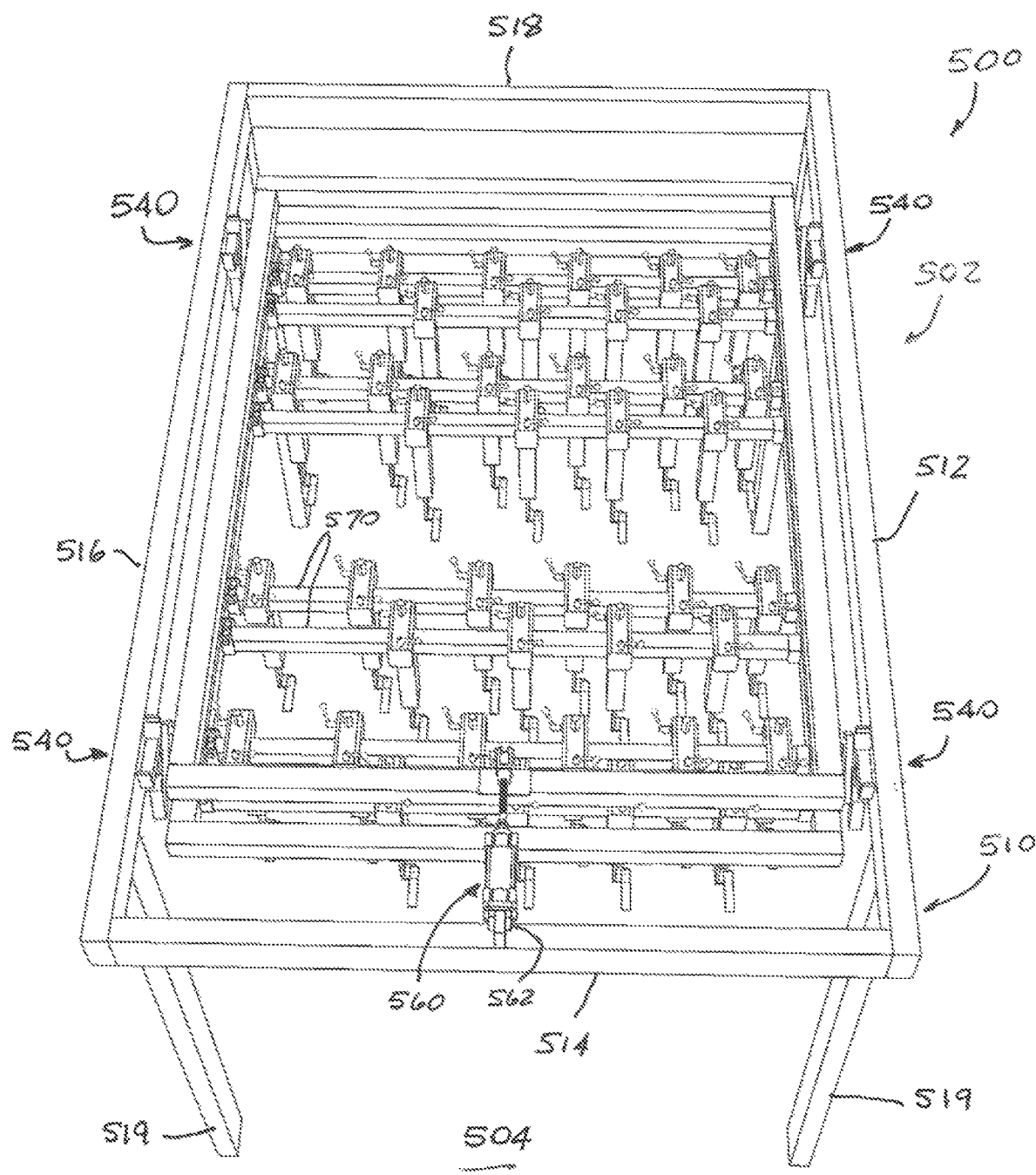
FIG. 8 illustrates a 3-D view of an exemplary apparatus configured and operable for cooking or baking dough.
Figure 9:
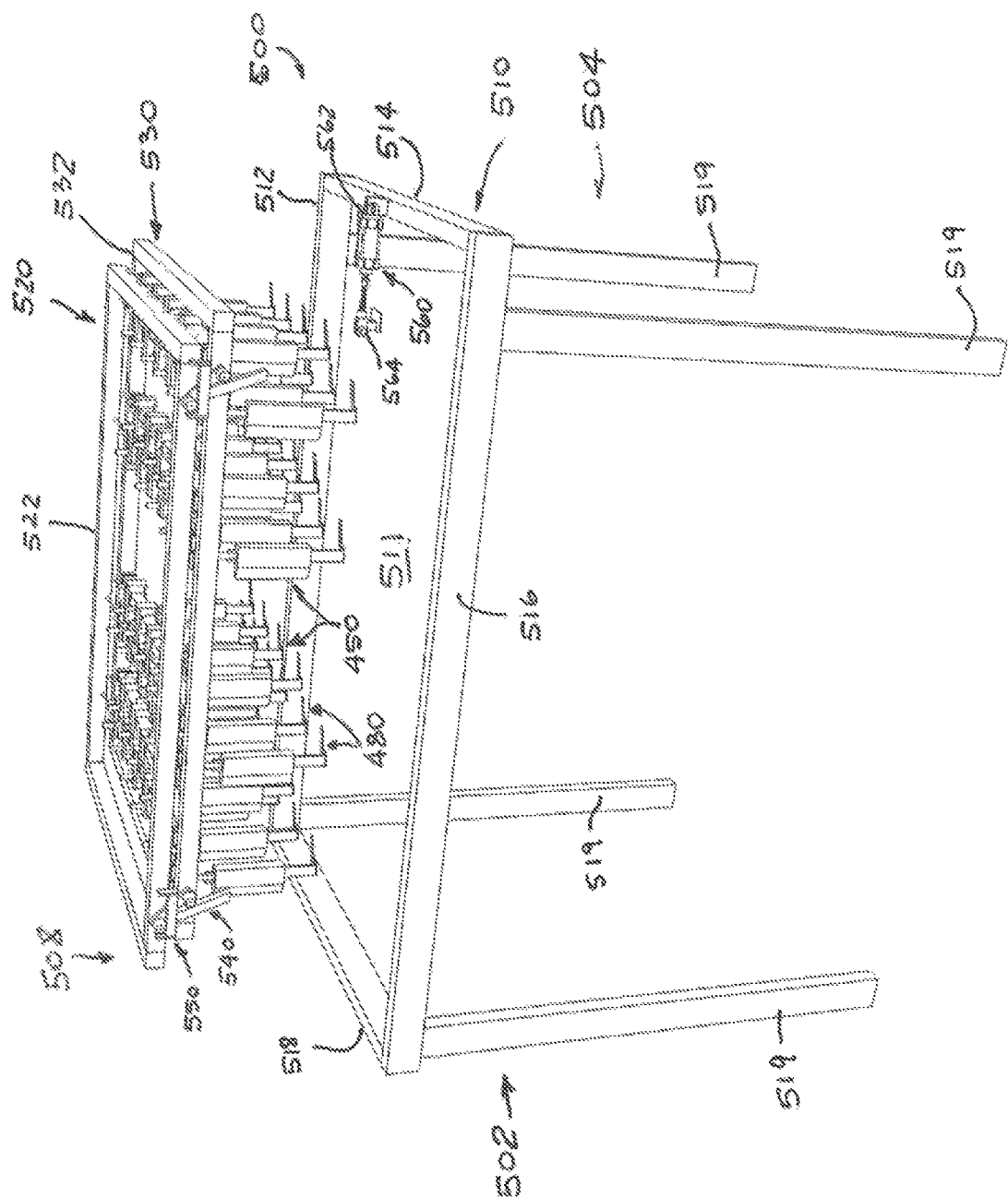
FIG. 9 illustrates an exploded 3-D view of the exemplary apparatus of FIG. 8.
Figure 10:
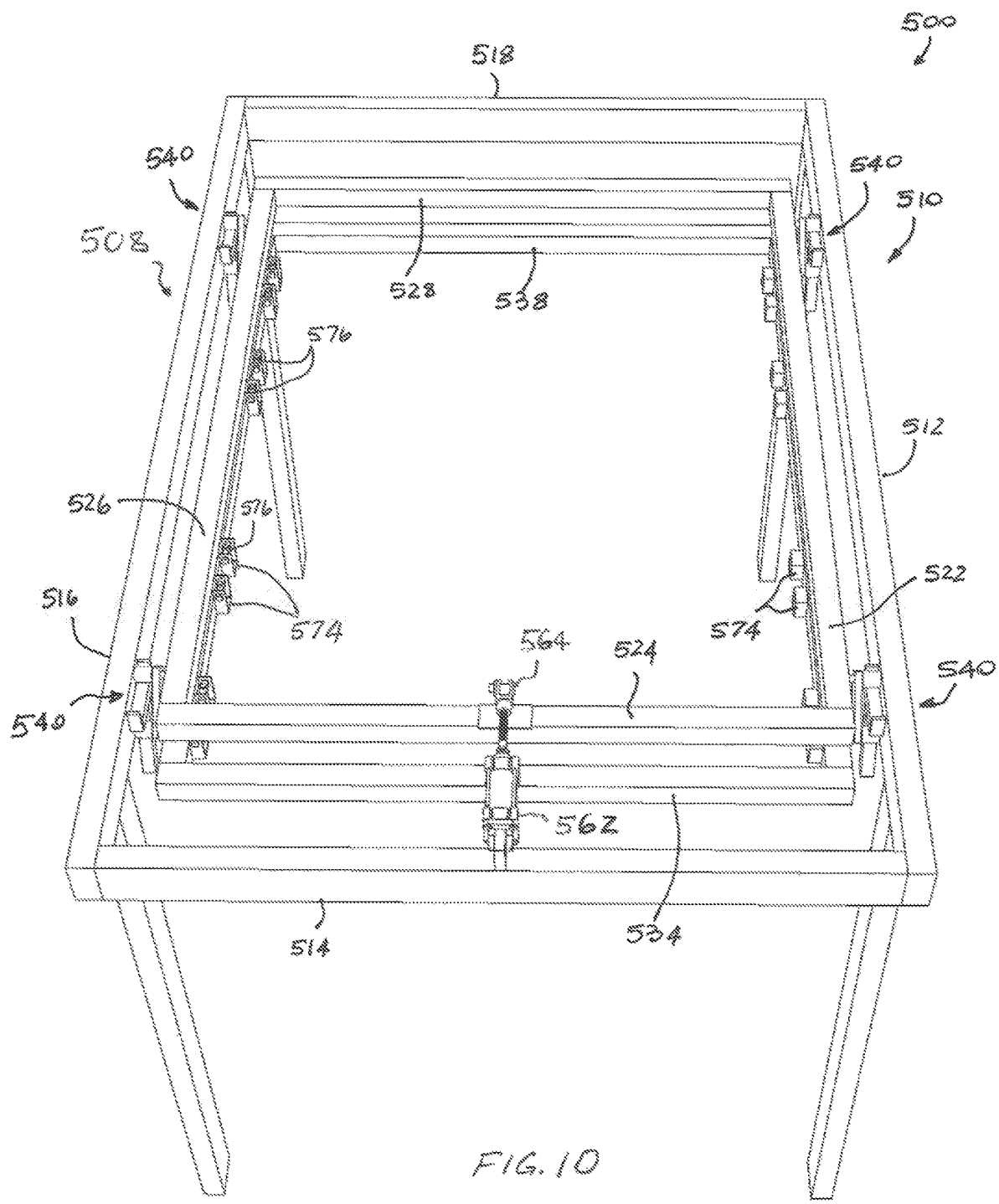
FIG. 10 illustrates a 3-D view of an exemplary frame and lifting device employed within the apparatus of FIGS. 8-9.

In an embodiment, each brace 70 can be detachably coupled to each first wall 212 of the inner load supporting member 210 and first wall 222 of the outer carrying member 220. In this embodiment, each brace 70 is configured to pass freely through the apertures 214 and 224. When the brace 70 is configured to pass freely through the apertures 214 and 224, the conveyor 10 further comprises biasing members 230, best shown in FIG. 8. Each biasing member 230 comprises a first portion 232 stationary attached to a surface of the first wall 212 of each inner load supporting member 210 and to a surface of the first wall 222 of each outer load supporting member 220, in an alignment with a respective clamp 90 and comprising a second portion 234 movable in a relationship to the first portion 232 and having one end thereof positioned in an abutting relationship with the respective clamp 90 so as to bias each brace 70 with upper edge(s) of each aperture 214, 224 during use of the conveyor 10. By way of one example only, the first portion 232 can be adapted with a threaded aperture 236 with the second portion 234 being configured as a threaded bolt or a threaded rod. It would be understood that the position of the biasing members 230 can be reversed to bias the brace 70 downwardly.

In an embodiment, the brace 70 and apertures 214, 224 can be eliminated by welding or fastening the support brackets 80 directly to the first wall 212 or 222 and fastening the first walls 222 to the respective side member 50, when provided.

Inner load supporting members 210 and outer load supporting members 220 can be also configured for supporting the remaining elements of the conveyor 10 in absence of the frame 20. In an example, the first walls 212 and 222 can be simply rested on a surface or structure. In an example, the first walls 212 and 222 can be fastened to a surface or structure by providing an optional bottom flanges (not shown).

In operation, the front end 152 has at least a portion thereof extending outwardly or upwardly, in the load engaging position, from or above load supporting surfaces 218 and 228 and in an abutting relationship with a portion of the material 2 during operation of the conveyor 10. Such portion can be a rear surface of the material 2 or a void in a bottom surface thereof. The abutting relationship of the front end 152 of each force exerting member 150 causes an incremental advancement of the materials 2 between the inlet end 12 and the outlet end 14 during the linear movement of the carrying members 120 in a first, or load moving direction. The incremental movement is defined by the stroke of the powered member 130 that is, in turn, is selected based on a travel distance of the material 2. The front end 152 and the rear end 154 are also being at least partially disposed, in the non-load engaging position, below the load supporting surfaces 218 and 228 during the linear movement of the carrying member 120 in an opposite second or a non-load moving direction. The linear movement of the force exerting members 150 in the first direction advances the material 2 from the inlet end 12 to the outlet end 14. When the powered member 130 is controlled to move the carrying member 120 and the force exerting members 150 in a reversed direction toward the inlet end 12, the force exerting members 150 rotate into the non-load engaging position and move under the material 2 which is behind the material 2 that was previously advanced by the retracting force exerting members 150. While retracting, the force exerting members 150 are being maintained in the non-load engaging position by any continuous bottom surface of the material 2. Once, the retracting force exerting members 150 passed the material 2 or the bottom surface of the material 2 has a void, the force exerting members 150 pivot into the load engaging position due to gravity without aid of any powered member. When the force exerting members 150 return into the load engaging position due to gravity, these force exerting members 150 are in a position to advance the next material 2 when the powered member 130 is controlled to move the carrying members 120 toward the outlet end 14 of the conveyor 10.

The number of force exerting members 150 depends on a distance between inlet end 12 and the outlet end 14, the size of the material 2 in the transport direction along the conveyance path 4 and the number of materials 2 to be positioned in series between the inlet end 12 and the outlet end 14. Although four force exerting members 150 are illustrated in FIGS. 1-3 as being attached to a single carrying member 120, more or less can be used in a specific application. It is contemplated that a single force exerting member 150 can be used, for example on short conveyors 10, a long stroke powered device 130 or a combination thereof. Furthermore, although force exerting members 150 are disposed at one surface of the carrying member 120, the conveyor 10 may use a pair of force exerting members 150 for each material 2. The second force exerting member 150 can be simply mounted at the opposite surface of the carrying member 120, even on a common pivoting member. The force exerting members 150 in each pair can be pivoting in unison with each other (rigid connection of each force exerting member 150 to the pivoting member) or independently from each other.

The number of the braces 70, support brackets 80 and receptacles 110 at least depends on a distance between the inlet end 12 and the outlet end 14 and the size of the material 2 in the transport direction. Although four braces 70 are provided in the exemplary embodiment of the conveyor 10 in FIGS. 1-3, more or less can be used in a specific application, including one of each of the brace 70, the support bracket 80 and the receptacle 100.

Each carrying member 120 in a combination with at least the force exerting members 150 is configured to function as a carriage.

All carrying members 120 in a combination with at least the force exerting members 150 are configured to function as a carriage.

In an embodiment, an exemplary method of advancing the material 2 from the inlet end 12 to the outlet end 14 comprises supporting each material 2 on load supporting surfaces 118, 228, engaging each material 2 with a force exerting member 150, moving, with the powered member 130, each force exerting member 150 and its respective material 2 in a (first) direction toward the outlet end 14, moving, with the powered member 130, each force exerting member 150 without the material 2 in an opposite (second) direction toward the inlet end 12 so as to position each force exerting member 150 to engage the next material 2 to be moved toward the outlet end 14. The step of moving each force exerting member 150 and its respective material 2 in a direction toward the outlet end 14 comprises controlling or actuating the powered member 130 to move in the first direction. The step of moving each force exerting member 150 in a direction toward the inlet end 12 comprises controlling or actuating the powered member 130 to move in the second direction. The step of moving each force exerting member 150 comprises the step of pivotally attaching one or more force exerting members 150 to a carrying member 120 and mounting the carrying member 120 for a linear movement. The mounting can be achieved by providing receptacles 100 mounted stationary during operation of the conveyor 10, for example on braces 70 and support brackets 80.

In an embodiment, an exemplary method of indexing or incrementally advancing the materials 2, positioned in a series (i.e., one after another) with each other, from the inlet end 12 to the outlet end 14 comprises supporting each material 2 on load supporting surfaces 118, 228, engaging each material 2 with a single force exerting member 150, moving, with the powered member 130, the force exerting members 150 and the materials 2 in a (first) direction toward the outlet end 14, moving, with the powered member 130, the force exerting members 150 without the materials 2 in an opposite (second) direction toward the inlet end 12 so as to not move the materials 2 in such second direction, engaging with each force exerting members 150 the next material 2 and advancing the materials 2 again toward the outlet end 14. It would be understood that at the beginning of operation, only one row of materials load can be positioned at the inlet end 12. Thus, in the beginning of operation of the exemplary conveyor 10 only the force exerting members 150 will index or incrementally advance the materials 2. After the first indexing, there will now be two rows of materials 2 positioned in a series with each other. So, the next indexing step will move two rows of materials 2 and so on until the conveyor 10 is completely loaded with materials 2 and each force exerting member 150 advances a respective material 2 in the first direction from the inlet end 12 to the outlet end 14. It would be understood that it would take 4 strokes of the powered member 130 to load the illustrative conveyor 10. It would be understood that less or more than 4 strokes will be required depending on the configuration or capacity of the conveyor 10.

It would be understood that the conveyor 10 is configured to advance an array of materials 2 with a plurality of rows of materials 2 with a plurality of materials 2 in each row.

Figure 4:
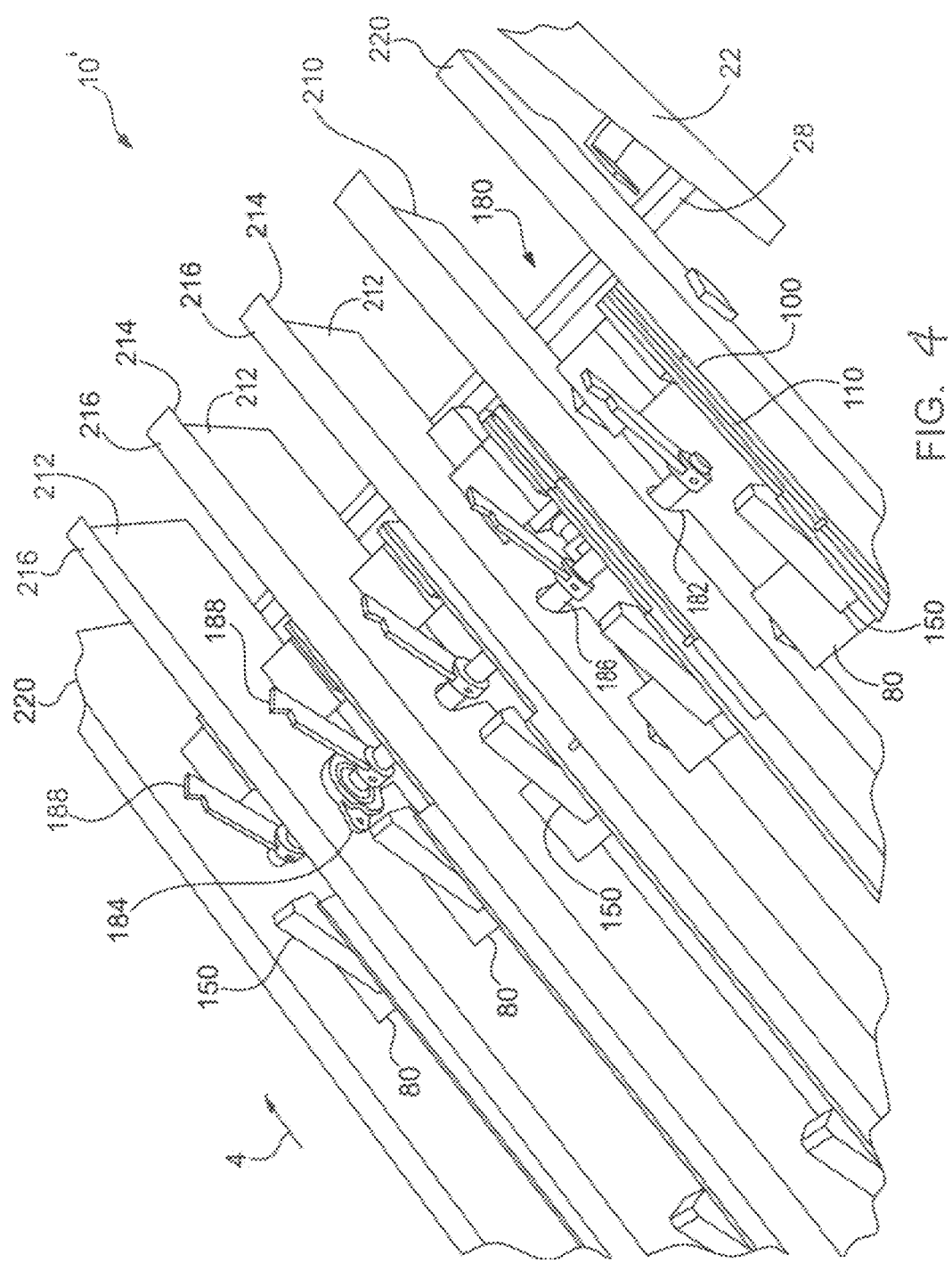
FIG. 4 illustrates a partial perspective top view of an exemplary conveyor configured to advance multiple rows of materials, particularly showing a kickback device.

Now in reference to FIGS. 4-5, the conveyor 10' is constructed in accordance with above described embodiment(s) of FIGS. 1-3 and further comprises an optional device 180 configured to move a selected row of materials 2 in a reversed or retracted direction from the outlet end 14 to the inlet end 12 when the material 2 is disposed at the outlet end 14. In an embodiment, the device 180 can comprise edge slots 182 in the first wall 212 of each inner load supporting member 210, bearing block 184 coupled to two or more first walls 212 in an alignment with a respective slot 182, a shaft 186 passed through each bearing block 184, a pawl 188 secured on the shaft 186 for a rotation thereof and another powered drive 190 coupled with a link 192 to the pawl 188 and operable to pivot the shaft 186 and the pawl 188 in the direction from the outlet end 14 to the inlet end 12 so as to move the material 2, disposed at the outlet end 14, a small increment toward the inlet end 12. The device 180 is configured to function as a kickback device.

In an example, the device 180 can be employed in application(s) where the material 2 exiting the outlet end 14 is transferred onto another conveyor (not shown) to be moved in a direction generally normal to the transport or conveyance path 4. In this application, the purpose of the device 180 is to "break" a contact between the material 2 being positioned at the outlet end 14 and the material 2 that was pushed by the force exerting member 150 onto the another conveyor (not shown). The kickback motion allows a separation between the material 2 being positioned at the outlet end 14 and the material 2 that was pushed by the force exerting member 150 onto the another conveyor and subsequently allows an unobstructed movement of the discharged material 2 on the another conveyor (not shown). If the discharged material 2 on the another conveyor (not shown) has contact with a respective material 2 still on the index conveyor 10', the discharged materials 2, through friction of them touching, may turn or stall and not be transported by such another conveyor (not shown).

Thus, in an embodiment, an exemplary method of indexing or incrementally advancement of the materials 2, positioned in a series (i.e., one after another) with each other, in the first direction from the inlet end 12 to the outlet end 14 comprises incrementally moving the material 2 positioned at the outlet end 14 of the conveyor 10 in the opposite second direction with a device 180 which is powered independently from the powered member 130.

FIG. 6A illustrates an exemplary embodiment of the conveyor 10 wherein the previously described indexing device comprising the receptacles 100, carrying members 120, and a linearly configured powered member 130 have been replaced with a chain drive 320 comprising a plurality of chains 322 driven by a powered member 340 through a pair of chain sprockets 324, for example being of a motor and gearbox type, and carrying a plurality of the force transmitting members 150. It would be understood that the force transmitting members 150 in the embodiment of FIG. 6A move in a single direction, although the rotation of the chains 322 can be reversed. Indexing or incremental advancement of the force transmitting members 150 can be controlled through a control member (not shown), for example based on a length of the material 2 to be incrementally advanced from the inlet end 12 to the outlet end 14 or based on a timing to advance such material 2.

Figure 6B:
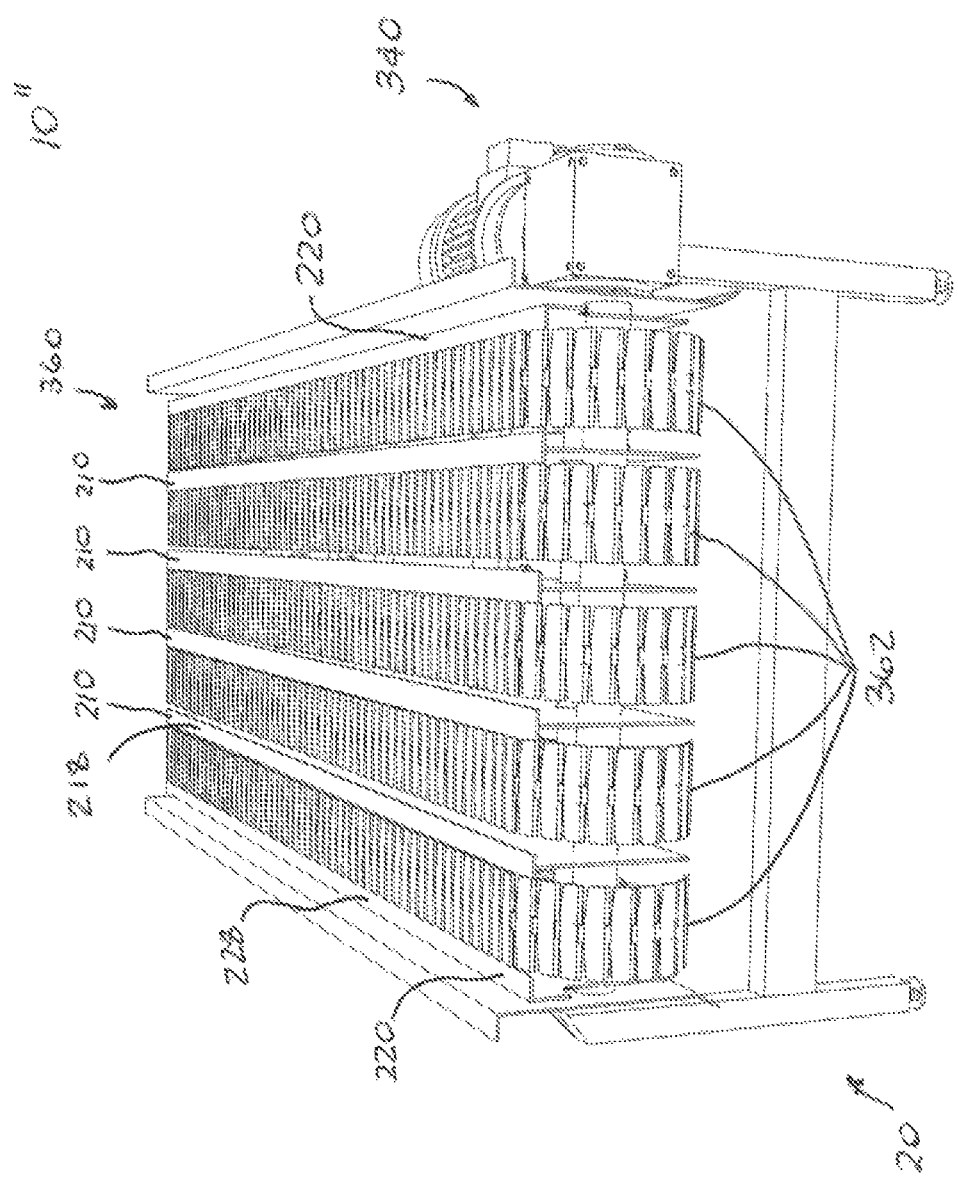
FIG. 6B illustrates a 3-D view of an exemplary conveyor configured to advance multiple rows of materials.

FIG. 6B illustrates an exemplary embodiment of the conveyor 10" wherein the receptacles 100, carrying members 120, and a linearly configured powered member 130 have been replaced with a belt type drive 360 driven by a powered member, for example as the above described powered member 340 and comprising individual belts 362 that can be disposed between the carrying members 210, 220 or even partially rest on working surfaces 218, 228.z The material processing apparatus can be an oven 500 as disclosed in the U.S. non-provisional patent application Ser. No. 15/388,484, titled "APPARATUS, SYSTEM AND METHOD FOR MATERIAL HANDLING AND/OR PROCESSING" and filed on Dec. 22, 2016 by applicant ZME, LLC and issued as U.S. Pat. No. 9,745,127 B2 on Aug. 29, 2017.

For the sake of reader convenience, the oven 500 is briefly described herewtihin in a reference to FIGS. 7-11. The material in the forgoing description is illustrated and described as containers 600.

Figure 7:
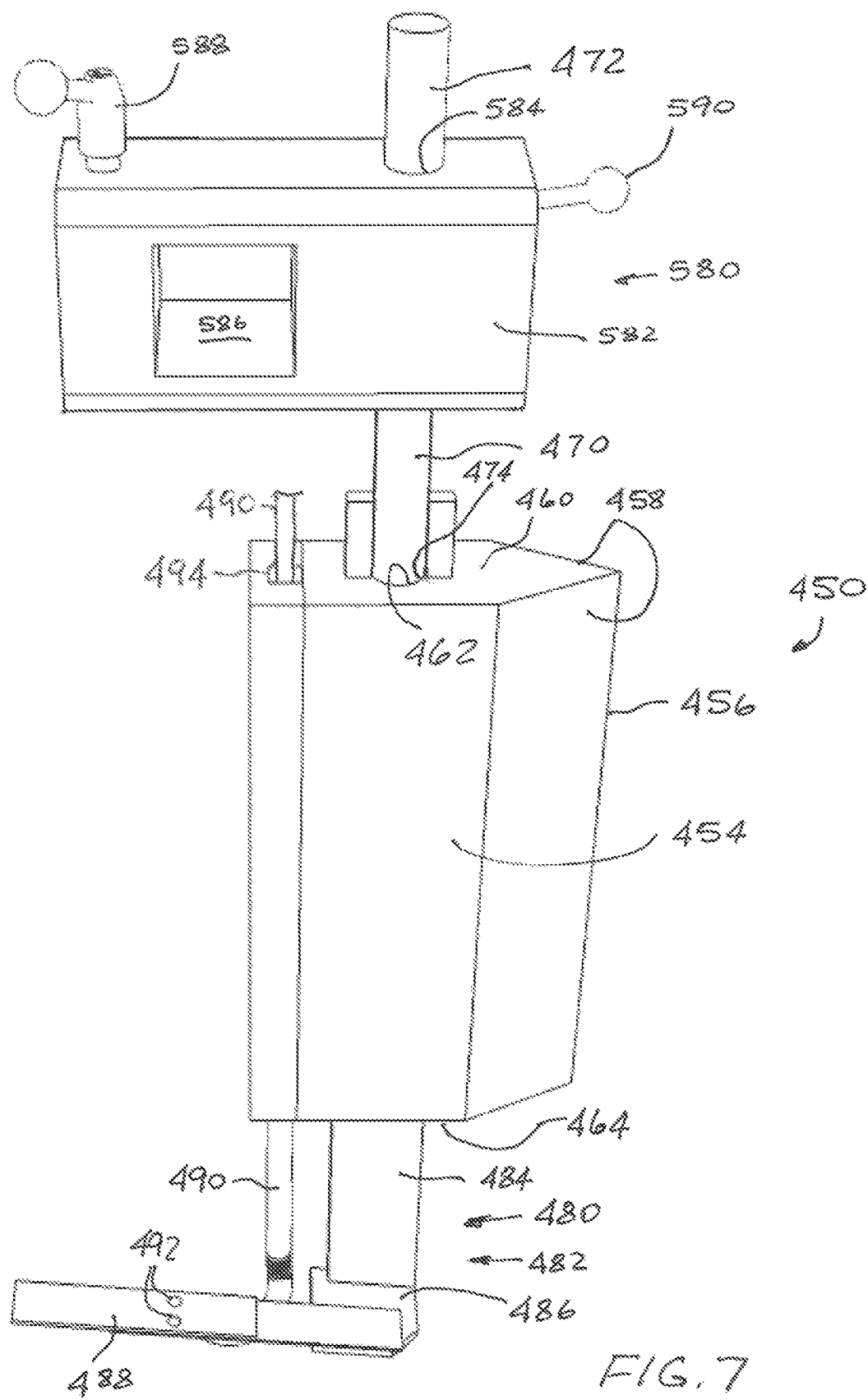
FIG. 7 illustrates a 3-D view of an exemplary device configured and operable to connect voltage to a material being processed.

FIG. 7 illustrates an exemplary device 450 configured and operable to connect voltage to container(s) 600 containing dough between a pair of metal pans. The exemplary device 450 comprises a body 454. The body 454 can be manufactured from an electrically non-conductive material, for example such as UHMW polyethylene or equivalent. Phenolic material may be also employed herewithin. One edge of the body 454, referenced with numeral 456, may optionally comprise a pair of beveled surface portions 458 converging toward one another to define a generally pointed edge 456 that can be sharp or rounded. The edge 456 can also comprise one or more radii instead of the beveled surface portions 458 or any other surface feature reducing the width of the edge 456 relative to a width of the body 454. A mounting portion 470 extends from a surface 460 of the body 454. The surface 460 may define one end of the body 456 and may be disposed in a plane normal to the plane of the edge 456, although other angular relationships are also contemplated herewithin. The mounting portion 470 can comprise or define an elongated member 472. The elongated member 472 may be partially inserted into a bore 462 in the body 454, the bore 462 being in an open communication with the surface 460. Or, one end 474 of the elongated member 472 can be configured for fastening to the surface 460. The device 450 further comprises an electrically conductive member or an electrode 480 extending from a surface 464 of the body 454. The surface 464 is illustrated as being disposed longitudinally opposite the surface 460 and defines a longitudinally or an axially opposite end of the body 454. The electrode 480 may comprise an L-shaped member 482 having one leg 484 thereof secured to the surface 464 of the body 454 and an electrically conductive portion 488 having one end thereof secured to another leg 486 of the L-shaped member 482. The conductive portion 488 has been illustrated as having a pair of flat surfaces but can be provided in any other shapes.

Wires 490 are connected to the electrode 480, for example at one or more studs 492 and couple or connect the electrically conductive member 488 to a voltage source. The wires 490 may be passed or routed through a through bore 494 in the body 454. The wires may be routed on the exterior surface of the body 454, or even in a separate conduit (not shown).

FIGS. 8-11 illustrate and exemplary embodiment of the oven 500 configured and operable to cook or bake dough with electrical resistance for consumption as bread or, with secondary processing, for consumption as croutons or American or Japanese style breadcrumbs. The oven 500 can be also referred to as an electrical resistance oven.

The exemplary oven 500 of FIGS. 8-11 comprises a frame 508 and the above described devices 450 configured and operable to connect voltage to an object or load. In an example, as will be explained further in this document, such object can be a container. More specifically, such container can be a container assembly 600 of FIGS. 12-13 or a bread box with a pair of metal pans and containing dough between the pair of metal pans to be cooked by way of electrical resistance. The container assembly 600 is described further in this document.

The exemplary frame 508 is configured and operable to mount and move the above described device(s) 450. The exemplary frame 508 comprises a first frame 510. The first frame 510 is configured as a stationary frame during use or after assembly of the oven 500. The first frame 510 has a hollow interior 511 defined by peripheral members 512, 514, 516 and 518, all rigidly affixed therebetween by welding, adhesives or fastening. Such peripheral members 512, 514, 516 and 518 may be provided as hollow tubular members to reduce weight of the first frame 510. Such peripheral members 512, 514, 516 and 518 may be disposed coplanar (i.e. in the same plane) with each other. The first frame 510 may further comprise two or more optional legs 519 that are generally positioned vertically to support the peripheral members 512, 514, 516 and 518 in the generally horizontal plane during use of the oven 500.

The exemplary frame 508 also comprises a second frame 520. The second frame 520 also has a hollow interior 521 defined by peripheral members 522, 524, 526 and 528, all rigidly affixed therebetween by welding, adhesives or fastening. The second frame 520 can be sized and shaped to fit within the hollow interior 511 of the first frame 510 during use of the oven 500. Such peripheral members 522, 524, 526 and 528 may be provided as hollow tubular members to reduce weight of the second frame 520. Such peripheral members 522, 524, 526 and 528 may be disposed coplanar (i.e. in the same plane) with each other. As it will be explained later, the second frame 520 is mounted for a movement in a generally horizontal plane during use of the oven 500.

The exemplary frame 508 also comprises a third frame 530. During use of the oven 500, the third frame 530 is positioned below the second frame 520. The third frame 530 also has a hollow interior 531 defined by peripheral members 532, 534, 536 and 538 rigidly affixed therebetween by welding, adhesives or fastening. The third frame 530 can be sized and shaped to fit within the hollow interior 511 of the first frame 510. The third frame 530 may be sized generally equally to the second frame 520. Such peripheral members 532, 534, 536 and 538 may be provided as hollow tubular members to reduce weight of the third frame 530. Such peripheral members 532, 534, 536 and 538 may be disposed coplanar (i.e. in the same plane) with each other. As it will be explained later, the third frame 530 is mounted for a movement in both generally horizontal and generally vertical planes during use of the oven 500.

The first, second and third frames, 510, 520 and 530, respectively, are interconnected therebetween during use or after assembly of the oven 500 in the following manner. Slide or track assemblies 540, best shown in FIGS. 32 and 34, are provided. Four slide or track assemblies 540 have been illustrated, which each slide assembly 540 positioned adjacent a respective corner of the first frame 510. Each slide or track assembly 540 comprises a first member 542 with a working surface 544. First member 542 is stationary mounted on the interior of the first frame 510 and, more particularly on an interior surface of the opposite peripheral members, referenced with numerals 512 and 516. Such working surface 544 is positioned generally horizontally during use of the oven 500. The first member 542 is adapted with a pair of end stops 545 extending above the working surface 544. Each slide or track assembly 540 also includes a second member 546 with the working surface 548 that is disposed at an angle or inclined relative to the working surface 544. The second member 546 is rigidly and stationary coupled to the first member 544 and/or the first frame 510, for example by a welding method or being manufactured with the first member 542 as a one-piece member, for example by a casting or molding process. Carriages 550 are also provided. Each carriage 550 comprises a first roller 552 that is rotateably affixed on the exterior of the second frame 520 and is adapted to roll on the working surface 544 during use of the oven 500. A second roller 554 is rotateably affixed on the exterior of the third frame 530 and is adapted to roll on the working surface 548 during use of the oven 500. Each carriage 550 also comprises a link 556 that is coupled to the first and second rollers, 552 and 554 respectively, so that both first and second rollers, 552 and 554 respectively, rotate on the link 556 and have to move together during operation of the oven 500.

In a further reference to FIGS. 8-11, the exemplary oven 500 further comprises a powered mover 560. Such powered mover 560 is configured to generate a linear motion. Such powered mover 560 can be for example a hydraulic or pneumatic cylinder, that has a piston end 562 affixed to the first frame 510 and has a rod end 564 thereof affixed to the second frame 520. One or both of the piston end 562 and rod end 564 can be affixed in a pivotal connection. The powered mover 560 is illustrated as being attached at the outlet end of the oven 500. FIGS. 8-11 illustrate position of the second frame 520 and the third frame 530 after the actuation of the powered mover 560 so that the electrodes 450 are in a contact with the respective container assemblies 600. During operation of this exemplary oven 500, the powered mover 560 is actuated to move the second frame 520 in a horizontal direction. In a particular reference to FIG. 34, such movement of the second frame 520 causes the first roller 552 to move horizontally on the working surface 544 from left to right and further causes the second roller 554 to move upwardly on the inclined working surface 548. The movement of the second roller 554 causes the movement of the third frame 530 in both horizontal and vertical directions. The third frame 530 is configured to move upwardly toward the second frame 520. When the powered mover 560 is deactuated, the first roller 552 moves from right to left in FIG. 34 into the position shown in FIG. 32 causing the third frame 530 to move downwardly away from the second frame 520.

In other embodiments, the powered mover 560 can be also an electrically powered drive. In an example, such electrically powered drive can be a solenoid. In an example, such electrically powered drive can comprise a screw and nut components, with the nut being connected to the second frame 520 and translating on the screw. In an example, such electrically powered drive could be of a magnetic rack and pinion type with the pinion rotateably mounted on the first frame 510 and the rack mounted stationary on the second frame 520.

The exemplary oven 500 comprises the above described device(s) 450 that are connected to the third frame 530 and that move in both horizontal and vertical directions or planes during movement of the second frame 520 and the third frame 530. The devices 450 are provided in pairs, with one device 450 configured to connect a positive voltage and the second device 450 configured to connect a negative voltage. The number of pairs of devices 450 depends on the number of individual container/dough batches to be baked or cooked at one time.

Figure 11:
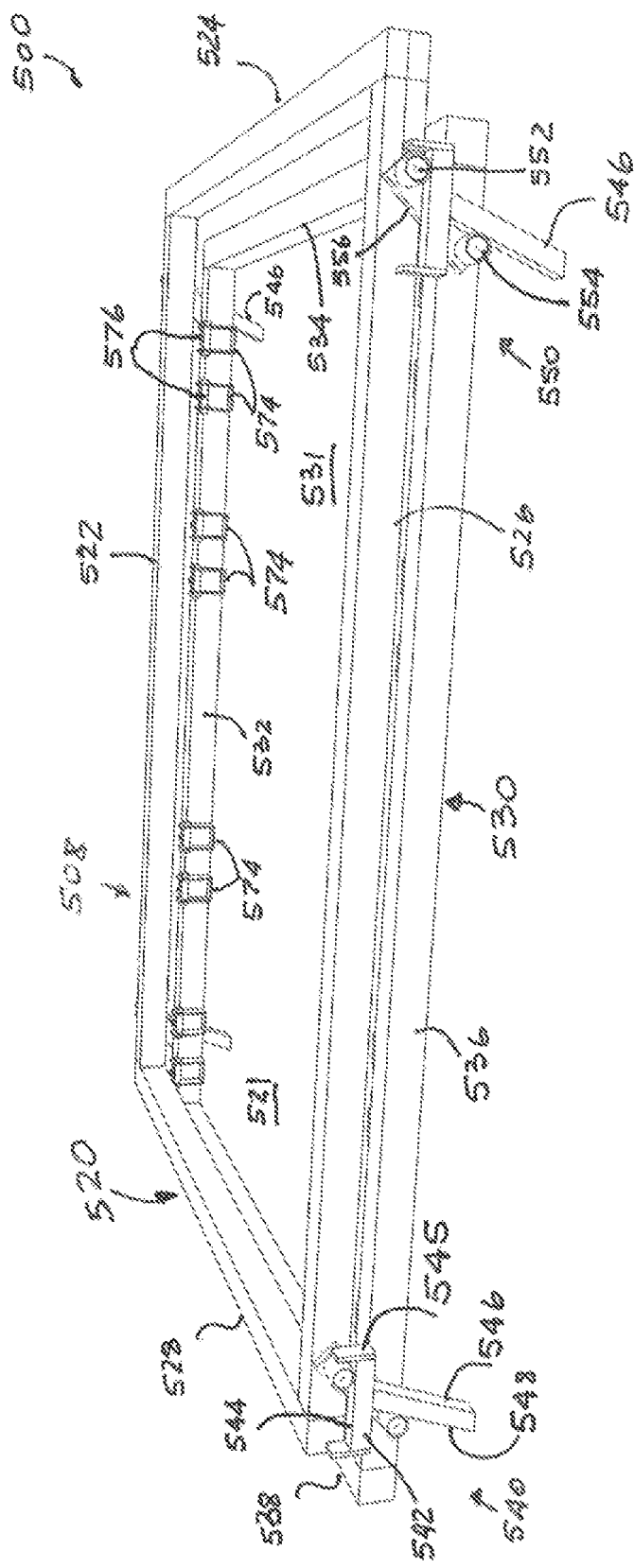
FIG. 11 illustrates a 3-D view of the frame of FIG. 10.

To attach or couple the devices 450, the oven 500 is adapted with rails 570 and brackets 574. As is best shown in FIG. 11, each bracket 574 is configured as a U-shaped bracket and is affixed rigidly to a peripheral member of the third frame 530. A pair of brackets 574 is affixed to opposite peripheral members of the third frame 530, referenced with numerals 532 and 536 and are aligned therebetween to receive ends 572 of one rail 570. The brackets 574 are illustrated as being attached to interior opposite surfaces of the peripheral members 532 and 536 of the third frame 530, planar with the third frame 530, but can be also mounted lower or higher. An optional locking member 576 can be provided to engage each bracket 574 so as to cage the end 572 and prevent unintentional disengagement of the end 572 from a respective bracket 574 during use of the oven 500. The locking member 576, when provided, is configured to be easily removed from the bracket 574 for insertion or removal of the rail 570.

Further, oven 500 comprises clamping members or means that are configured to affix, in a stationary manner, each device 450 to the rail 570. In an embodiment, such clamping member can be the exemplary clamping member 580 that comprises a body 582, a first bore 584 sized and shaped to receive the mounting portion 470 therethrough, a second bore 586 oriented in a direction generally normal to a direction of the first bore 584, a first clamp 588 configured to secure the mounting portion 470 received within the first bore 584 and a second clamp 590 configured to secure the clamping member 580 to the rail 570 passed through or received within the second bore 586. The first clamp 588, when actuated, prevents movement of the device 450 in a vertical direction. The second clamp 590, when actuated, prevents movement of the device 450 along a length of the rail 570. During assembly of the oven 500, the clamping member 580 can be clamped onto the device 450 first and the rail 570 second or vise-versa. In an embodiment, the clamping member can be permanently attached to the mounting portion 470, eliminating a need for at least the first clamp 588. In an example, the body 582 and the mounting portion 470 can be provided as a unitary member by a casting or molding process. In an embodiment, the clamping member 580 can be provided integral with the rail 570 eliminating at least a need for the second clamp 590. In an example, the body 582 can be provided as abutment(s) on the rail 570 and machined and assembled to incorporate the first bore 584 and first clamp 588.

Figure 13:
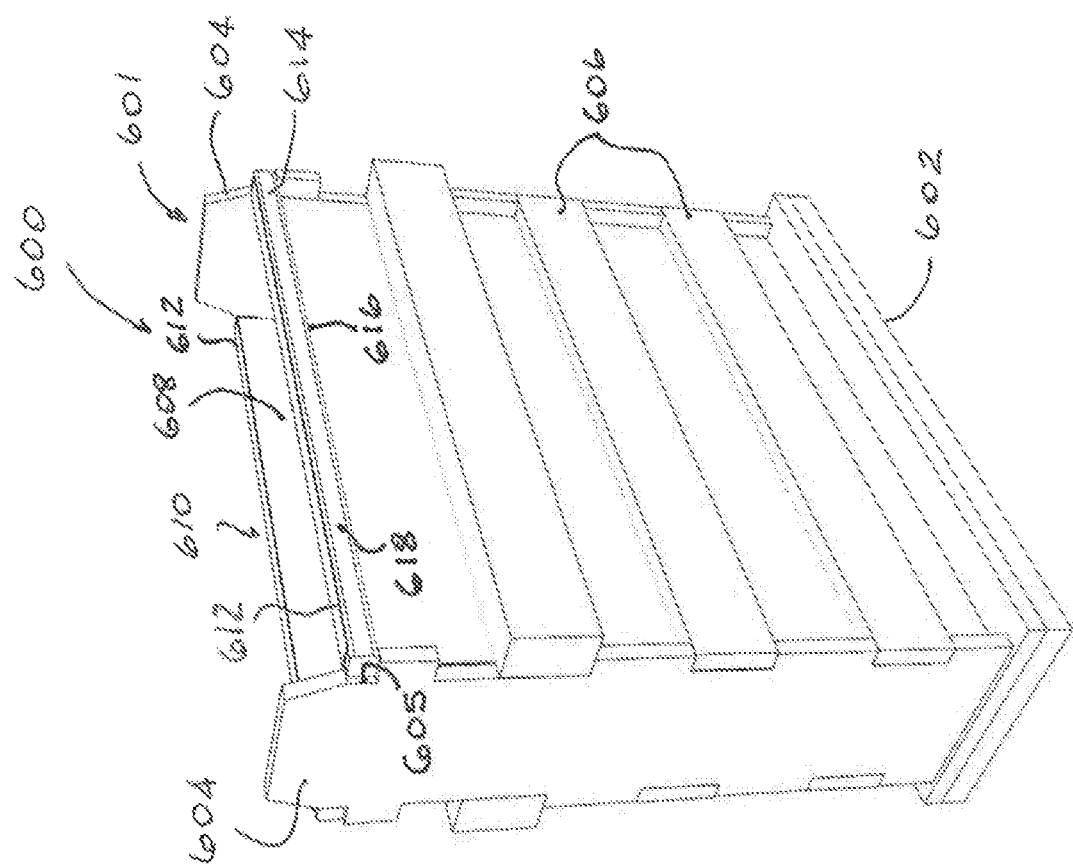
FIG. 13 illustrates a side 3-D view of the container assembly for cooking or baking dough of FIG. 12.
Figure 12:
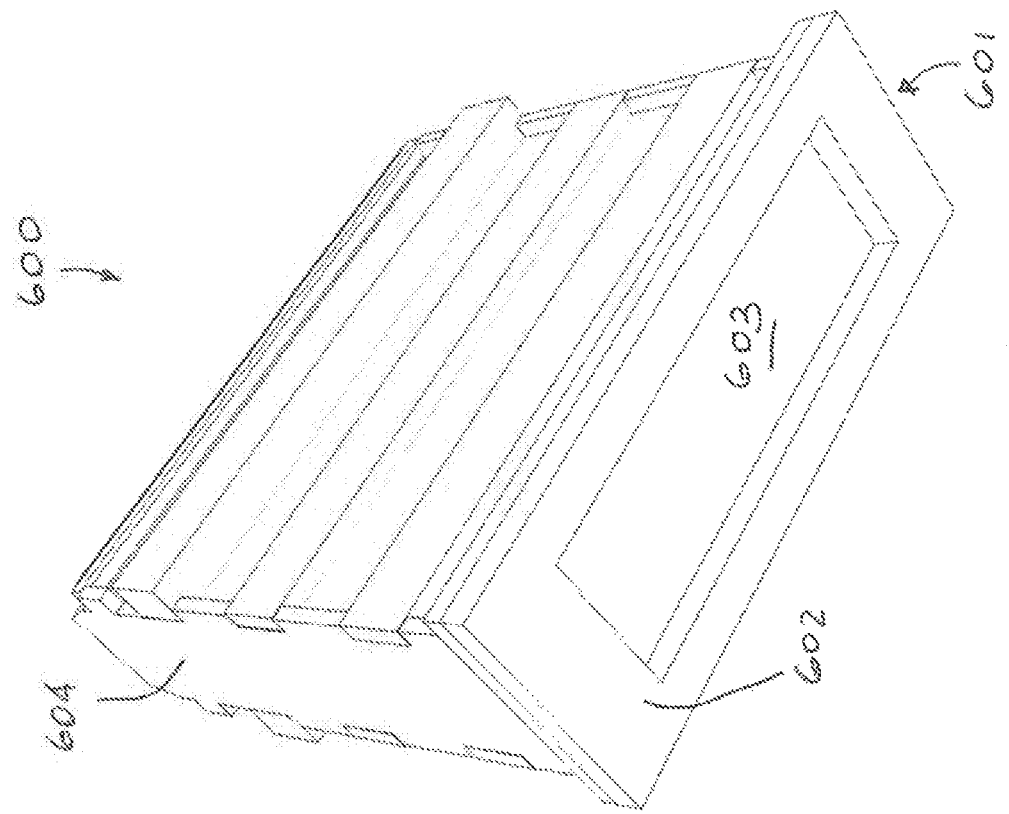
FIG. 12 illustrates a bottom 3-D view of a container assembly for cooking or baking dough.

FIGS. 12-13 illustrate an exemplary embodiment of a container assembly 600 that can be used with the oven 500 for the purpose of cooking or baking dough. Cooked dough can be then consumed as a bread or can be transformed, by secondary operations, into other products, for example such as croutons or crumbs. Such exemplary container assembly 600 comprises a container 601 with a bottom member 602, defining a closed end of the container 601, first members 604 upstanding on the bottom 602, at each end thereof, and defining closed ends of the container 601. The bottom member 602 may have an optional exterior void 603. Second members 606 are also provided and define partially open sides of the container 601. Each second member 606 is being rigidly connected at each end thereof to an edge of a respective first member 604. The second members 606 are being disposed in a spaced apart relationship with each other. The second members 606 can be of varying sizes. The container 601 is manufactured from or comprises a non-electrically conductive material. The container assembly 600 further comprises two pans 610 that are positioned during use at the opposing sides of the container 601. The pans 610 are sized to cover the partially open sides of the container 601 and define a hollow interior 608 that receives dough to be baked or cooked. Each pan 610 is manufactured from an electrically conductive material and is adapted with one or more flanges 612. A bottom edge of the pan 610 can be smaller than the edge with the one or more flanges 612 for ease of insertion into the container 601, particularly by robotic devices (not shown). In other words, the sides of the pan 610 are tapered toward the bottom edge 613. It will be understood that the container 601 can be configured to taper complimentary to the tapers of the pan 610. The container assembly 600 also comprises two electrodes or electrically conductive members 614. Each electrode 614 is disposed, during use, in a direct contact with a respective pan 610 and defines a generally unobstructed bottom surface 616 and a side surface 618. In an example, the electrode 614 can be manufactured from or comprise a copper or an aluminum material. The electrode 614 can comprise tubular or solid cross-section. The electrode 614 can be welded or spot-welded to the flange 612 or affixed by other mechanical means, for example such as crimping or staking. The electrode 614 can be also caged within the container assembly 600 between the flange 612 and a notch 605 in the first member 604. In an embodiment, the electrode 614 can comprise the flange 612 adapted with two additional flanges 616 and 618 to define a tubular shape of the electrode 614. During use, each electrode 614 conducts or connects voltage to a respective pan 610.

The exemplary oven 500 is being configured to cook or bake dough in containers transmitted on a conveyor 10 that is positioned below the second and third frames, 520 and 530 respectively. The conveyor 10 can be adapted for attachment to the first frame 510 or the previously described frame 20 can be adapted to also function as the first frame 510. The conveyor 10 in this embodiment can be provided with the kickback device 180 when the outlet or discharge end 504 is positioned adjacent another conveyor configured to move container assemblies 600 with cooked or baked dough in a direction normal to the pathway 506. The conveyor 10 in this embodiment can be provided without the kickback device 180 when the outlet or discharge end 504 is positioned adjacent another conveyor 10 configured to move container assemblies 600 with cooked or baked dough in a direction along to the pathway 506, for example to allow the cooked or baked dough to cool or settle prior to changing travel direction.

Furthermore, the embodiment of FIGS. 8-11 provides the exemplary oven 500 being configured for cooking or baking twenty (20) individual containers with dough, positioned in four rows with each row containing five containers. However, the width of the oven 500 can be adjusted to accommodate a different quantity of the containers, even to accommodate a single row of containers. Furthermore, a length of the oven 500 can be adjusted to accommodate a single container. In other words, in its minimum form, the oven 500 can be configured to cook or bake a single container with dough.

Figure 14:
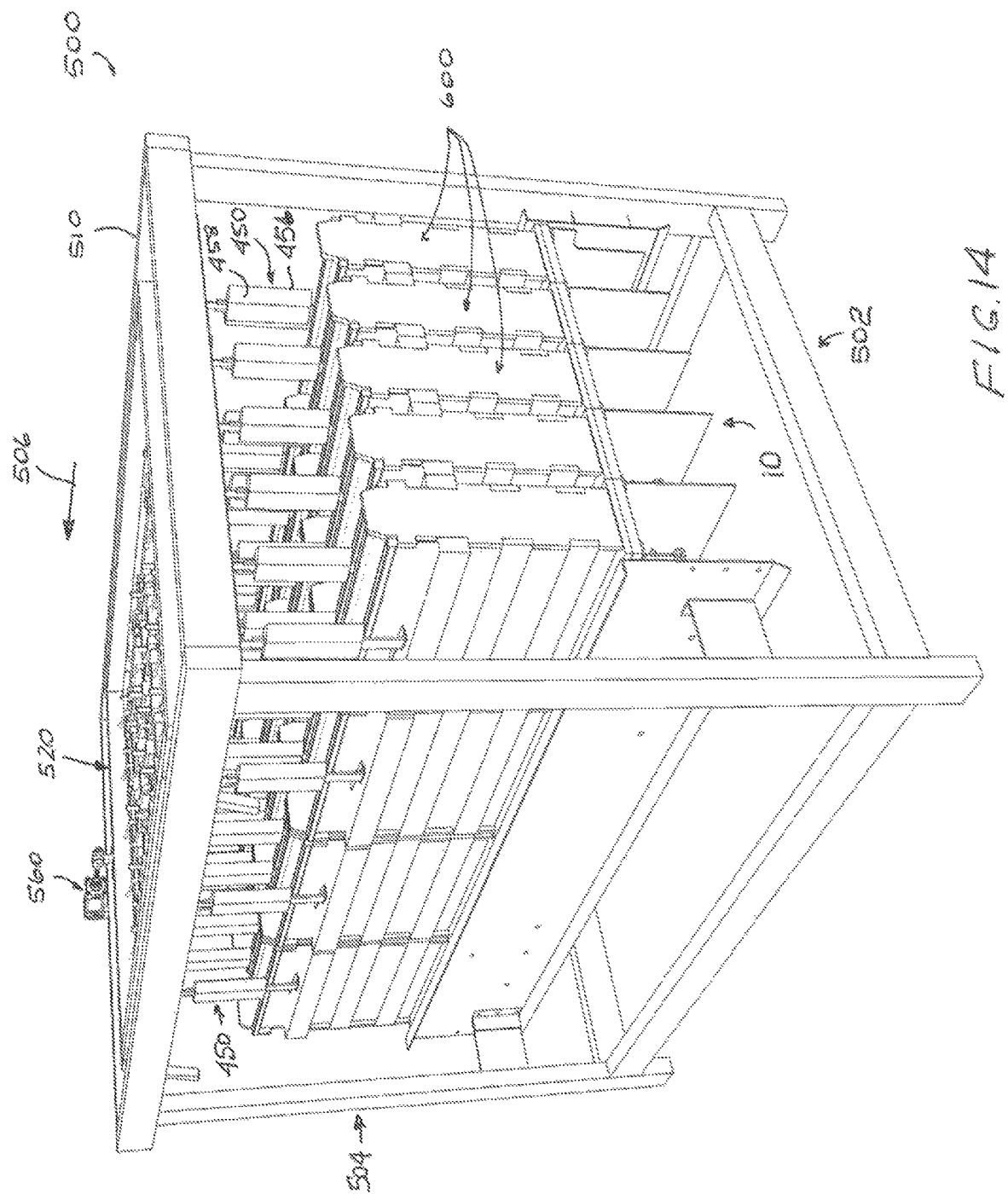
FIG. 14 illustrates a 3-D view of the apparatus of FIGS. 8-11 in a combination with the conveyor of FIGS. 1-4 and the container assemblies of FIGS. 12-13.
Figure 15:
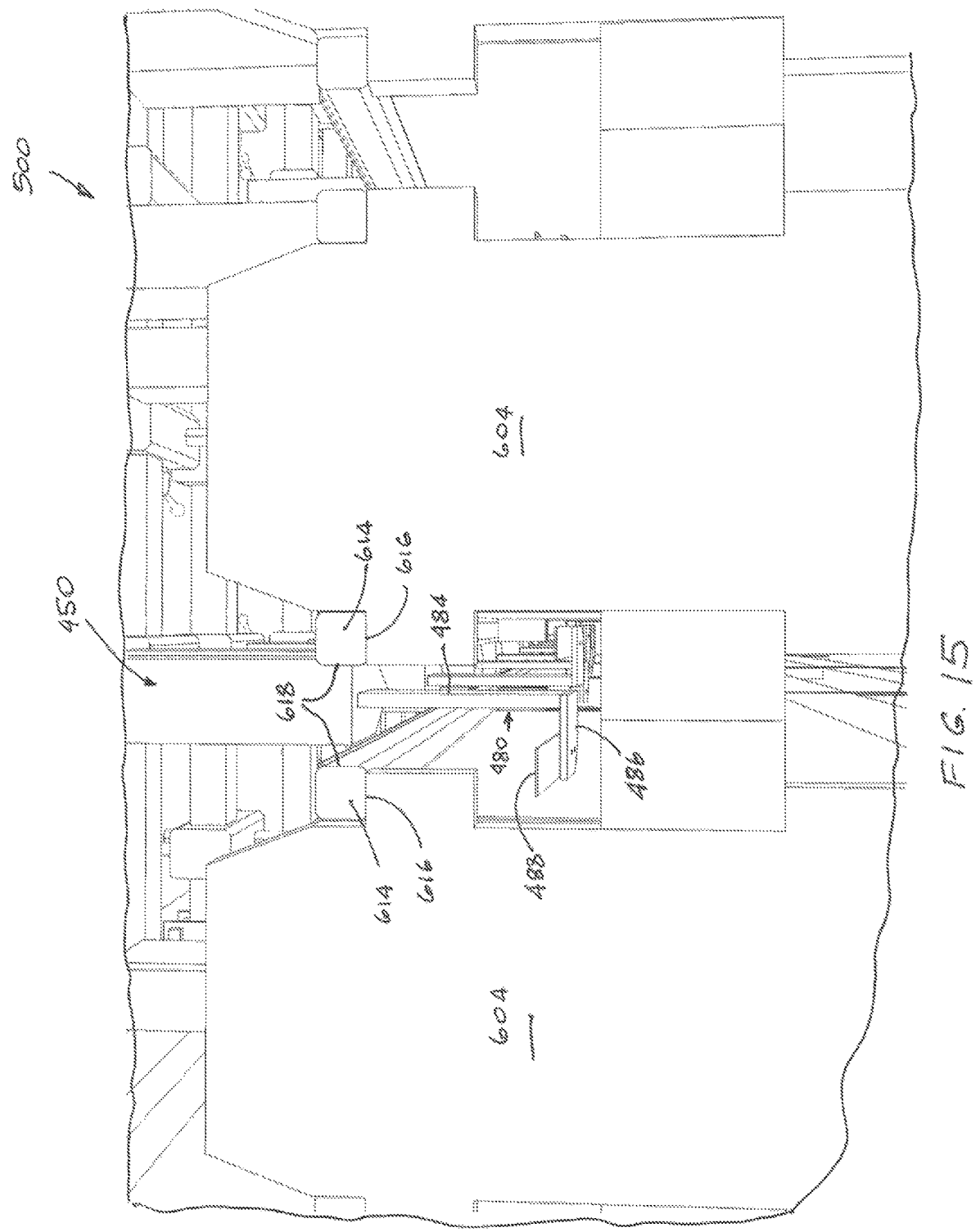
FIG. 15 illustrates a partial enlarged perspective end view of the apparatus of FIGS. 8-11 in a combination with the conveyor of FIGS. 1-4 and the container assemblies of FIGS. 12-13.
Figure 16:
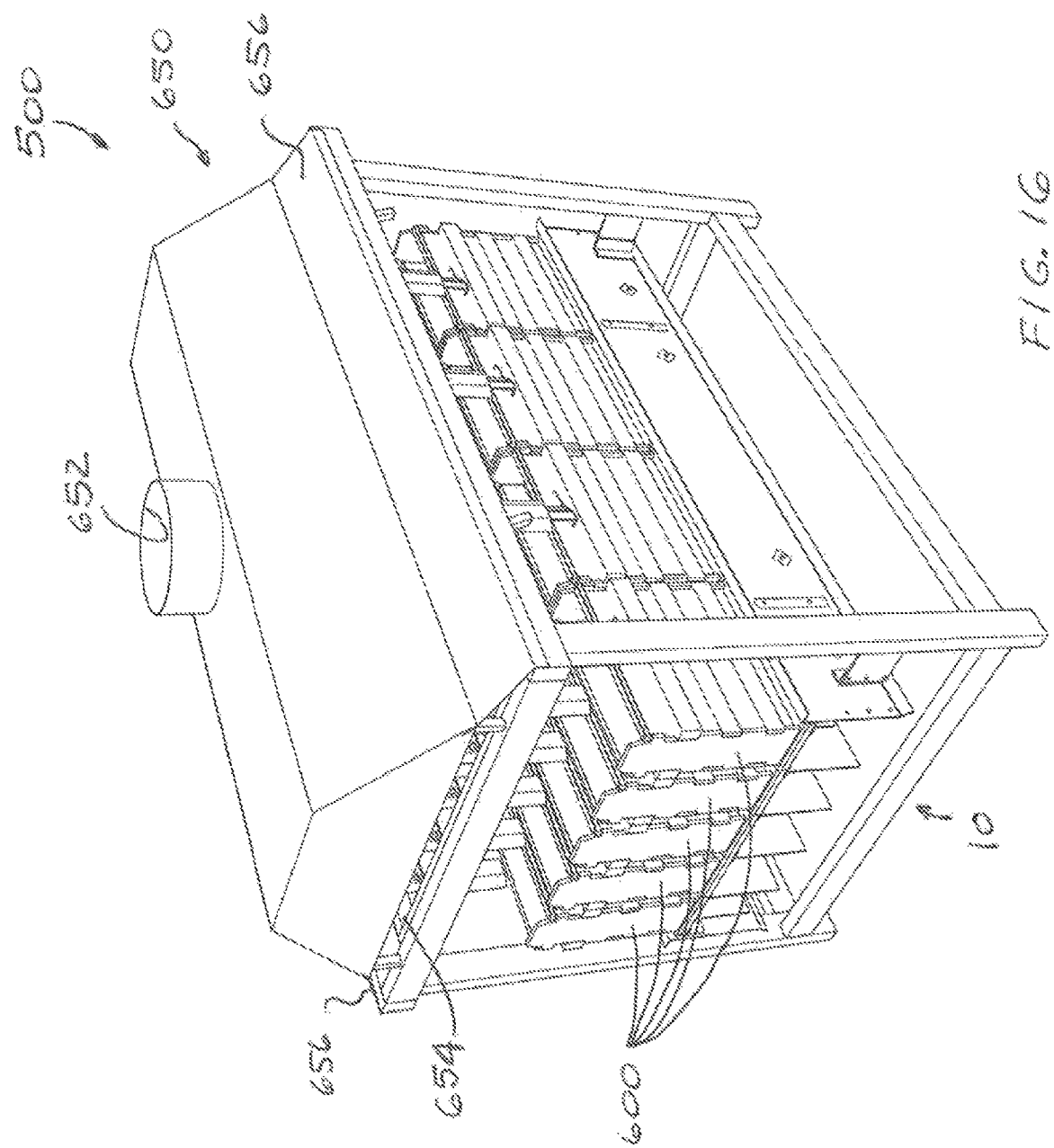
FIG. 16 illustrates a 3-D view of the apparatus of FIGS. 8-11 in a combination with the conveyor of FIGS. 1-4 and the container assemblies of FIGS. 12-13 and also showing an optional hood.

FIGS. 14-16 illustrate operation of the apparatus of FIGS. 7-11 in a combination with the conveyor 10 of FIGS. 1-3 and the container assembly 600 of FIGS. 12-13.

The exemplary oven 500 is configured to process twenty (20) containers 600 simultaneously with each other. In general, the number of container assemblies 600 depends on the length of the time that dough needs to be cooked or baked and desired production output. The container assemblies 600 are moved by the conveyor 10 into the positions under the devices 450 from the inlet end 502 along the flow path 506. During movement of the container assemblies 600 each force exerting member 150 engages an edge of the void 603 in the closed bottom member 602 of the container 601 and incrementally pushes the container assembly 600 in a flow direction 506 due to operation of the powered member 130. When the stroke of the powered member 130 is completed, the direction of the powered member 130 is reversed, by a control unit 286, and the force exerting members 150 travel opposite the flow path 506 pivoting downwardly under the un-voided portions of the closed bottom 602.

The length or height of the body 454 can be sized such that the bottom surface 464 is disposed below the top of the container assembly 600. The edge 456 on each device 450 can be also positioned to face the inlet end 502 or in a direction opposite to the flow path 506. The tapered surfaces 458 then easily accommodate variances in the spacing between a pair of adjacent container assemblies 600 due movement of the container assemblies 600 due to motion of the conveyor 10, 200 and at least prevent if not eliminate collision of the container assemblies 600 with the devices 450 during movement along the flow path 506.

As is best shown in FIG. 15, as container assemblies 600 move in respect to the devices 450, the electrodes 488 are spaced a distance, in a vertical direction, from the electrodes 614. The distance is sufficient to allow unobstructed movement of the container assemblies 600.

When the container assembly 600 is being positioned within the frame 508 of the oven 500, by way of the conveyor 10, and aligned with a respective pair of devices 450, the electrodes 488 do not contact the pans 610 and, more particularly, with the electrodes 614. When the positioning or alignment is completed, the powered member 560 is actuated to extend the rod end 564 and lift the third frame 530. Lifting movement of the third frame 530 causes the lifting movement of the devices 450 and further causes a contact between the electrode 480 and a bottom surface 616 of the electrode 614 of a respective pan 610.

When the electrodes 488 are in a direct contact with the electrode, 614, the voltage is supplied to each electrode 488 through wires 490 and subsequently to the pans 610 through electrodes 614, initiating the cooking or baking process. Thus, when two electrodes 488 connect voltages of different polarities to opposing pans 610, the electrical resistance is generated and passed through the dough, thus enabling baking or cooking thereof. After the dough has been sufficiently baked or cooked, as determined by the dough type, the powered mover 560 is actuated so that the movable portion 564 thereof moves in an opposite direction (opposite of the flow path 506), causing the downward movement of the electrodes 488 and disengagement of the electrodes 488 from the electrodes 614. The supply of voltage to electrodes 488 can be disconnected after the dough is sufficiently baked or cooked. The container assemblies 600 are now allowed to be moved, by way of the conveyor 10, to and through the outlet or discharge end 504 and the new batch of the container assemblies 600 is moved into the positions underneath or below the devices 450 from the inlet or intake end 502. It must be noted that the voltage can be supplied continuously to the electrodes 488, particularly when the containers 601 are manufactured from an electrically non-conductive material. During cooking or baking process, the dough can rise above the flange 612 and accumulate on the surface thereof. This condition does not affect the operation of the electrodes 488 that contact the container assembly 600 at the surface 616, which is opposite, in a vertical direction, from the surface of the flange 612. This overcomes problems of existing methods where the electrode contacts the top flange that may be covered, partially or completely, with risen dough. If the dough covers a portion of the top flange where the electrode is configured to contact it, the electrode may not establish required contact with the flange, thus resulting in an inconsistent cooking or baking of the dough. In other words, the electrode when contacting the top surface of the flange may have to press through the dough acting as an electrical insulator. Contact of the electrode 488 with the bottom surface 616 of the electrode 614 overcomes this problem. Thus, even when the dough overflows the flange 612 and drips down along the vertical surface 618 of the electrode 614, the contact quality or electrical continuity between the electrode 488 and the surface 616 is unaffected. Contact of the electrodes 488 with a bottom surface 616 of the electrode 614 overcomes disadvantages of electrodes contacting the top surface of the flange 612 that may be covered, either partially or completely, with dough. Furthermore, this arrangement can overcome arching issues causing damages to the contact surfaces.

The illustrative container assembly 600 with removable pans 610 in advantageous in making large bread loaves for further reprocessing into bread crumbs or cube-shaped pieces to be transformed into croutons.

It would be understood that the container assembly 600 can be redesigned to bake or cook bread loves for individual consumption. The pans 610, for example, can be secured rigidly to the first members 604 and the height of the container assembly 600 reduced to sufficiently to produce conventional bread loaves.

FIG. 16 illustrates the apparatus of FIGS. 8-11 that is adapted with a hood 650. The hood 650 has a top opening 652. When in use, the hood 650 defines a pair of end openings 654 between edge(s) of the hood and top portion of the oven 500. The slopping shape of the hood 650 including flanges 656, is configured to channel any condensation dripping away from the processing area inside the oven 500 and toward the floor area. The hood 650 can be detachably or permanently secured to the frame 508.

The hood 650 channels steam away from the material being processed to prevent steam buildup in the manufacturing facility and prevent mold and mildew in the area around the oven 500. The hood 650 additionally provides a covering over the cooking product. During baking or cooking of the dough, the generated moisture is translated from the inside of the hood 650 to the outside of the hood 650 and channeled external of the oven 500.

Furthermore, the hood 650 is illustrated as being configured to redirect any fluid present above the oven 500 down to the floor of the manufacturing facility.

The hoods 650 or hoods of other constructions can be secured over one or more conveyors, for example on uprights 22, so as to cover the containers being conveyed to and from the oven 500. When used in a combination with discharge conveyor 10' and/or conveyor branch 1030, such hoods can limit condensation dripping from hot bread loaves Furthermore, the uprights 22 can be configured to carry utilities, such as hydraulic lines and electrical conduit, and secure any drip pans under the conveyors.

Figure 20:
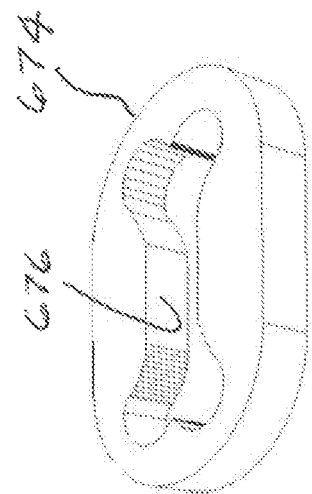
FIG. 20 illustrates a 3-D view of an exemplary container for holding a raw product to be baked or cooked, for example such as a dough or a cake batter.

FIGS. 17-18 illustrates an exemplary embodiment of the oven 500' that is constructed generally identical to the above oven 500, except that some devices 450 are being replaced with devices 660 and the frame 508 is modified, for example by actuating the powered member 560 to allow downward motion of the devices 450, 660. The device 660 can have the same body 454, albeit without the tapered edges when the container 600 is no longer used, as the device 450 so as to mount in the same manner and further comprise an electrode carrier 664 that is coupled by a link 662 to the body 454. The electrodes 666 are illustrated as being provided as a needle-type electrodes. The quantity of electrodes 666 depends on the area (footprint) of the material to be baked or cooked. It would be understood that end product, such as a cupcake or a small size personal cake will require less electrodes 666 than a round, square or rectangular cake. The pattern of electrodes 666 is generally selected based on the shape of the end product. In a non-limiting example, when the end product is a bone-shaped dog biscuit of FIG. 20, the electrodes 666 will be arranged in a bone-shaped pattern.

In the oven 500', one device 450 is provided in a combination with one device 660 and is coupled to a complimentary voltage. However, a device similar to the device 660 but perhaps with a smaller number of electrodes 666 or with one large electrode can replace the device 450 in the oven 500'.

Figure 19:
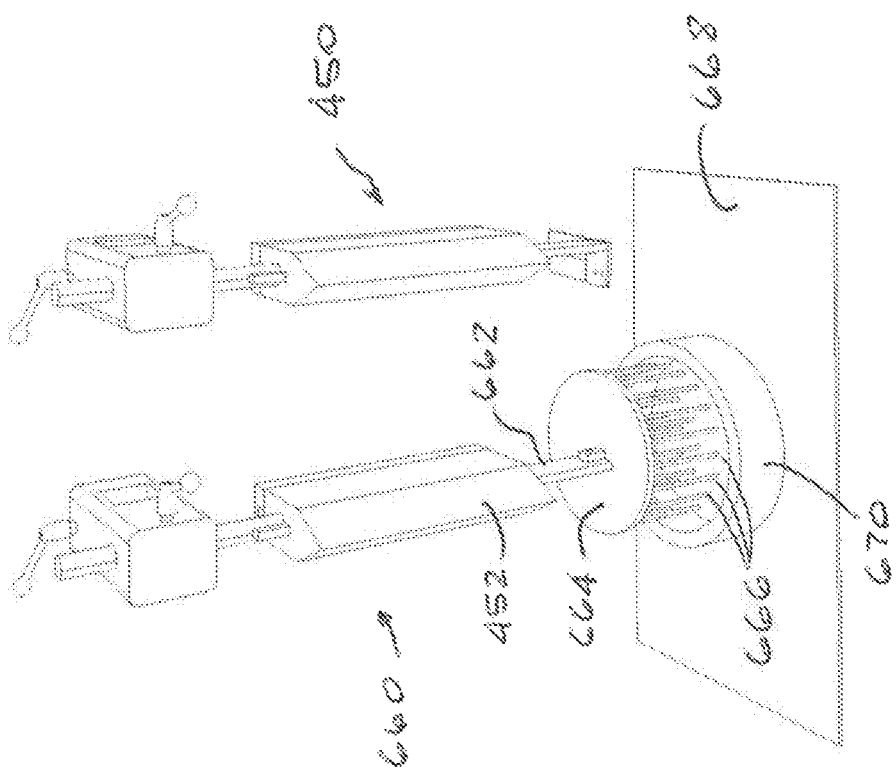
FIG. 19 illustrates a partial end view of an exemplary apparatus configured and operable for cooking or baking dough.

In the embodiment of FIGS. 17-18, the container 670 can be manufactured from a silicone material disposed on an electrically conducting sheet, pan or tray-shaped member 668, as is best shown in FIG. 19. Such container 670 can be referred to as a mold. Such mold 670 can have a ring shape for making cupcakes or cakes or be a container 674 of FIG. 20 with the above described bone-shape cavity 676 for making dog biscuits. In other words, the internal cavity 672, 676 of the container can be selected based on a cross-sectional shape of the final product. In operation, device 450 can be coupled to the tray-shaped member 668 while the needles 666 of the device 660 can be inserted into the dough or cake batter. Although the illustrative mold 674 has a single cavity 676, it will be understood that multiple cavities 676 can be incorporated into the mold 674 defining a tray-like mold configured to cook or bake a batch of dog biscuits or like animal treats.

Other media besides silicone can be used, including, without limitation, wax paper, stainless ring, rice paper, or other. Tray-shaped member 668 can host a single product or multiple product. Tray-shaped member 668 can be contoured and or have a cavity for the silicone mold to be set into or affix into. Silicone mold 670 can be also contoured. Pan 668 can be used to bake/cook/cure/or other more than just batter. For example, dog biscuits can be cooked this way or in a two piece mold, or a two piece mold with two opposing pans with a non-conductive middle molded to the unit being baked, cooked, cured, or other.

The raw batter for cupcakes can be inserted directly into a paper cup (container) and the needles 666 with the positive current can lower down and bake the cupcake.

Needle-like electrodes 666 are generally inserted into the batter at a depth sufficient to cook or bake the batter. The electrodes 666 can move during the baking or cooking process in a vertical direction so as to change penetration depth with the batter during cooking process if it is determined that a fixed height penetration depth during cooking process overcooks a region or regions of the end product. The cavities left in the cooked cupcake is generally not a concern as a frosting is generally applied onto upper surface of the cupcake prior to consumption. It is further contemplated that cavities made by needle-like electrodes 666 may promulgate a mode desired penetration of the frosting into the body of the cupcake or insertion of other ingredients into the cupcake body. In applications directed to cupcake making, the system 1000 can be adapted with additional devices, for example such as frosting applicator. Such frosting application can be integrated with the structure of the oven 500' or being disposed remotely therefrom. When the system 1000 is configured to make cupcakes or the like food products, proofing zone will not be required as the raw batter does not need to rise. In other words, the oven 500' can be positioned directly adjacent the conveyor branch 1020. Furthermore, the illustrative oven 500' can be configured for a manual feeding or the raw batter and discharged of the baked or cooked cupcakes. In one example, a length of the conveyor 10 within the oven 10 can be increased so that each end of the conveyor 10 protrudes outwardly from the end of the frame 508. An additional row of force exerting members 150 can be added at least one the inlet end 12, allowing manual placement of the containers with raw batter onto the conveyor 10 for processing. Thus, the oven 500' can be easily configured for use in small bakeries with the number of cupcakes being baked or cooked in a single batch adjusted based on throughput needs and cost considerations. In such application, the mold 670 can have multiple cavities to resemble a conventional cupcake baking pan. Although, in this application, the minimum number of rows of force transmitting members 150 can be two, with one force transmitting member 150 operable to position the container under the electrodes and the other force transmitting member 150 operable to discharge baked or cooked product. In other words, the oven 500' can be configured to manually load cupcake batter and bake or cook a single cupcake at any given time.

In one example, the oven 500' can be configured in a small-scale operation to cook or bake bone-shaped or other shape biscuits for consumption by animals.

In one example, the above described oven 500 can be configured for use in small-scale bakeries.

Other food products, for example as bread sticks and even biscotti's can be manufactured by the above described system.

It is further contemplated herewithin that the needles 666 can be replaced with flat or curved electrodes. In a non-limiting example, such electrodes can be inserted between the inner surface of the mold 670, for example such as the inner surface of the cavity 676 of FIG. 20, and cupcake batter.

The material lifting device can be a device 700 as disclosed in the U.S. non-provisional patent application Ser. No. 15/388,484, titled "APPARATUS, SYSTEM AND METHOD FOR MATERIAL HANDLING AND/OR PROCESSING" and filed on Dec. 22, 2016 by applicant ZME, LLC and issued as U.S. Pat. No. 9,745,137 B2 on 08-29-2017.

Figure 21:
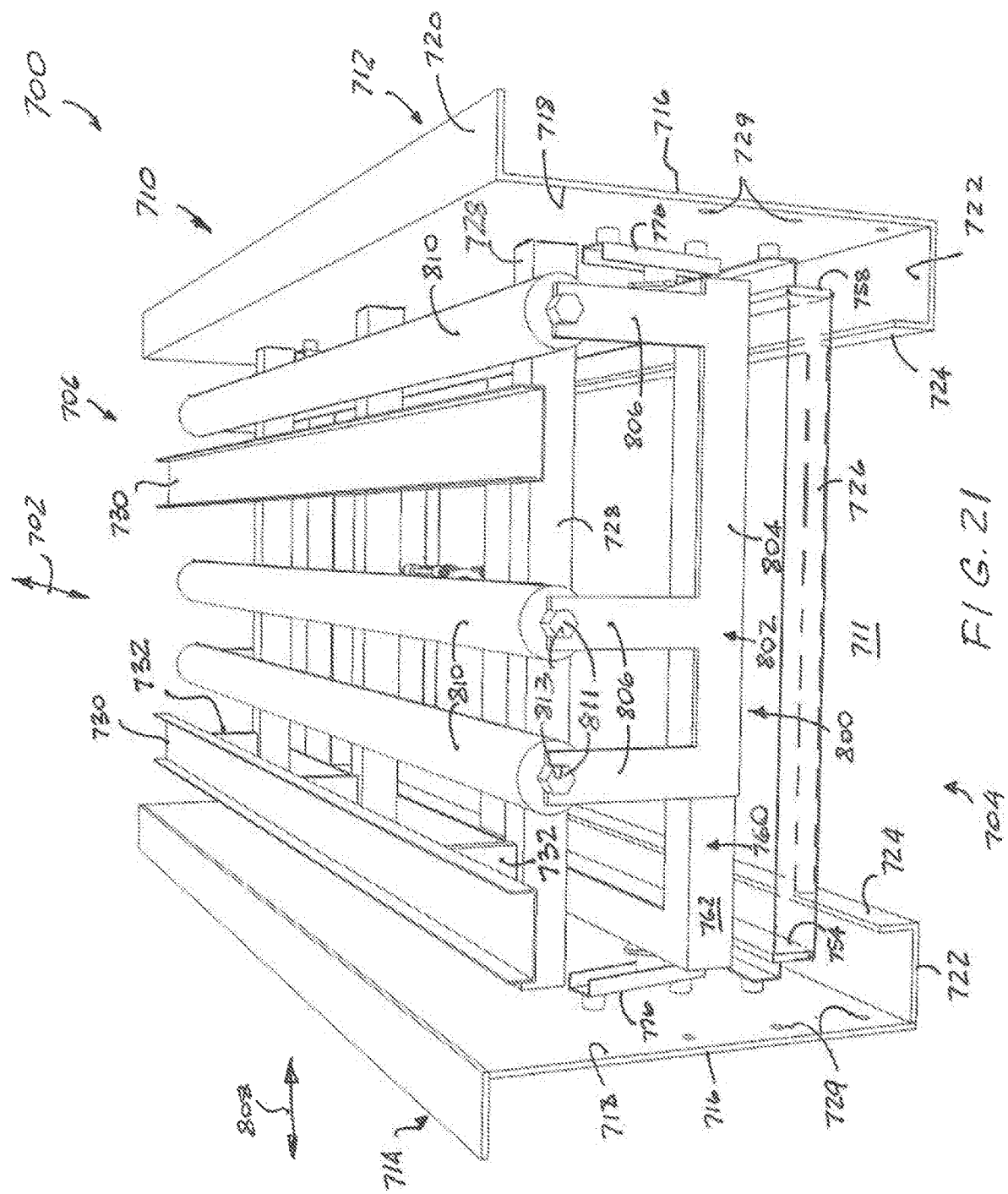
FIG. 21 illustrates an end perspective view of an exemplary material lifting device.
Figure 22:
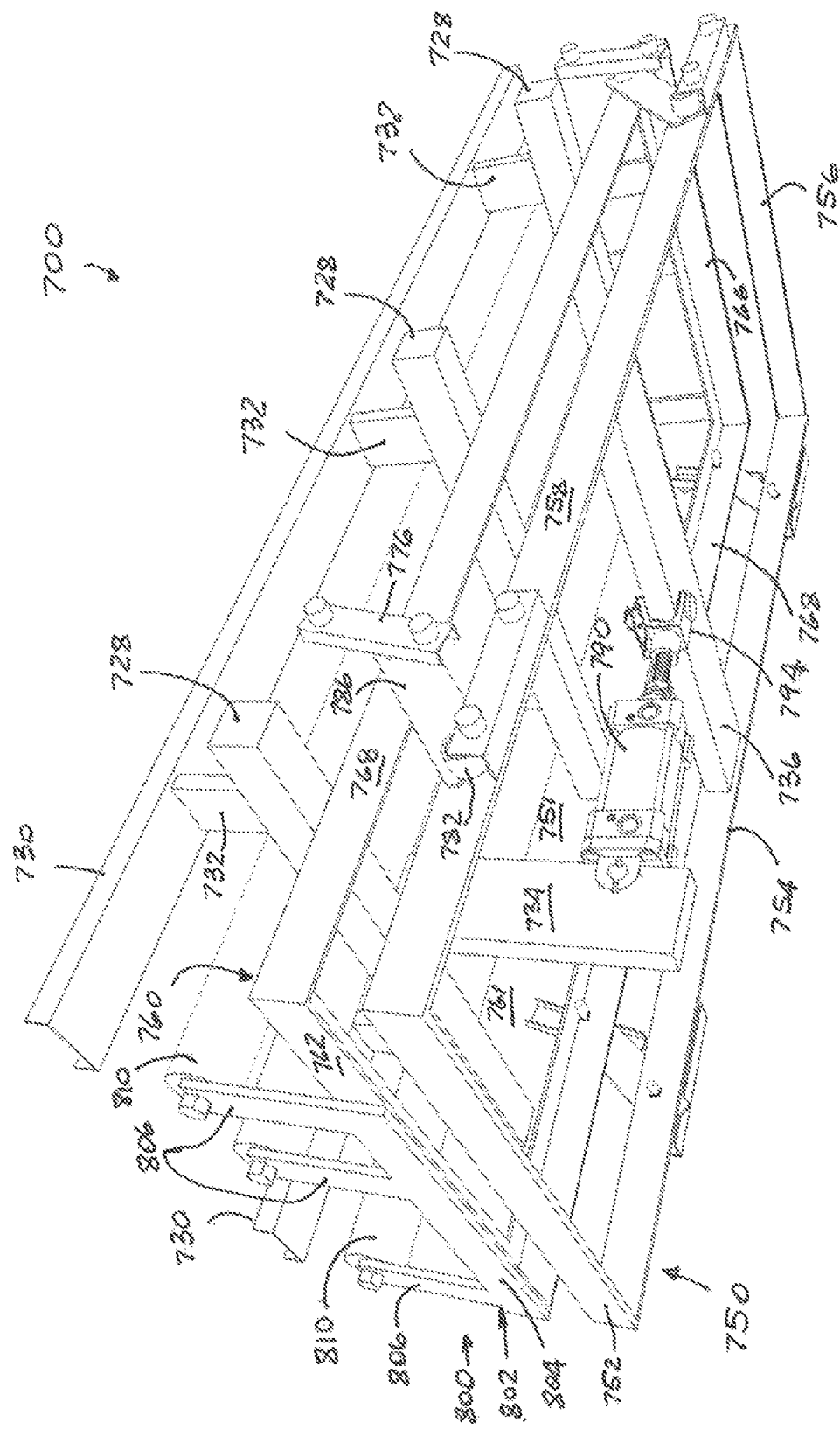
FIG. 22 illustrates a side 3-D view of the exemplary material lifting device of FIG. 21 with a first frame removed for clarity.
Figure 23:
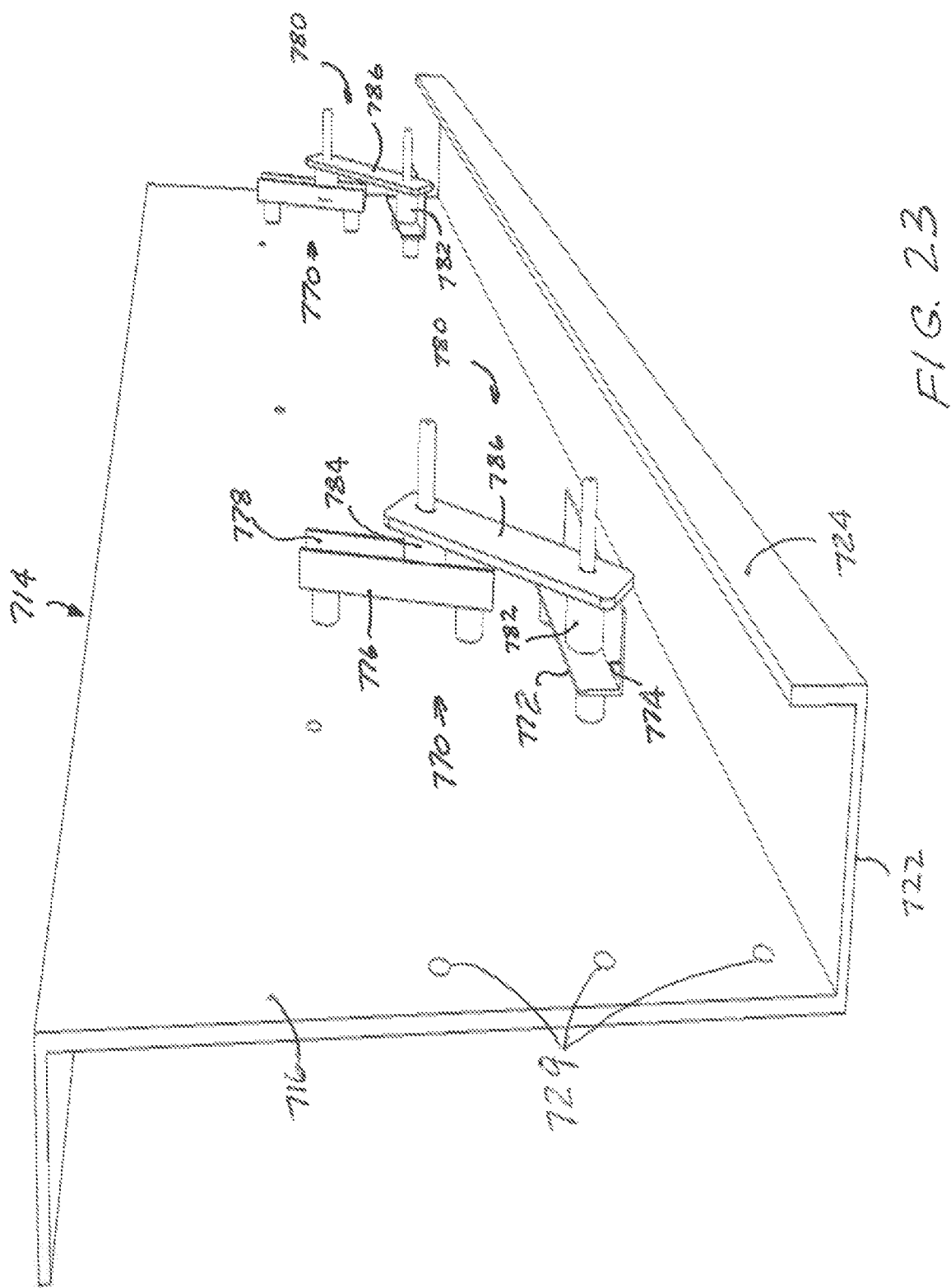
FIG. 23 illustrates another partial perspective view of the exemplary material lifting device of FIG. 21.

For the sake of reader's convenience, the material lifting device 700 is described below in reference to FIGS. 21-23. The material lifting device or a device 700 is configured and operable to move material along a conveying path or a first direction 702 between an inlet end 704 and an outlet or discharge end 706. The device 700 is being further configured to temporarily change elevation of the material prior to and/or after the movement of material and is being further configured to move material in a second direction being disposed generally normal or at an inclined to the first direction. The device 700 can be also referred to as a material handling conveyor.

The exemplary material lifting device 700 comprises a first frame 710. The first frame 710 is configured as a stationary frame. The first frame 710 has a hollow interior 711 defined by a pair of side members 712 and 714, spaced apart from each other during use or operation. A length of each side member 712, 714 is disposed or oriented along the first direction 702. Each side member 712, 714 may be configured to define a main portion 716 with a vertically disposed surface 718. Each side member 712, 714 may be also configured to define flanges 720, 722 and 724, although less of more flanges are also contemplated herewithin. Flanges 722 may be configured to support the device 700 on a horizontal surface or any other structure. The side members 712 and 714 may be rigidly connected therebetween with one or more first braces 726. In an example, each end of the first brace 726 can be rigidly coupled to a flange 724 by any one of welding, adhesive and fastening. The side members 712 and 714 may be further rigidly connected with one or more second braces 728, for example having each end thereof rigidly coupled to the main portion 716 by any one of welding, adhesive and fastening. Apertures 729 may be provided through the thickness of the main portion 716, at one or both end region thereof, to fasten a pair of conveyors 700 along the first direction 702 or fasten the conveyor 700 to any other conveyor or structure. In an example, the end regions with the apertures 702 may be also configured to suspend the device 700 where it does not touch any horizontal surface. In this example, the device 700 may be configured without flanges 722 and 724 and even without first braces 726 and flanges 714. Or, the first brace 726 can be rigidly coupled, at each end thereof, to the main portion 716.

In an embodiment, the device 700 further comprises a conveying means or a device represented by one or more tracks 730. During operation, one or more tracks 730 receive material for movement along the conveying path or the first direction 702. The one or more tracks 730 may be directly supported on the one or more second braces 728 or may be spaced from the upper surfaces thereof with spacers 732. In the example of FIG. 49, the tracks 730 are shown as having a U-shaped cross-section in a plane normal to a length of the track 730. In such example, each track 730 can be configured to receive a chain of a chain conveyor (not shown). In an example, the tracks 730 can be adapted with rollers to define a roller conveyor. In an example, the tracks 730 can have a smooth upper surface, similar to the above described surface 218 or 228, to define a conveying surface and even be defined by a member with a low coefficient of friction. In other words, the tracks 730 can be components of any above conveying means configured and operable to convey or move material in the first direction 702. In an embodiment, the one or more tracks 730 can be provided as components of an external/independent conveyor and thus can be optional components of the device 700.

The device 700 also comprises a second frame 750. The second frame 750 also has a hollow interior 751 defined by peripheral members 752, 754, 756 and 758. The second frame 750 can be sized and shaped to fit within the periphery of the first frame 710. Such peripheral members 752, 754, 756 and 758 may be provided as hollow tubular members to reduce weight of the second frame 750. Such peripheral members 752, 754, 756 and 758 may be provided as strips or bars. Such peripheral members 752, 754, 756 and 758 may be disposed coplanar (i.e. in the same plane) with each other. As it will be explained later, the second frame 750 is mounted for a movement in a generally horizontal plane during use of the device 700.

The device 700 also comprises a third frame 760. During use, the third frame 760 is positioned above the second frame 720. The third frame 760 also has a hollow interior 761 defined by peripheral members 762, 764, 766 and 768. The third frame 760 can be sized and shaped to fit within the periphery of the first frame 710. The third frame 760 may be sized generally equally to the second frame 750. Such peripheral members 762, 764, 766 and 768 may be provided as hollow tubular members to reduce weight of the third frame 760. Such peripheral members 762, 764, 766 and 768 may be provided as strips or bars. Such peripheral members 762, 764, 766 and 768 may be disposed coplanar (i.e. in the same plane) with each other. As it will be explained later, the third frame 760 is mounted for a movement in both generally horizontal and generally vertical planes during use of the device 700.

The first, second and third frames, 720, 750 and 760 respectively, are interconnected in the following manner. Slide or track assemblies 770 are stationary mounted on the interior of the first frame 710 and, more particularly, on the inner surface 718 of the main portion 716. Four slide or track assemblies 770 can be used. Each slide or track assembly 770 is being positioned adjacent a respective corner or end of the first frame 710. Each slide or track assembly 770 comprises a first member 772 with a working surface 774. The working surface 774 is positioned generally horizontally during use of the device 700. Each first member 772 is shown as having an L-shaped cross-section. Other cross-sections are also contemplated, including a U-shaped, solid or tubular cross-section of the first member 772 defining the working surface 774. Since, the working surface 774 is horizontally disposed and supports, in a vertical plane, a weight of at least the second frame 750, a single working surface 774 is sufficient herewithin. However, a second working surface 774, for example being provided by a first member with a U-shaped cross-section can be also employed herewithin. Each slide or track assembly 770 also includes a second member 776 with the working surface 778 that is disposed at an angle or inclined to the working surface 774. Each second member 776 is shown as having a U-shaped cross-section with a pair of oppositely positioned working surfaces 778. Such pair of working surfaces 778 helps to accommodate any undesired movement or play of the second frame 720 and maintain a contact between a second roller 784 described below and at least one of the pair of working surfaces 778. However, a single working surface 778 is also contemplated herewithin if, for example, a separation of the roller 784 from the working surface 778 is not an issue. Other cross-sections are also contemplated, including a solid or tubular member defining the working surface 778. The first and second members, 772 and 776 respectively, are illustrated as being provided as separate members. In this example, the first and second members, 772 and 776 respectively, are stationary affixed to the inner surface of the respective side member 712 or 714. Carriage or roller assemblies 780 are also provided. Each carriage or roller assembly 780 comprises a first roller 782 that is rotationally affixed on the exterior of the second frame 750 and is adapted to roll or rotate on the working surface 774 during use of the device 700. The second roller 784 is rotationally affixed on the exterior of the third frame 760 and is adapted to roll on the working surface(s) 778 during use of the device 700. The carriage or roller assembly 780 also comprises a link 786 that is coupled to the first and second rollers, so that both first and second rollers, 782 and 784 respectively, have to move together. In other words, the distance between first and second rollers, 782 and 784 respectively, does not change during operation of the device 700 and the first and second rollers, 782 and 784 respectively, must roll in unison with each other.

The device 700 further comprises a powered member 790 that is configured to generate a linear motion. In the embodiment of FIGS. 21-22, such powered member 790 is illustrated as a hydraulic or pneumatic cylinder, that has a piston end 792 thereof affixed to the first frame 710, for example to a mounting member 734 that is suspended from one of the cross-braces 728 and has a rod end 794 thereof affixed, stationary or pivotally, to a brace 736 of the second frame 750. The cylinder 790 can be adapted with a quick disconnect fittings for ease of quick removal/replacement of the internal frame and for cleaning or service purposes. In operation, the powered cylinder 790 is actuated to extend the rod end 794 and to move the second frame 750 in a horizontal direction, from left to right in FIG. 22. Such movement of the second frame 750 causes each first roller 782 to move horizontally on the respective working surface(s) 774 and further causes each second roller 784 to move on the respective inclined working surface(s) 778. The movement of the second rollers 784 causes the movement of the third frame 760 in both horizontal and vertical directions. The powered cylinder 790 is also actuated to retract the rod end 794 and move the second frame 750 and the third frame 760 horizontally in a direction from right to left in FIGS. 21-23 and also move the third frame downwardly. The powered member 790 can be also an electrically powered drive. In an example, such electrically powered drive can be a solenoid, mounted and coupled essentially in the same manner as the above described powered cylinder 790. In an example, such electrically powered drive can comprise a screw and nut components, with the nut being connected to the second frame 750 and translating on the screw. In an example, such electrically powered drive could comprise of a magnetic rack and pinion type with the pinion rotateably mounted on the first frame 710 and the rack mounted stationary on the second frame 750.

The device 700 further comprises a material carrying assembly 800 configured to enable movement of the material in a second direction 808 being generally normal to the first direction 702. The assembly 800 comprises material carrying members and support member(s) configured to elevate, in a vertical direction, the material carrying members above third frame 760. Such material carrying members comprise three rollers 810 and such support member(s) comprise a pair of roller mounting members 802 rotateable support the three rollers 810 thereon. The material carrying members define working surfaces 812 of the assembly 800 and of the device 700. In the example, such working surface 812 is a peripheral surface of each roller 810. Each roller mounting member 802 is positioned at one end of the device 700. Each roller mounting member 802 can comprise a first portion 804 stationary affixed, either permanently or detachably, to the peripheral members of the third frame 760, for example such as the peripheral member 762. Each roller mounting member 802 can also comprise three second portions 806 that upstand on the first portion 804. Each roller 810 has one end thereof adapted for a rotation on a respective second portion 806 of the roller mounting member 802. Thus, the longitudinal axis of the rollers 810 are aligned with the first direction 702 and the rollers 810 are positioned and configured to rotate in the second direction 808. Each roller 810 can be configured for a removal or installation without use of any special tools. As is best shown in FIG. 21, each end of the roller 810 can be adapted with a hex-shaped or otherwise non-round member 811 that fits into a complementary notch 813 in the second portion 806 while allowing rotation of the rollers. Thus, the rollers 810 can be easily replaced or removed for cleaning purposes. The number of rollers 810 can be selected based on at least one of a width of the material to be transported, a particular application, and a type of the conveying device or means. In an embodiment, at least a pair of rollers 810 is contemplated as sufficient to support the material moving in the second direction 808, although more than three illustrated rollers 810 are also contemplated herewithin.

It is to be understood that the first frame 710, the second frame 750, the third frame 760 and the assembly 800 may define a frame movable by a powered member 790 to change an elevation of a material relative to an elevation of the conveying device and enable a movement of the material in a direction being normal to a direction of the conveying device. In other words, such first frame 710, the second frame 750 and the third frame 760 can be referred to as a first frame portion 710, a second frame portion 750 and a third frame portion 760. The frame can be provided with or without the track assemblies 770 and the roller assemblies 780. It is to be further understood that the frame can be comprised of only one frame portion, for example such as the third frame 760. When the frame comprises only one frame portion, the frame also comprises the assembly 800.

Each material carrying member comprises a stationary member carrying a working surface, being a generally flat surface. The support members can be essentially the above described member 802 modified to mount stationary members thereon. Such stationary member can comprise, either completely or partially, a material with a low coefficient of friction. In an example, such material may comprise UHMW plastic. The stationary member can also be adapted with a coating comprising material with a low coefficient of friction, with the coating defining the working surface. In an example, such coating material may comprise UHMW plastic. Furthermore, the exemplary three stationary members may be replaced with a single stationary member comprising a material with a low coefficient of friction. Such single stationary member can be positioned between the tracks 730 and sized sufficient to support the material moving in the second direction 808. The flat working surface can be smooth. The flat working surface can be provided with grooves, cavities or protrusions to minimize surface-to-surface contact between the stationary member(s) and the material to be transported thereon. The material lifting device 700 can be simply fastened to floor or other structures for ease of installation, cleaning and/or replacement. Quick connection pins or thread on knobs, or other quick release fasteners are contemplated herewithin for retention of the material lifting device 700.

Figure 24B:
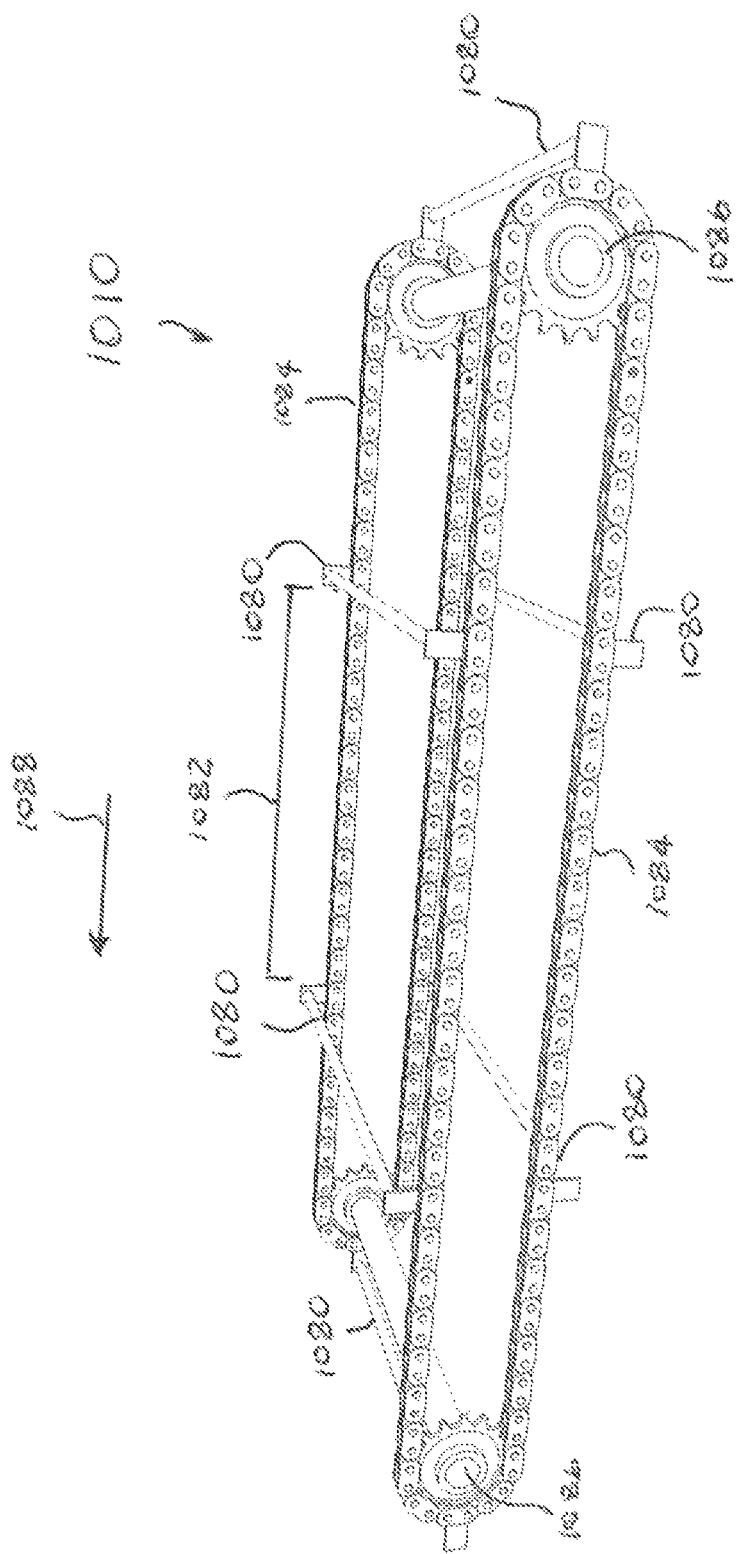
FIG. 24B illustrates a 3-D view of a device configured to change a direction of the material movement.

FIG. 24A illustrates one example of means for changing a direction of movement of the material either prior to or after processing. More specifically, in this example, means is illustrated as a material advancing device 1010 that comprises a device 1012 configured to generate a linear motion. The device 1012 can be a cylinder with a movable portion 1014. A member (bar) 1016 is secured to the movable portion 1014 and is therefore being mounted for a movement by the cylinder 1012. In operation, the device 1012 is so mounted, for example by a mounting member 1018, so that the member 1016 is positioned above a table or conveyor top surface and contacting, during use, the material to be advanced. The member 1016 can be flat and/or contoured to compliment the shape of the material being advanced. The member 1016 can be manufactured from any of the conventional material, for example, such metal, polymer, etc. The member of complex curved shapes can be manufactured by molding or casting processes. Such material advancing device 1010 operates to push material but may be configured to pull material.

FIG. 24A illustrates one example of means for changing a direction of movement of the material either prior to or after processing. More specifically, in this example, means is illustrated as bars 1080 spaced apart from each other by a distance 1082 sufficient to receive a batch of the containers. The bars are attached to two parallel chains 1084 moving on sprockets 1086. This means can be mounted above the moving containers, whereby the two chains 1084, that are to each side of the containers carry the bar 1080 down from above the containers behind the containers, and as a motor (not shown) drives the two chains 1084 with the bar 1080 between them in a forward motion, the bars 1080 advances the containers, from behind the containers, then, when the containers reach a specific location, the two chains 1084 on either side will move to return the bars 1080 back to the infeed side of their cycle, then around another set of sprockets down behind the next incoming batch of containers. During use, the movement direction 1088 will be aligned with the change in direction. In an example, the direction 1088 can be aligned with the first direction 1002.

In an example, the means for changing a direction of movement of the material either prior to or after processing can comprise robotic placement device(s) configured and operable to place material into a selected position or onto a selected surface. The selected surface can be a conveyor surface.

In one form the system 1000 can comprise one apparatus 1001 and one conveyor. In one form, the system 1000 can comprise one apparatus 1001, one or more conveyors, operable as infeed conveyors that convey material to the apparatus 1001, and at least one conveyor operable as a discharge conveyor that moves material away from the apparatus 1001. In one form, the system 1000 can comprise an apparatus 1001, one or more infeed conveyors, at least one discharge conveyor and a lifting table at one or both ends of the system 1000. In one form, the system 1000 can comprise an apparatus 1001, one infeed conveyor and one discharge conveyor. In one form, the system 1000 can comprise an apparatus 1001, one or more conveyor on either infeed or discharge end and a material lifting device 700 on an opposite end. In one form, the conveyor is disposed within the apparatus 1001.

Figure 25:
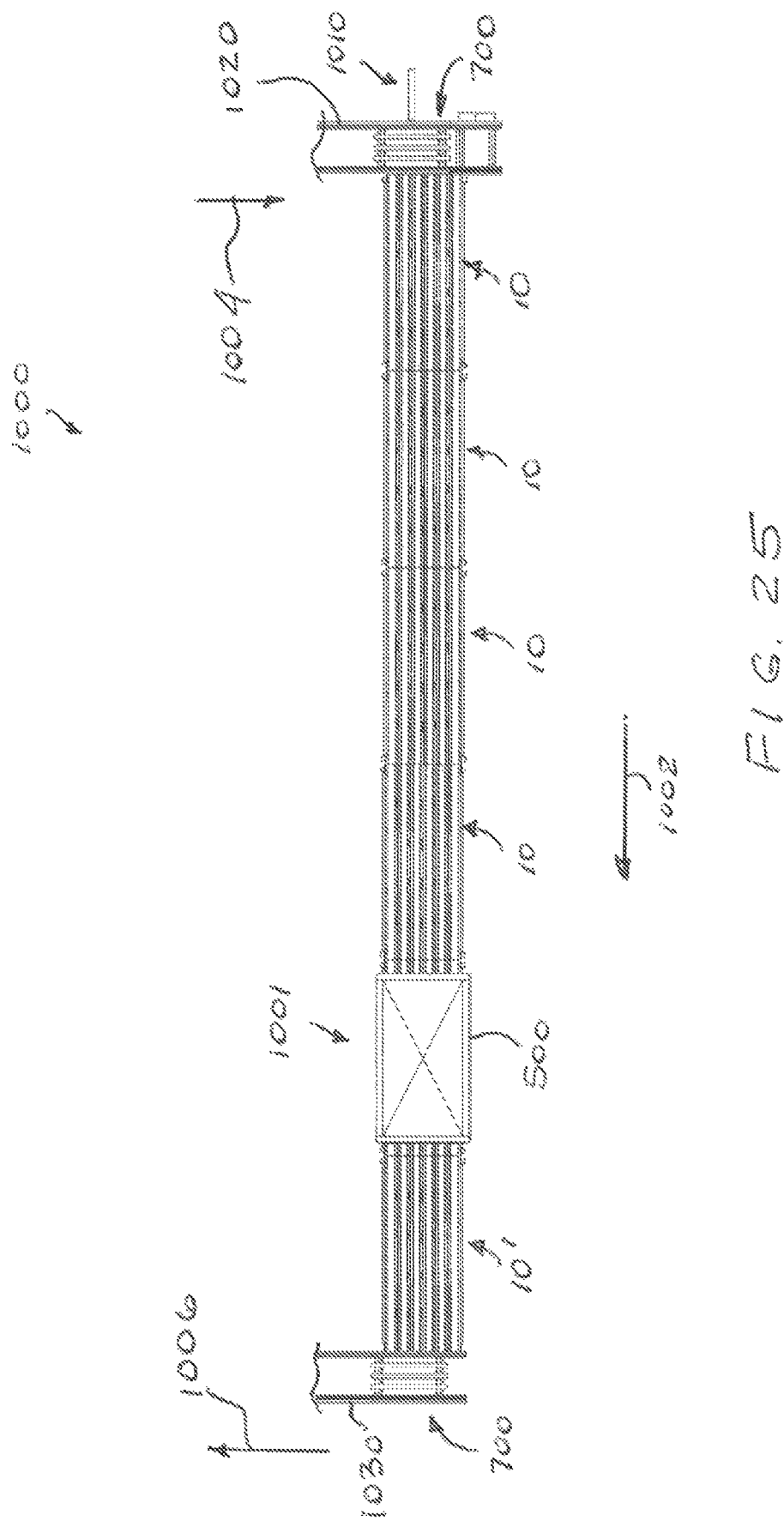
FIG. 25 illustrates a schematic diagram of an exemplary material processing system.

FIG. 25 illustrates an exemplary embodiment of the system 1000 that can be used in large-scale, high production environment. The system 1000 at least defines a first material movement path/direction or a conveying direction 1002. The system 1000 comprises infeed conveyors, the apparatus 1001, another conveyor disposed within the apparatus 1001 and a discharge conveyor. The system 1000 is configured or arranged as a linear system (in-line), where the apparatus 1001 and conveyors are disposed in a series with each other along the linear conveying direction 1002. The conveying direction 1002 is shown from right to left in FIG. 25, but opposite conveying direction 1002 is also contemplated herewithin.

In one form, the apparatus 1001 is the above described oven 500 that cooks or bakes raw dough into bread product with electrical resistance. The raw dough may be contained within containers 600 between a pair of metal pans configured for contact with electrodes. In this form, the oven 500 is configured to allow placement of the conveyor so that the containers 600 move under the electrodes 450. The electrodes can be configured to move upwardly or downwardly to connect voltage to metal pans. The oven 500 of FIG. 25 is illustrated as being configured to process multiple containers 600 containing dough therewithin. The electrodes can be of any type configured to communicate voltage from a power source.

In this form, the number of infeed conveyors 10 is selected to allow sufficient rise of the dough material prior to baking or cooking within the oven 500. In other words, the infeed conveyors 10 define proofing zone for the raw dough. An accelerated proofing zone can be implemented in the system 1000 as well. Heat can be applied through an enclosed area around the proofing zone with doors that opens and closes as containers are advanced in and out of the accelerated proofing zone. Steam can also be used to make an accelerated proofing environment. The accelerated proofing environment can be a single lane or multiple lanes.

The infeed conveyor, discharge and the conveyor disposed within the oven 500 can be an index or ratchet conveyor (conveyor) 10 using pivoting dogs that also reciprocally move in a linear direction.

Each illustrative conveyor 10 is configured and operable to advance multiple rows of containers 600 with multiple containers 600 in each row. More specifically, each conveyor 10 is illustrated as being configured and sized to support four rows of container 600 with five containers 600 in each row for a total of twenty containers 600. When the conveyor 10 is of the ratcheting/indexing type using pivoting dogs and being further configured to advance multiple rows with multiple containers in each rows, pivoting dogs arranged in series along the length of the conveyor 10 are mounted on a dedicated carrying members, with all carrying members connected by a connecting member to a single powered member for a linear movement in a first direction 1002 as well as in the reversed direction, i.e. reciprocal linear movement. Furthermore, the dogs are configured to pivot downwardly when they move in the direction being reversed to the direction 1002 and configured to positively stay in the upward position to push containers positioned on the conveyor 10 in the first direction 1002. The conveyor 10 within the oven 500 can be positioned/mounted independently from the frame of the oven 500 so that the conveyor 10 can be easily moved away from the oven 500 for cleaning and/or maintenance.

The discharge conveyor can be the above described conveyor 10' adapted with a kickback device 180 to partially move containers in a direction opposite to the first direction 1002.

In the embodiment of FIG. 25, the first direction 1002 coincides with the previously described material movement directions 4 and 506.

Other conveyor types can be used in a combination with the oven 500. Each conveyor may be of a conventional roller, belt or chain type. Belt conveyor can be a friction type belt or a chain-link type belt. In an embodiment, the indexing conveyor can be of a bi-directional ratchet conveyor type as disclosed in U.S. Pat. No. 5,320,212 issued to McIntosh et al. on Jun. 14, 1994 and whose teachings are incorporated in its entirety by reference. A combination of index/ratchet conveyor(s) and other conveyor type(s) can be used with the oven 500 within the system of FIG. 25.

In any of the conveyor embodiments, the conveyor 10 is configured to move each container 600 into a position under a pair of devices 450, with one device 450 from the pair of devices 450 connecting positive voltage and another device 450 from the pair of devices 450 connecting negative voltage.

It is not necessary that a length of the conveyor between the inlet end 502 and the outlet end 502 be equal to the length of the frame 508. In other words, the length of the conveyor can be smaller or greater than the length of the frame. It is also contemplated that ends of two distinct conveyors can abut each other within the frame 508. In other words, the conveyor has to be at least partially positioned within the frame 508. The conveyor can be provided as integral to the oven 500 or can be provided as a component of a production line with the oven 500 being operatively positioned for alignment with the container assemblies 600.

In operation, the containers 600 with raw dough are positioned or moved onto the infeed conveyors 10, are advanced by the infeed conveyors 10 onto the conveyor 10 within the oven 500, where the dough is baked or cooked, and then are discharged onto the discharge conveyor 10' when the dough is sufficiently baked or cooked. The discharge conveyor 10' can advance or transfer containers 600 onto a different conveyor branch, for example such as branch 1030, or the containers 600 can be removed from the discharge conveyor 10' either manually or by way of a robotic device.

The system 1000 of FIG. 25 is illustrated as comprising the material lifting device 700 and the device 1010 so as to transfer material moving on conveyor branch or portion 1020, that can be a chain conveyor, in a second direction 1004 onto infeed conveyors 10 and another material lifting device 700 so as to transfer discharged material onto the conveyor branch or portion 1030 for movement in a third direction 1006. Although it is contemplated herewithin that the system 1000 can be provided without the material lifting device 700 and the device 1010 or can be provided with more than two material lifting device 700 and more than one device 1010. When comprising the material lifting device 700 is provided, the first direction 702 will be aligned with the movement direction 1004 and/or 1006 and the second direction 808 will be aligned with the movement direction 1002. Furthermore, although the second direction 1004 and the third direction 1006 are being illustrated as disposed at right angles to the first direction 1002, the second direction 1004 and the third direction 1006 can be disposed at other angles as required by available space floor in a production facility.

When the system 1000 is configured to bake or cook dough, the apparatus 1001 can be an in-line oven of a type as manufactured by Despatch of Minneapolis, Minn., with the chain-link type conveyor being replaced by the index or ratchet conveyor 10.

The system 1000 of FIG. 25 can be adapted for processing non-food material.

In one form, the apparatus 1001 can be an apparatus that wraps a pallet as disclosed in U.S. Pat. No. 7,269,935 B2 issued to Jafari on Sep. 18, 2007, the entire contents of which are incorporated herein by reference. In this form, the conveyor 10 replaces belt conveyor 10a/10b. Thus, the system 1000 can be configured for use in applications for wrapping pavers, bricks, In other words, a machine for wrapping pavers, cement blocks or lumber with flexible film and banner film can comprise the above described conveyor 10 or any modifications thereof. For example, the conveyor 10 can be adapted to move only a single row of materials during a single stroke of the powered member 130.

In one form, the apparatus 1001 can be a heat shrink tunnel as disclosed in U.S. Pat. No. 9,103,595 B2 issued to Clurket on Aug. 11, 2015, the entire contents of which are incorporated herein by reference. In this form, the conveyor 10 or 200 can be configured for use in a shrink wrap tunnel machine or application. In other words, a shrink wrap tunnel machine can comprise the above described conveyor 10 or any modifications thereof. For example, the conveyor 10 can be adapted to move only a single row of materials during a single stroke of the powered member 130.

In one form, the apparatus 1001 can be a case packer for example such as Item PC-2500 "Continuous Motion Wrap-around Case Packer" or item 65TW-28 "Tray Wrapper Shrink Packaging System", both manufactured by ARPAC, LLC of Schaumburg, Ill. Thus, the system 1000 can be configured to wrap trayed metal cans, paper cans, glass jars, glass bottles, plastic jars and plastic bottles and boxes. In other words, a machine for wrapping trayed metal cans, paper cans, glass jars, glass bottles, plastic jars and plastic bottles and boxes can comprise the above described conveyor 10 or any modifications thereof. For example, the conveyor 10 can be adapted to move only a single row of materials during a single stroke of the powered member 130.

Figure 26:
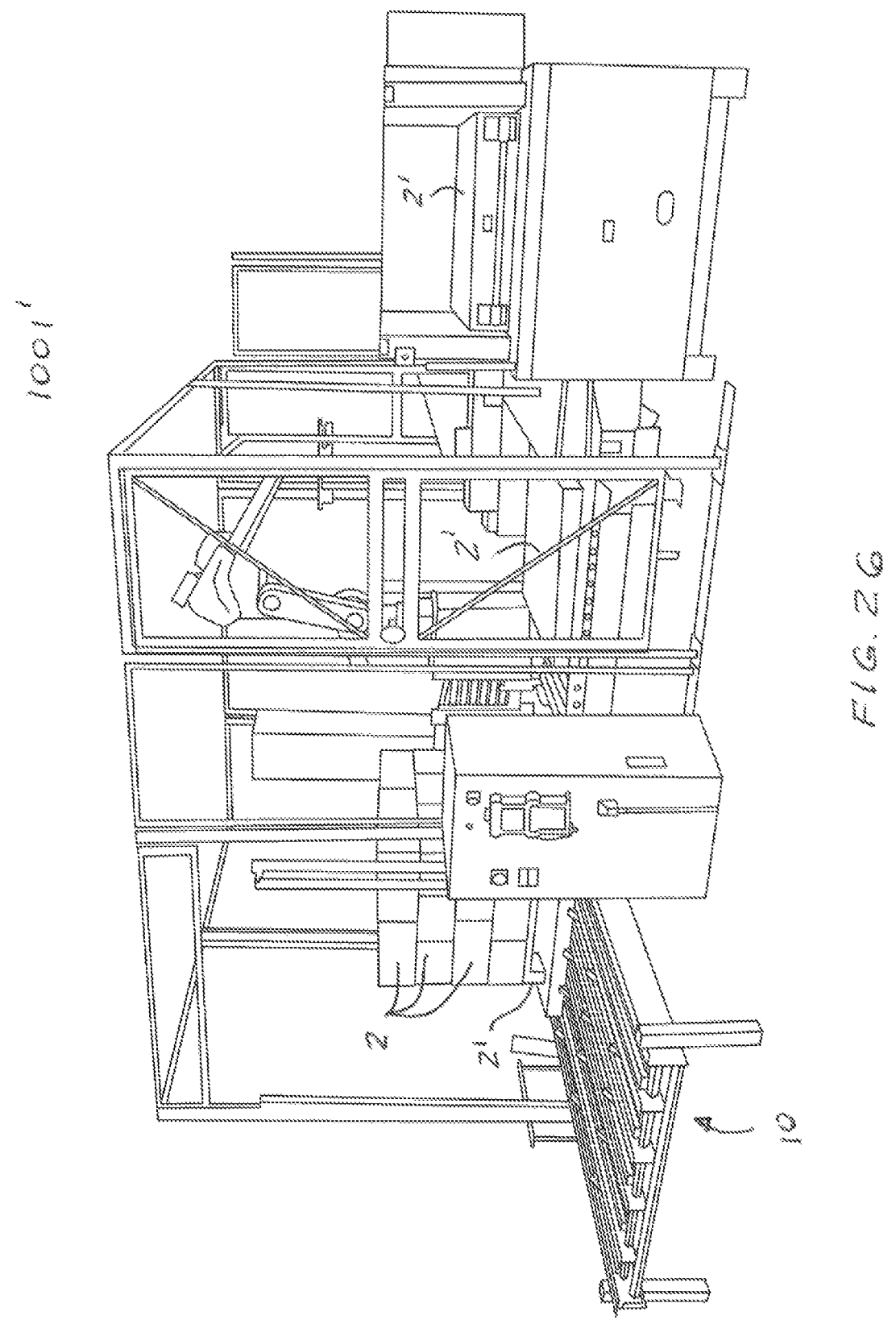

In one form, the apparatus 1001 can be an integrated robotic palletizer and stretch wrapper 1001' of the type as manufactured by ARPAC of Schiller Park, Ill. and is best shown in FIG. 26. In this form, the index or ratchet conveyor 10 replaces one or more roller type conveyors for advancing load 2 disposed on pallets or skids 2'.

In one or more forms, the index or ratchet conveyor can offer improved positioning control of the material and/or can minimize complexity of the control logic.

Figure 27:
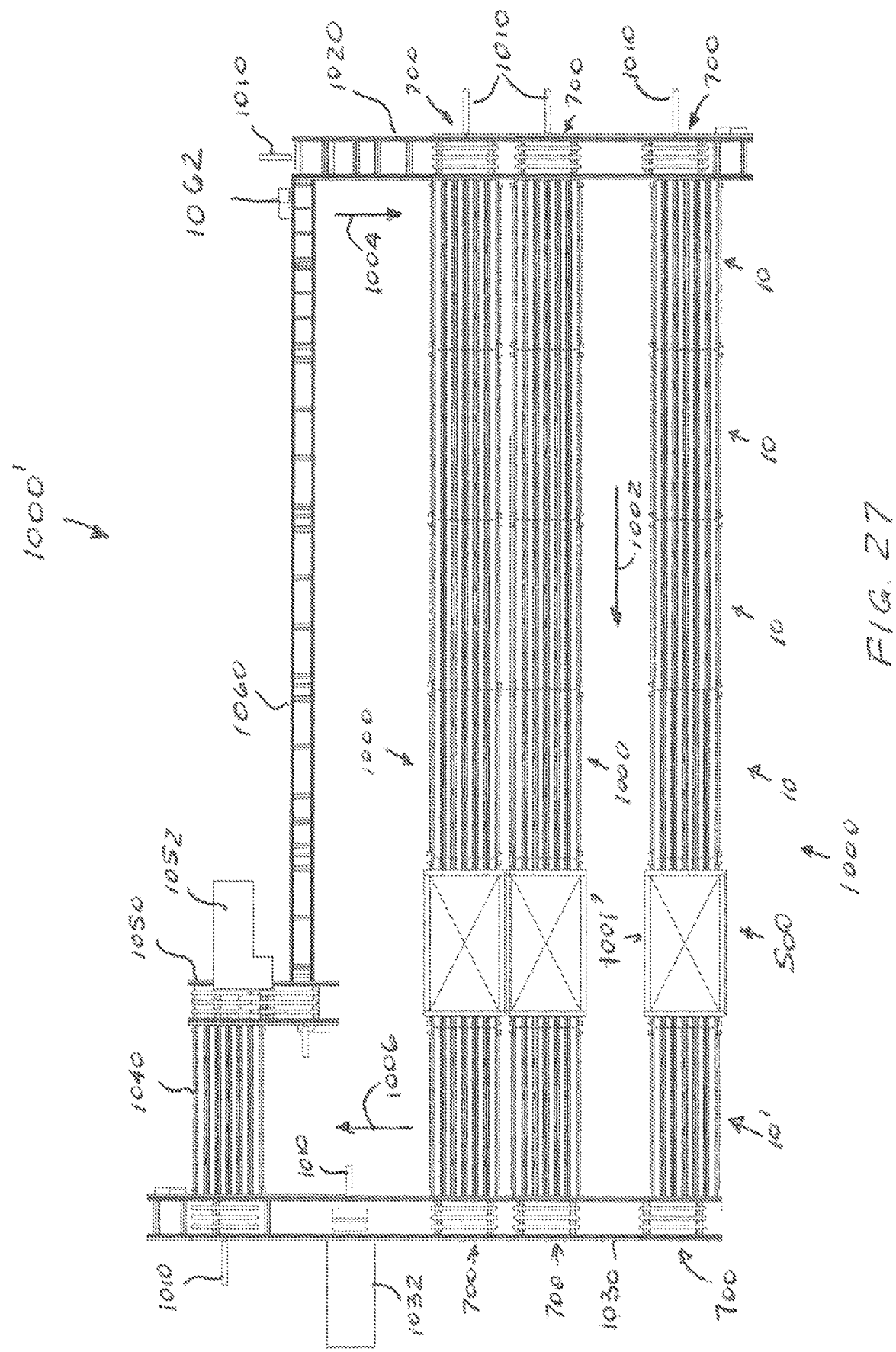
FIG. 27 illustrates a schematic diagram of an exemplary material processing system.

FIG. 27 illustrates an exemplary embodiment of a closed-loop system 1000' configured to bake or cook dough contained within containers, for example such as container assemblies 600, the closed-loop system comprising a plurality of the above described in-line systems 1000 of FIG. 25. The closed-loop system 1000' can be also used in large-scale, high production environment. In this closed-loop system 1000', the process may begin at a dough insertion station or dough inserting device 1062 that can be a component of the conveyor branch 1060 that carries empty container assemblies 600. The dough inserting device or station 1062 can comprise a dough forming device or station 1064 being anyone of a dough former, a dough segmenter, a dough divider, a dough roller or a dough fill station. Once each container assembly 600 is filled, by any conventional means, with dough, the container assembly 600 is advanced or transferred onto the system conveyor branch 1020, for example with the material advancing device 1010 and/or a material lifting device 700, for the movement along the second direction 1004. One or more force transmitting members 150 coupled to an independent powered device is also contemplated herein to move filled container assembly 600 to and/or from the dough inserting device or station 1062. Furthermore, a movable stop (not shown) can be provided to accumulate a selected number of container assemblies 600 so as to advance batches of container assemblies 600. The conveyor branch 1020 is generally sized so that it can carry a quantity of a single file formation of container assemblies 600 sufficient to fill available spaces on the conveyors 10 without creating voids or requiring stoppage of the system. The conveyor branch 1020 can comprise a conventional chain or belt type conveyor. When sufficient number of container assemblies 600 is positioned on material lifting devices 700 at an infeed to each system 1000, additional material advancing devices 1010 are employed to advance or transfer the container assemblies 600 onto the infeed index or ratchet conveyors 10 for incremental movement in the first direction 1002. While the containers 600 are being advanced on infeed conveyors 10, the dough inside each container assembly 600 is allowed to rise so that the dough is sufficiently risen for baking or cooking when the container assemblies 600 are advanced or indexed into the oven 500. Cooked or baked dough is moved onto the discharge conveyor 10' onto the material lifting devices 700 adjacent the discharge conveyors 10' for the movement in the third direction 1006 on the conveyor branch 1030, in a single file container formation. Such system conveyor branch 1030 may include a reject station or device 1032 where the cooked or baked dough is inspected and any container assemblies with undercooked or underbaked dough are discarded either manually or with an aid of another material advancing device 1010 or the like. The operation of the reject station 1032 can be aligned with the operation of the oven 500. The controller (not shown) of the system 1000 can be configured to monitor current applied to each container assembly 600. If malfunction occurs, for example due to a fuse blows, a contactor failure, electrical connection failure, where insufficient current is applied to one or more container assemblies 600, such one or more container assemblies 600 are identified within a specific oven 500 and are tracked during travel to the reject station 1032. The controller (not shown) can be further configured to monitor overall performance of a specific oven 500 and trigger a visual and/or an audible annunciation if the specific oven produces a greater than a desired number of underbaked or undercooked products. Thus, the advantage of the system 1000 is in timely and properly discarding inferior product without affecting other downstream processes and at least preventing if not eliminating undesirable system downtime(s).

The container assemblies 600 that passed inspection can be then loaded, manually or with an aid of another material advancing device 1010 or the like, onto the accumulation conveyor 1040 that can be also an index or ratchet conveyor 10. Next, the processed (cooked or baked) dough is removed from the containers 601 at the de-panning station or device 1052. The de-panning station 1052 can comprise a manual removal of the pans 610 or comprise a robotic device (not shown) that will be configure and program to grasp the pans 610, for example at the flange 612 thereof. The de-panning station 1052 may be configured to remove pans 610 from the container 601 for cleaning containers 600 and insertion of new pans 610 or cleaning and the re-insertion of the removed pans 610. Or the pans 610 can be inserted at or prior to the dough insertion station 1062. Thus, the de-panning station 1052 can comprise an in-line scraper device and/or washer device for cleaning pans 610 and/or containers 602 or the empty cleaned container assemblies 600 are advanced on the conveyor branch 1060 to the dough insertion station 1062 where the process begins de novo. Release agents can be used in the de-panning station 1052 and other applicable areas. Such release agents can comprise, without limitation, one or more of the steam, air, liquid nitrogen, plate coolers, coils, blowers or other methods (using methods such as glycol, NH3 or other refrigerant), waxes, films, impact, fingers, needle fingers, vacuum, liquid applications (oils or other coatings.

Although it must be noted that any station or point within the closed-loop system of FIG. 27 can be a starting point for the process.

When the material lifting devices 700 are used, top working surface of one or more of the system conveyor branches 1020, 1030 and 1040 can be positioned lower than the working top surfaces of the conveyors 10.

The number of ovens 500, the number of the container assemblies 600 on each conveyor 10 and the number of infeed conveyors 10 can be dictated by a desired throughput of the system of FIG. 27.

It is important to note here, that the material lifting device 700 configuration is just one way to change the direction of the container assemblies 600 and that there are other means by which the containers can be lifted to achieve the same result. There are many other ways to discharge containers 600 as an alternative to lifting tables 700 as well, for example such as transfer plates or incorporating a pusher or a bar with chains to advance the product in the direction of 1006, or other conveyor belting options such as side gripping with a "rope" conveyor or side gripping conveyor such as Rexnord PSX-1873, or pushing directing onto a mattetop belt conveyor (metal or plastic, low friction or other variances, mattetop with integrated transfer rollers, or like components. A curved conveyor portion can be also used. A non-limiting example of such curved conveyor portion is disclosed in U.S. Pat. No. 5,195,630 issued to Donovan on Mar. 23, 1993, the entire contents of which are incorporated herein by reference.

The operation of the system for baking or cooking dough can be further explained in reference to FIGS. 28-30.

FIG. 28 illustrates the system 1100 that comprises a dough mixing device or a dough mixing station 1112, which can be any conventional dough mixer. A dough insertion device 1062 is operatively coupled to the dough mixer 1112. The container assembly 600 can be supplied from a station 1116 that can be another index or ratchet conveyor 10 or can be adapted for a manual or robotic placement of the container at a point of fill. The filled container assemblies travel on the conveyor branch 1020 for a transfer to a proofing station 1118 that can comprise one or more of the conveyors, for example such as conveyors 10. As has been disclosed above, the container assemblies 600 with dough are then delivered to the oven 500 and discharged through the discharge conveyor 10' onto the conveyor branch 1030. A reject station or device 1032 can be also provided in the exemplary system 1100.

FIG. 29 clarifies the above described product removal and de-panning and cleaning station 1052. More specifically, such station 1052 can comprise product and pan removal station 1054. Empty containers 601 travel through the in-line washer 1058. Removed pans 610 travel through the cleaning station 1056 for reinsertion into the cleaned containers 601 at the station 1059. The empty container assemblies 600 then travel on the conveyor portion 1060 to the insertion station 1056.

FIG. 30 expands on the illustrative system 1001' of FIGS. 28-29 and illustrates a system 1150 that comprises secondary operations that can be performed on cooked or baked dough removed from the container assemblies 600. For the sake of brevity, the description of the illustrative system 1150 starts with the product removal and de-panning and cleaning station 1052 and omits the previously discussed components of the FIGS. 27-29. Removed cooked or baked product (bread loafs) removed can be transferred onto a conveyor 1152. For a delivery to a loaf cutter 1154 that transforms whole loafs into smaller portions, for example such as slices. The loaf cutter or trimmer 1154 can be any one of a rolling cutter, a water knife, a chopping cutter, and a perforating cutter. The cut product is then transferred onto a cooling conveyor 1156 for further dehydrating at station 1156 and drying at station 1160. The station 1160 can comprise cart(s) or conveyor(s). If sliced loaf represents the final product, it can be transferred to the bagging and packaging station 1170. If further processing is required, a station 1162 can comprise a loaf shredder for transforming or processing cut loaves into Japanese bread crumbs or American bread crumbs or a loaf cuber for transforming or processing cut loaves into croutons. The system 1150 also contemplates a coating station 1164 that can apply additional ingredients, for example such as frosting, chocolate, sprinkles, sugar, etc, onto the baked product. Processed product can be toasted, dried or seasoned (salt, pepper, oil, butter, etc) at a station 1166 and sorted for packaging at a station 1168.

FIG. 31 illustrates schematic construction and or operation of an exemplary system 1200 that processes material and more specifically that converts raw dough into a finished food product. The system 1200 comprises previously described conveyors 10 and 10', oven 500, conveyor branches 1020 and 1030. The process may begin at the dry ingredient(s) blending station 1202 and/or wet ingredient(s) blending station 1204. The blended dry and wet ingredients are than combined together at the dough mixing station 1112 and transferred to a dough forming station 1064 for insertion into the containers, for example such as container assemblies 600, in the dough insertion station 1062. As has been described above, the filled containers are then transferred onto the infeed conveyors, for example such as the index or ratchet conveyors 10, processed in one or more ovens 500 and discharged, for example onto the discharge conveyor(s) 10'. An optional product discharge station 1206 can be disposed adjacent the discharge conveyor(s) 10', as applicable for multiple products for multiple ovens or other containers exiting that may go another direction to another process. In other words, the system 1200 can be configured to process materials of different types and/or disposed within different containers. The containers travel to the product removal station 1054 that may be also configured to remove pans 610 from the above described container assemblies 600. Pans 610 and empty containers 601 are cleaned in the station 1058 and reassembled in the station 1059. Removed pans 610 can be stored in the storage section 1208, if two kinds of boxes, molds, or other apparatus are used in a product change. When this condition is applicable, the storage station 1208 accumulates one or more other product implements, and these implements can cycle in and out using this "bypass" storage area. As old implements enter, new implements exit for product filling. The removed product can be transferred by the conveyor(s) 1152 to a trimmer 1154 in applications requiring removal of an extra crust from the cooked product or a cutter 1210 to process loaves into a final product shape or prepare for the next stage. The cutter 1210 can be any one of a rolling cutter, a water knife, a chopping cutter or a perforating cutter. If necessary, another conveyor 1212 can transport whole or processed loaves to an optional precool table 1214 to eliminate latent heat from the finished product. The precool table 1214 can be used prior to packaging step with appropriate exhaust arrangement. The product can be either air cooled or cooled by way of chilled (air-conditioned) air. The removed heat can be exhausted to atmosphere or used as an additional heat source, by way of a heat exchanger (not shown). Optional product dehydrating 1216 can be used after the loaves have been passed through the cutter 1210 of a water knife type. Spiral conveyor 1218 can be used anywhere within the system 1200 to change elevation of the product if desired in order to increase utilization of the floor spaced and allow ease of using material handling equipment, for example such as lift trucks (not shown). The system 1200 can comprise an optional manual or automated product cart loader 1218, an optional freezer 1220, an optional grinder 1222 and an optional loaf shredder 1224. shaker table(s) 1226 can be used during product conveyance to capture 100% of the product of bread crumb and/or crouton type. If required, the processed product can be sized and/or sorted at a station 1228. An optional heat applying station 1230 is contemplated to at least one of toast, dry, crisp, brown and sear the processed product. An optional coating device or station 1232 can be configured to deposit any one of chocolate coating, powdered sugar, crumbs, flakes, sprinkles, jelly coating, seasoning, icing, filling, caramel and even an additional product layer. Final product can be individually packaged at station 1232 or case bulk packaged (carted, boxed, shrink wrapped, etc) at station 1238 for transport in station 1238.

It must be noted that the above components/steps may not be always present in the illustrated configuration of the material processing system of FIGS. 30-31. System configuration can include some or all of these components/steps. System can have duplicate components in a specific process, processes can be used in a variety of configurations other than those listed above. Conveyance can vary between components of the system to include those listed or other industry known conveyance methods.

The control of any of the above describe system can comprise photo eyes, proximity and/or limit switches, control valves, safety valves and other control devices. The control can be achieved by a microprocessor based controller or a programmable logic controller (PLC) and further comprise a user interface and/or remote communication with the control system for the overall manufacturing facility employing the exemplary system(s). System can comprise an accumulator device to accumulate of a batch of containers at or after the dough insertion station 1062. In an example of the above described oven 500 configured to process five (5) containers in a single row, such batch will contain five (5) containers in a close proximity to if not touching each other. Containers that travel together in batches are less likely to drag, turn, tip or have any other adverse effect. In the case where multiple products or recipes would be present in the system concurrently, keeping the units in a batch can prevent mixing of products. The accumulation area, when multiple products may be entering into the system, may have separate dough inserters and related conveyor, and separate accumulator sections and related conveyor. Fire suppression devices can be also utilized. In other words, any conventional control arrangement for controlling operation of conveyors, process equipment and other devices in a production facility can be used to control the forgoing exemplary embodiments of the material processing systems.

The above described embodiments can provide the following advantages over presently used systems, particularly when applied in food processing applications:

1. Reduce the width of expansion laterally of the bread boxes when they expand when hot, or shrink when cool, exemplary existing systems can be up to 20 boxes wide or more. By reducing the width to five boxes wide with several lanes there are less issues with boxes binding and down time in a system failure.

2. Mitigate Diagonal blockage, whereby bread boxes "lock-up" and don't advance (looks like a diagonal pattern), this is from wide lanes 3. Negate the effect of the oils used, prevent loss of traction of the bread boxes on the rollers. Oil is needed in many blends, and naturally translates to rollers. Due to limited contact of the radius of a roller and the friction loss due to the oil, which acts like a lubricant rollers are an inefficient way to move bread boxes. So dogs, with a positive contact, or belting or chains, will have more surface contact than a roller.

4. Better control of box movement, more consistent alignment and advancement. A problem with friction managed systems, especially with oils or lubricants, is that if more friction is applied to one bread box, and less to another bread box, especially when translating from a stationary position to an initial start up or movement of a conveyor below, the inertia can advance one product ahead of another product on the same plane which can affect placement of multiple products that are supposed to share the same plane of travel.

5. Mitigate loss time of production if a problem arises (whole system is down for each small or large problem). As stated above, if an exemplary conveyor has twenty boxes wide, and one row "binds" the whole system has down time until the "binding" is resolved. If one five product lane binds, then three other five product lanes continue to operate while the one lane is restored.

6. System Redundancy, standardization of parts. Many systems have an innumerable quantity of unique parts, requiring a large storage space and a large inventory of standby parts. This line has focused on limiting parts and using same parts in multiple applications.

7. Reduce Parts Inventory, as stated above.

8. Increase production (pounds of bread per hour). Other systems have a single or double stage baking element. Our system incorporated in each oven five baking single stage elements that bake more loaves at the same time, resulting in more production in the same amount of time.

9. Keep the footprint of the system small. Other systems incorporate multiple processes contained in this oven that require more material handling and conveyors. This bakery is utilizing as little space as possible to accomplish all of the functions necessary in one small foot print.

10. Modular System, ability to move the system to accommodate changes in the facility or floor plan. Most of the components are free standing and independent. The system can be disconnected in macro components and reconfigured, moved or relocated with mitigated effort because the system was designed to break down and move quickly to accommodate bakery future needs.

11. Less Transmissions (less drives, gear boxes, chains, sprockets).

12. Easier to clean.

13. Easier to change parts, easier to change oven components. This system has designed change out components to quickly change any part that could possibly need to be replaced.

14. Easier to change timers and delays for bake time and rise time control. HMI control interface for operators to manage the bakery.

15. Less Grease and/or grease points.

16. Reduce chains driving the system. Typical bakery lines incorporate chains that are a replacement part. Chains produce cleaning issues, flaking metal debris, breaking links are a problem and cause down time, and other disadvantages.

17. Reduce Hazards, make the system safer for plant personnel. Less pinch points, open design, designed to have space in between moving parts, starting position and ending position.

18. Long wear time on parts, mitigate frequency of down time changing parts. Parts are designed to move without wear.

19. No trusses for the roof structure. Other systems may incorporate trusses under the hood that can have dripping, or bacterial issues, or mold, or be difficult to clean. Our hoods are designed for clean operation and to resolve many other industry problems.

20. Ability to expand the system. Additional components and lanes can easily be incorporated to the system.

21. Ability to do preventative maintenance on the system while it runs without having to shut the whole system down. One lane can be worked on and divert the load to other lanes, while the other lanes continue to produce.

22. Mitigate arching and damage to trays. Other bakeries operate with rudimentary contactors that do not always contact the pans, and arcing, heat, metal spatter and other problems result. Often the problems occur due to damaged pans. Our contactors travel to make a positive contact on every pan, removing arching issues. Arching additionally damages pans causing pan replacement to be more frequent, and uncooked bread due to lack of contact or poor contact with the contactors causes downstream problems as well.

23. Localize fuses and remote input outputs (RIO's.). Some plants have mechanical rooms far from the system. We bring our subpanel to the system for easy resolution to any electrical issues that may arise.

24. Reduce the size of the electrical switch gears for the oven (less expensive power disconnects). Some systems that may use an exemplary 20 or more boxes wide in two stages, demand much more power to cook that many at a time. We manage smaller amounts of boxes and we manage efficient transmittal of power to the boxes to manage power usage for smaller electrical components. Power is also measured for the duration of the bake to determine if the loaf is cooked. If the loaf did not get the adequate amount of current or bake time, the line will notify operators and/or track the product and remove the product out of the system with automation.

25. HMI screen for operator and maintenance to perform their necessary tasks and troubleshooting.

26. Remote monitoring of the system for service and management. Many systems must have a mechanic or technician at the unit to solve problems. This line is able, with permission, to be accessed to assist remotely issues in the system or in the program, reducing costly travel expenses.

27. Less drives if possible. Existing systems may have 9 or more drives to perform the same amount of work; this line, for example would have only three drives, reducing cost, reducing energy, reducing wear from constant rotation of equipment, and many other added benefits.

28. Provide for a quick changeover of oven components.

In an embodiment, a production system comprised an oven that cooks or bakes, with electrical resistance, dough contained within container. The oven comprises a frame defining an inlet end and an outlet end of the oven, devices mounted, in a preselected pattern, on the frame for a reciprocal movement in a vertical direction during use of the oven, each device configured to connect voltage to a respective container so as to cook or bake the dough with the electrical resistance, and one or more powered members configured to move the devices in the vertical direction. The system further comprises conveyors that convey a plurality of rows of containers with a plurality of containers in each row along a material conveyance path, the conveyors disposed in a series with each other and with the oven along the material conveyance path, one of the conveyors disposed within the oven so as to position a batch of the containers in an alignment with the devices. The system may comprise a means for changing a movement direction of the containers. The means comprises one or more material lifting devices, each of the one or more material lifting devices configured to temporarily change an elevation of the containers. Each material lifting device can comprises a first frame mounted stationary and having a hollow interior; a conveying device at least partially mounted on the first frame and defining a first direction; a second frame mounted for a movement in a generally horizontal plane and being sized and shaped to fit within the hollow interior of the first frame; a third frame mounted for a movement in a generally horizontal plane and in a generally vertical plane, the third frame being sized and shaped to fit within the hollow interior of the first frame; a powered member configured to generate a linear motion, the powered member comprising a first portion thereof affixed to the first frame and having a movable second portion thereof affixed to the second frame; slide or track assemblies mounted stationary on an interior of the first frame in a spaced apart relationship with each other, each slide or track assembly comprising a first track with a generally horizontal working surface and a second track with working surface(s) disposed on an incline to the generally horizontal working surface; roller assemblies, each roller assembly comprising a first roller affixed for a rotation on an exterior of the second frame and contacting, during use, the generally horizontal working surface, a second roller affixed for a rotation on an exterior of the third frame and contacting, during the use, the working surface(s) disposed on the incline to the generally horizontal working surface; and a rigid link connecting the first and second rollers; and a roller assembly comprising a pair of roller mounting members, each comprising a first portion affixed rigidly to one end of the third frame and one or more second portions upstanding on the first portion and one or more rollers mounted, on each of the one or more second portions, for a rotation in a second direction, the second direction being generally normal to the first direction. The first frame may comprise a pair of elongated members. The means can comprise one or more material advancing devices, each of the material advancing devices comprises a powered actuator with a portion movable in a linear direction and a member secured to the portion, the powered actuator mounted so the portion and the member move linearly in a direction being different from a movement direction of the containers, the member contacting one or more containers during operation of the powered actuator to move the containers in the different direction. The means can comprise one or more material advancing devices, each of the material advancing devices comprises bars attached, at a distance from each other, to a pair of chain disposed in a parallel relationship with each other and driven by a pair of sprockets and a powered member, the bars mounted for a movement with the pair of chains, the distance sufficient to receive one or more containers between a pair of adjacent bars, each of the bars abutting a batch of containers during the movement and advances the batch of containers during the movement. The system can additionally comprised additional conveyors conveying the containers to and from the oven. Each container can comprise a pair of electrically conducting members defining opposite side walls of the container. Each container can comprise a mold manufactured from a silicone material.

In an embodiment, a method for making bread loaves comprises mixing dry and wet ingredients; forming, with the dry and wet ingredients a raw dough; inserting the dough into containers; conveying the containers with the raw dough on one or more conveyors to an oven; baking, with the oven, the raw dough with an electrical resistance to make the bread loaves; conveying the containers with the bread loaves on one or more conveyors from the oven; and removing the bread loaves from the containers. The method can further comprise packaging the bread loaves for a distribution to consumers. The method can further comprise slicing the bread loaves. The method of claim 12, further comprising transforming the sliced bread loaves into cubes or crumbs. The method can further comprise roasting or drying the cubes or crumbs. The method can further comprise inspecting bread loaves prior to removing the bread loaves form the containers. The method can further comprise removing containers with insufficiently baked bread loaves. The step of baking comprises providing a pair of electrically conducting pans within each container and placing the dough between the pair of pans.

In an embodiment, a method for making cupcakes comprises mixing dry and wet ingredients; forming, with the dry and wet ingredients a batter; inserting the batter into containers comprising silicone material and being positioned on an electrically conducting tray; conveying the containers with the batter on one or more conveyors to an oven; baking, with the oven, the batter with an electrical resistance to make the cupcakes; conveying the containers with the cupcakes on one or more conveyors from the oven; and removing the cupcakes from the containers. The step of baking the raw dough can comprise a step of inserting one or more needle-type electrical electrodes into the the batter, the electrical electrodes receiving a voltage of one polarity and connecting voltage of an opposite polarity to the tray.

In an embodiment, a method for making treats for consumption by animals comprises preparing a batter of dry and wet ingredients; inserting the batter into one or more containers, each of the one or more containers comprising a silicone material and being positioned on an electrically conducting tray; conveying the containers with the batter on one or more conveyors to an oven configured to bake the batter with electrical resistance; baking, with the electrical resistance, the batter to make the treats; conveying the containers with the treats on one or more conveyors from the oven; and removing the treats from the containers.

In an embodiment, the in-line apparatus for cooking or baking dough comprises, one or more infeed ratcheting/indexing conveyors comprising pivoting dogs horizontal surfaces for supporting the containers during movement; an oven configured to cook or bake dough with electrical resistance and comprising electrodes movable in a vertical direction to connect voltage to metal pans within the containers; and one or more discharge ratcheting/indexing conveyors comprising a kick back device configured to move containers a small distance in a direction being opposite to the conveying direction, the one or more infeed ratcheting/indexing conveyors, oven and one or more discharge infeed ratcheting/indexing conveyors arranged serially along a conveyance path.

In an embodiment, the in-line apparatus for cooking or baking dough comprises, one or more infeed ratcheting/indexing conveyors comprising pivoting dogs horizontal surfaces for supporting the containers during movement; an oven configured to cook or bake dough with electrical resistance and comprising electrodes movable in a vertical direction to connect voltage to metal pans within the containers; one or more discharge ratcheting/indexing conveyors comprising a kick back device configured to move containers a small distance in a direction being opposite to the conveying direction, the one or more infeed ratcheting/indexing conveyors, oven and one or more discharge ratcheting/indexing conveyors arranged serially along a path; and one or more conveyor/lifting tables configured to change elevation and the direction of movement of the containers in a relationship to the elevation of the one or more discharge ratcheting/indexing conveyors.

In an embodiment, the in-line apparatus for cooking or baking dough comprises, one or more infeed ratcheting/indexing conveyors comprising pivoting dogs horizontal surfaces for supporting the containers during movement; an oven configured to cook or bake dough with electrical resistance and comprising electrodes movable in a vertical direction to connect voltage to metal pans within the containers; one or more discharge ratcheting/indexing conveyors comprising a kick back device configured to move containers a small distance in a direction being opposite to the conveying direction, the one or more infeed ratcheting/indexing conveyors, oven and one or more discharge ratcheting/indexing conveyors arranged serially along a path; and one or more conveyor/lifting tables configured to change elevation and the direction of movement of the containers in a relationship to the one or more infeed ratcheting/indexing conveyors.

In an embodiment, the apparatus for cooking or baking dough comprises, one or more infeed ratcheting/indexing conveyors comprising pivoting dogs horizontal surfaces for supporting the containers during movement; an oven configured to cook or bake dough with electrical resistance and comprising electrodes movable in a vertical direction to connect voltage to metal pans within the containers; one or more discharge ratcheting/indexing conveyors comprising a kick back device configured to move containers a small distance in a direction being opposite to the conveying direction, the one or more infeed ratcheting/indexing conveyors, oven and one or more discharge ratcheting/indexing conveyors arranged serially along a path; one or more conveyor/lifting tables configured to change elevation and the direction of movement of the containers in a relationship to the one or more infeed ratcheting/indexing conveyors; one or more conveyor/lifting tables configured to change elevation and the direction of movement of the containers in a relationship to the one or more discharge ratcheting/indexing conveyors; and empty container transfer conveyor(s) and one or more container pushing devices.

In an embodiment, the apparatus for cooking or baking dough comprises, one or more processing lines, each comprising one or more infeed ratcheting/indexing conveyors comprising pivoting dogs horizontal surfaces for supporting the containers during movement; an oven configured to cook or bake dough with electrical resistance and comprising electrodes movable in a vertical direction to connect voltage to metal pans within the containers; one or more discharge ratcheting/indexing conveyors comprising a kick back device configured to move containers a small distance in a direction being opposite to the conveying direction, the one or more infeed ratcheting/indexing conveyors, oven and one or more discharge ratcheting/indexing conveyors arranged serially along a path; one or more conveyor/lifting tables configured to change elevation and the direction of movement of the containers in a relationship to the one or more infeed ratcheting/indexing conveyors; one or more conveyor/lifting tables configured to change elevation and the direction of movement of the containers in a relationship to the one or more discharge ratcheting/indexing conveyors; and wherein the apparatus further comprises empty container transfer conveyor(s) and one or more container pushing devices.

In an embodiment, a method of cooking or baking dough within a container with metal pans comprises providing an oven configured to cook or bake dough with electrical resistance and comprising electrodes movable in a vertical direction to connect voltage to the metal pans within the containers; coupling, to an inlet end of the oven, one or more infeed ratcheting/indexing conveyors comprising pivoting dogs horizontal surfaces for supporting the containers during movement; coupling, to a discharge end of the oven, one or more discharge ratcheting/indexing conveyors comprising pivoting dogs and a kick back device configured to move containers a small distance in a direction being opposite to the conveying direction so that the oven and one or more discharge ratcheting/indexing conveyors arranged serially along a path; feeding containers by infeed ratcheting/indexing conveyors into the oven, cooking or baking, with the oven, the dough in the containers; and discharging the containers with cooked or baked dough with one or more discharge ratcheting/indexing conveyors.

In an embodiment, a method of cooking or baking dough within a container assembly with metal pans comprises providing an oven configured to cook or bake dough with electrical resistance and comprising electrodes movable in a vertical direction to connect voltage to the metal pans within the containers; coupling, to an inlet end of the oven, one or more infeed ratcheting/indexing conveyors comprising pivoting dogs horizontal surfaces for supporting the containers during movement; coupling, to a discharge end of the oven, one or more discharge ratcheting/indexing conveyors comprising pivoting dogs and a kick back device configured to move containers a small distance in a direction being opposite to the conveying direction so that the oven and one or more discharge ratcheting/indexing conveyors arranged serially along a path; coupling, to the one or more discharge ratcheting/indexing conveyors, one or more conveyor/lifting tables configured to change an elevation and a direction of movement of the containers in a relationship to the one or more discharge ratcheting/indexing conveyors; feeding containers by infeed ratcheting/indexing conveyors into the oven, cooking or baking, with the oven, the dough in the container; discharging the containers with cooked or baked dough with one or more discharge ratcheting/indexing conveyors; and changing an elevation of the containers with cooked or baked dough exiting the one or more discharge ratcheting/indexing conveyors.

In an embodiment, a method of cooking or baking dough disposed on an electrically conductive member comprises providing an oven configured to cook or bake dough with electrical resistance and comprising first electrodes movable in a vertical direction to connect voltage to the electrically conductive member and needle-shaped second electrodes movable in a vertical direction for insertion into the batter; coupling, to an inlet end of the oven, one or more infeed ratcheting/indexing conveyors comprising pivoting dogs horizontal surfaces for supporting the containers during movement; coupling, to a discharge end of the oven, one or more discharge ratcheting/indexing conveyors comprising pivoting dogs and a kick back device configured to move containers a small distance in a direction being opposite to the conveying direction so that the oven and one or more discharge ratcheting/indexing conveyors arranged serially along a path; coupling, to the one or more discharge ratcheting/indexing conveyors, one or more conveyor/lifting tables configured to change an elevation and a direction of movement of the containers in a relationship to the one or more discharge ratcheting/indexing conveyors; feeding containers by infeed ratcheting/indexing conveyors into the oven, cooking or baking, with the oven, the dough in the container; discharging the containers with cooked or baked dough with one or more discharge ratcheting/indexing conveyors; and changing an elevation of the containers with cooked or baked dough exiting the one or more discharge ratcheting/indexing conveyors.

In an embodiment, an oven 500 can be replaced with an apparatus configured and operable to for a different end result. For example, such apparatus can be any one of a shrink wrapper, a tray packer, a case packer, a bundler, a case former, a sealer, a filler, a singulator, an inverter and any combination thereof. In this embodiment, the production line can be configured to compliment the apparatus. For example, at least manual de-panning and dough insertions stations can be eliminated when the apparatus is configured to shrink wrap soda cans or bottles, boxes, jugs, and the like containers. In an embodiment, a discharge conveyor 10' with the kickback device 180 can be replaced by a conveyor 10 or even be eliminated in its entirety and the conveyor 10 can be configured to discharge the processed material during reverse movement of the force transmitting members.

In an embodiment, a robotic apparatus can be provided to replace one or more of conveyor(s) 10, 10', 1020 and 1030 of FIGS. 25 and 27-31.

In an embodiment, the discharge conveyor 10' can be installed within the oven 500. Then, the container can be discharged from the oven 500 directly onto the lifting table 700 or other stationary or moving device, for example, such as conveyor 1020.

In an embodiment, one or more infeed conveyors 10 can be eliminated and the containers can be delivered to the oven 500 directly from the infeed conveyor 1020 or other devices or objects.

It would be understood, that infeed time should be sufficient to accommodate dough secondary proofing (rising).

In an embodiment, the above described system(s) can be implemented as a multi-tier or multi-story system to maximize production throughput on any given floor space. In an example, the system 1000 of FIG. 25 can be provided as a two story system requiring added components, such as elevators to move material between the lower and upper stories.

The chosen exemplary embodiments of the present disclosure have been described and illustrated, to plan and/or cross section illustrations that are schematic illustrations of idealized embodiments, for practical purposes so as to enable any person skilled in the art to which it pertains to make and use the same. As such, variations from the shapes of the illustrations as a result, example, of manufacturing techniques and/or tolerances, are to be expected. It is therefore intended that all matters in the foregoing description and shown in the accompanying drawings be interpreted as illustrative and not in a limiting sense. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope. It will be understood that variations, modifications, equivalents and substitutions for components of the specifically described exemplary embodiments of the invention may be made by those skilled in the art without departing from the spirit and scope of the inventive embodiments.

It will be understood that when an element is referred to as being "on" another element, it can be direct on the other element or intervening elements may be present therebetween. In contrast, when an element is referred to as being "direct on" another element, there are no intervening elements present. As used herein, the term "and/or" includes any and all combinations of one or more of the associated listed items.

Furthermore, there is no intention to be bound by any expressed or implied theory presented in the preceding technical field, background, or the detailed description. It is also to be understood that the specific devices and processes illustrated in the coupled drawings, and described in the following specification, are simply examples of the inventive concepts.

It should be appreciated that reference throughout this specification to "an embodiment" or "an exemplary embodiment" means that a particular feature, structure or characteristic described in connection with the embodiment is included in at least one embodiment of the disclosed subject matter. Therefore, it is emphasized and should be appreciated that two or more references to "an embodiment" or "one embodiment" or "an alternative embodiment" in various portions of this specification are not necessarily all referring to the same embodiment or the same variation. Furthermore, the particular features, structures or characteristics may be combined as suitable in one or more embodiments of the disclosed subject matter.

Similarly, it should be appreciated that in the description of embodiments, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

Anywhere the term "comprising" is used, embodiments and components "consisting essentially of" and "consisting of" are expressly disclosed and described herein."

Furthermore, the Abstract is not intended to be limiting as to the scope of the claimed subject matter and is for the purpose of quickly determining the nature of the claimed subject matter.

What is claim is:

1. A method for making cupcakes or cakes, comprising:
   mixing dry and wet ingredients into a batter;
   inserting said batter into containers comprising silicone material and being positioned on an electrically conducting tray;
   conveying said containers with said batter on one or more ratchet conveyors to an oven;
   baking said batter within said oven, with an electrical resistance supplied by one or more electrodes inserted into said batter and connecting a voltage of one polarity thereto, and electrodes connecting voltage of an opposite polarity to said electrically conducting trays into said cupcakes or said cakes; and
   conveying said containers with said cupcakes or said cakes on one or more conveyors from said oven.

2. The method of claim 1, wherein said oven comprises:
   a frame defining an inlet end and an outlet end of said oven;
   devices mounted, in pairs, on said frame for a reciprocal movement in a vertical direction during use of said oven, each pair of devices connects voltages of different polarity to electrically conductive members in each container so as to produce said electrical resistance; and
   a powered member configured to move said devices in said vertical direction.

3. The method of claim 1, wherein each ratchet conveyor from said one or more ratchet conveyors comprises:
   a frame defining inlet and outlet ends of said each ratchet conveyor, said frame comprising four vertically disposed end members and a pair of side members extending between said inlet and outlet ends, each of said pair of side members being coupled to a pair of said vertically disposed members;
   a conveyance means for incrementally advancing or indexing a plurality of rows of containers with a plurality of containers in each row along a conveyance path; and
   a single powered member coupled to said conveyance means and operable to move a portion of said conveyance means along said conveyance path.

4. A method for making treats for consumption by animals, said method comprising:
   preparing a batter of dry and wet ingredients;
   inserting said batter into one or more containers, each of said one or more containers comprising a silicone material and being positioned on an electrically conducting tray;
   conveying said containers with said batter on one or more conveyors to an oven configured to bake said batter with electrical resistance, said electrical resistance being supplied by one or more electrodes inserted into said batter and connecting a voltage of one polarity thereto, and electrodes connecting voltage of an opposite polarity to said electrically conducting trays;
   baking, with said electrical resistance, said batter to make said treats; and
   conveying said containers with said treats on one or more conveyors from said oven.

5. The method of claim 4, wherein conveying said containers to said oven comprises conveying said containers with one or more ratchet conveyors.

6. A method for making cupcakes or cakes, comprising:
   mixing dry and wet ingredients into a batter;
   inserting said batter into a container, said container being positioned on an electrically conducting tray;
   placing said container with said batter into an oven;
   connecting, within said oven, a voltage of one polarity to said batter and a voltage of an opposite polarity to said tray; and
   baking, with an electrical resistance due to said voltage of one polarity and said voltage of another polarity, said batter into said cakes or cupcakes.

7. The method of claim 6, wherein said container comprises a mold manufactured from a silicone material.

8. The method of claim 6, wherein connecting said voltage of said one polarity to said batter comprises inserting one or more needle-type electrodes into said batter.

9. The method of claim 6, wherein placing said containers with said batter into said oven comprises conveying a plurality of rows of said containers with a plurality of said containers in each row along a material conveyance path.

10. A method of baking, comprising:
    connecting a voltage of one polarity to a batter placed into an electrically non-conducting container with electrodes that are inserted onto said batter;
    connecting a voltage of an opposite polarity to an electrically conducting tray that said electrically non-conducting container being disposed thereon; and
    baking said batter with an electrical resistance due to said voltage of one polarity and said voltage of another polarity.

11. The method of claim 10, wherein said baking said batter comprises baking said batter within an oven and mounting said electrodes for a movement in a vertical direction within said oven.

12. The method of claim 11, further comprising conveying, on conveyors, said batter to and/or from said oven.

13. The method of claim 10, wherein said baking said batter comprises changing a penetration depth of said electrodes during said baking.

* * * * *